US012652575B2

(12) United States Patent
    MolavianJazi et al.

(10) Patent No.:     US 12,652,575 B2
(45) Date of Patent:          Jun. 9, 2026

(54) METHOD AND APPARATUS FOR DCI SIZE FOR MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 18/349,856

(22) Filed: Jul. 10, 2023

(65)           Prior Publication Data
    US 2024/0040429 A1     Feb. 1, 2024

Related U.S. Application Data

(60) Provisional application No. 63/446,746, filed on Feb. 17, 2023, provisional application No. 63/391,198, filed on Jul. 21, 2022.

(51) Int. Cl.
    *H04W 28/06*          (2009.01)
    *H04W 72/1273*       (2023.01)
    *H04W 72/232*        (2023.01)

(52) U.S. Cl.
    CPC ....... *H04W 28/06* (2013.01); *H04W 72/1273* (2013.01); *H04W 72/232* (2023.01)

(58) Field of Classification Search
    CPC .... H04L 1/0023; H04L 5/0053; H04W 28/06; H04W 72/0453; H04W 72/1268; H04W 72/1273; H04W 72/232
    See application file for complete search history.

(56)           References Cited

U.S. PATENT DOCUMENTS

| | | | | |
|---|---|---|---|---|
| 11,611,411 B2 * | 3/2023 | Xu | | H04W 72/23 |
| 11,696,297 B2 * | 7/2023 | Fakoorian | | H04L 1/1887 |
| | | | | 370/329 |
| 12,238,729 B2 * | 2/2025 | Kittichokechai | | H04L 5/0053 |
| 2014/0314007 A1 | 10/2014 | Chen et al. | | |

(Continued)

FOREIGN PATENT DOCUMENTS

| | | | | | |
|---|---|---|---|---|---|
| CN | 113661677 A | * | 11/2021 | | H04W 72/23 |
| CN | 114175562 A | * | 3/2022 | | H04W 72/23 |

(Continued)

OTHER PUBLICATIONS

Nokia et al., On multi-cell PUSCH/PDSCH scheduling with a single DCI, May 9, 2022, 3GPP TSG RAN WG1 #109-e, Agenda Item: 9.10.1, Tdoc: R1-2203276 (Year: 2022).*

(Continued)

*Primary Examiner* — Eric Nowlin

(57)           ABSTRACT

Downlink control information (DCI) size determination for multi-cell scheduling. A method includes receiving first information for a set of cells, identifying first combinations of cells from the set of cells, and determining a first maximum size among first sizes of a first DCI format. The first DCI format schedules physical downlink shared channel (PDSCH) receptions on a first combination of cells from the first combinations of cells, and the first sizes correspond to the first combinations of cells. The method further includes receiving the first DCI format based on the first maximum size.

20 Claims, 14 Drawing Sheets

(56)        References Cited

U.S. PATENT DOCUMENTS

| | | | | |
|---|---|---|---|---|
| 2016/0338023 | A1 | 11/2016 | Nogami et al. | |
| 2020/0396760 | A1* | 12/2020 | Yi | H04W 72/23 |
| 2021/0014837 | A1* | 1/2021 | Papasakellariou | H04L 5/0053 |
| 2021/0029772 | A1* | 1/2021 | Islam | H04L 1/1896 |
| 2021/0058189 | A1* | 2/2021 | Xiao | H04L 1/0038 |
| 2021/0144686 | A1* | 5/2021 | Fakoorian | H04W 72/23 |
| 2021/0160035 | A1* | 5/2021 | Kittichokechai | H04W 72/23 |
| 2021/0176012 | A1* | 6/2021 | Xu | H04W 72/23 |
| 2021/0243767 | A1* | 8/2021 | Suzuki | H04L 5/0007 |
| 2022/0124788 | A1* | 4/2022 | Kittichokechai | H04L 1/0008 |
| 2022/0264341 | A1* | 8/2022 | Liu | H04W 72/23 |
| 2022/0345921 | A1* | 10/2022 | Liu | H04L 5/0053 |
| 2023/0085896 | A1* | 3/2023 | Takeda | H04L 5/0044 |
| 2023/0103808 | A1* | 4/2023 | Yoon | H04W 72/0453 |
| | | | | 370/329 |
| 2023/0144002 | A1* | 5/2023 | Kim | H04L 5/001 |
| | | | | 370/329 |
| 2023/0199782 | A1* | 6/2023 | Takeda | H04L 5/001 |
| | | | | 370/329 |
| 2023/0254857 | A1* | 8/2023 | Moon | H04B 17/24 |
| | | | | 370/329 |
| 2023/0328786 | A1* | 10/2023 | Sun | H04W 74/002 |
| | | | | 370/329 |
| 2023/0354363 | A1* | 11/2023 | Ye | H04W 72/12 |
| 2024/0057114 | A1* | 2/2024 | Lei | H04W 72/121 |

FOREIGN PATENT DOCUMENTS

| | | | | | |
|---|---|---|---|---|---|
| CN | 114175562 | B | * | 3/2024 | H04L 5/0091 |
| CN | 120153743 | A | * | 6/2025 | H04L 5/0053 |
| EP | 3925142 | A1 | * | 12/2021 | |
| JP | 2022521689 | A | * | 4/2022 | H04W 72/23 |
| JP | 7238147 | B2 | * | 3/2023 | H04W 72/23 |
| WO | WO-2020165406 | A1 | * | 8/2020 | H04W 72/23 |
| WO | WO-2021025174 | A1 | * | 2/2021 | H04W 72/23 |
| WO | 2021251741 | A1 | | 12/2021 | |
| WO | 2022027561 | A1 | | 2/2022 | |
| WO | WO-2024087531 | A1 | * | 5/2024 | H04L 5/001 |
| WO | WO-2024087531 | A9 | * | 6/2024 | H04L 5/001 |
| WO | WO-2024113605 | A1 | * | 6/2024 | H04L 5/0053 |

OTHER PUBLICATIONS

Samsung, Multi-cell PUSCH/PDSCH scheduling with a single DCI, May 9, 2022, 3GPP TSG RAN WG1 #109-e, Agenda Item: 9.10.1, Tdoc: R1-2203925 (Year: 2022).*

Lenovo, Feature lead summary #1 on multi-cell PUSCH/PDSCH scheduling with a single DCI, May 9, 2022, 3GPP TSG RAN WG1 #109-e, Agenda Item: 9.10.1, Tdoc: R1-2205234 (Year: 2022).*

Lenovo, Feature lead summary #2 on multi-cell PUSCH/PDSCH scheduling with a single DCI, May 9, 2022, 3GPP TSG RAN WG1 #109-e, Agenda Item: 9.10.1, Tdoc: R1-2205235 (Year: 2022).*

Lenovo, Feature lead summary #3 on multi-cell PUSCH/PDSCH scheduling with a single DCI, May 9, 2022, 3GPP TSG RAN WG1 #109-e, Agenda Item: 9.10.1, Tdoc: R1-2205236 (Year: 2022).*

Lenovo, Feature lead summary #4 on multi-cell PUSCH/PDSCH scheduling with a single DCI, May 9, 2022, 3GPP TSG RAN WG1 #109-e, Agenda Item: 9.10.1, Tdoc: R1-2205486 (Year: 2022).*

Lenovo, Feature lead summary #5 on multi-cell PUSCH/PDSCH scheduling with a single DCI, May 9, 2022, 3GPP TSG RAN WG1 #109-e, Agenda Item: 9.10.1, Tdoc: R1-2205487 (Year: 2022).*

International Search Report and Written Opinion issued Nov. 3, 2023 regarding International Application No. PCT/KR2023/010405, 7 pages.

"3rd Generation Partnership Project; Technical Specification Group Radio Access Network; NR; Physical layer procedures for data (Release 17)," 3GPP TS 38.214 V17.2.0 , Jun. 2022, 229 pages.

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages,.

"3rd Generation Partnership Project; Technical Specification Group Radio Access Network; NR; Physical layer procedures for data (Release 17)", 3GPP TS 38.214 V17.1.0, Mar. 2022, 225 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"5G; NR; NR and NG-RAN Overall description; Stage-2 (3GPP TS 38.300 version 17.0.0 Release 17)", ETSI TS 138 300 V17.0.0, May 2022, 207 pages.

"3rd Generation Partnership Project; Technical Specification Group Radio Access Network; NR; User Equipment (UE) feature list (Release 16)", 3GPP TR 38.822 V16.3.0, Mar. 2022, 201 pages.

Extended European Search Report issued Sep. 24, 2025 regarding Application No. 23843370.0, 11 pages.

CATT, "Discussion on multi-cell PUSCH/PDSCH scheduling with a single DCI", 3GPP TSG RAN WG1 #109-e, R1-2203448, May 2022, 4 pages.

"3rd Generation Partnership Project; Technical Specification Group Radio Access Network; NR; Multiplexing and channel coding (Release 17)", 3GPP TS 38.212 V1 7.2.0, Jun. 2022, 201 pages.

* cited by examiner

600

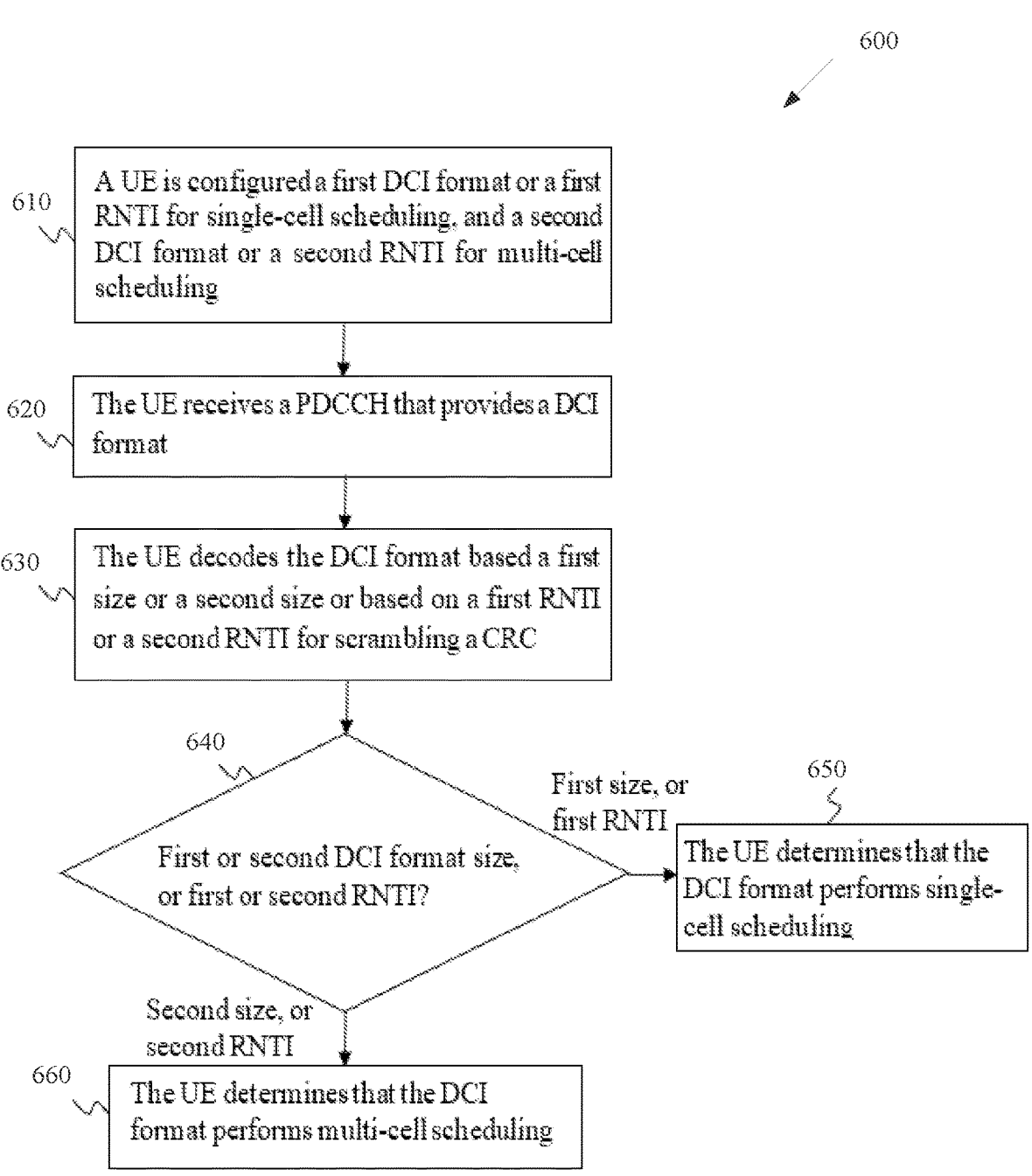

610   A UE is configured a first DCI format or a first RNTI for single-cell scheduling, and a second DCI format or a second RNTI for multi-cell scheduling 620   The UE receives a PDCCH that provides a DCI format 630   The UE decodes the DCI format based a first size or a second size or based on a first RNTI or a second RNTI for scrambling a CRC 640   First or second DCI format size, or first or second RNTI?

First size, or first RNTI

650   The UE determines that the DCI format performs single-cell scheduling

Second size, or second RNTI

660   The UE determines that the DCI format performs multi-cell scheduling

FIG. 6

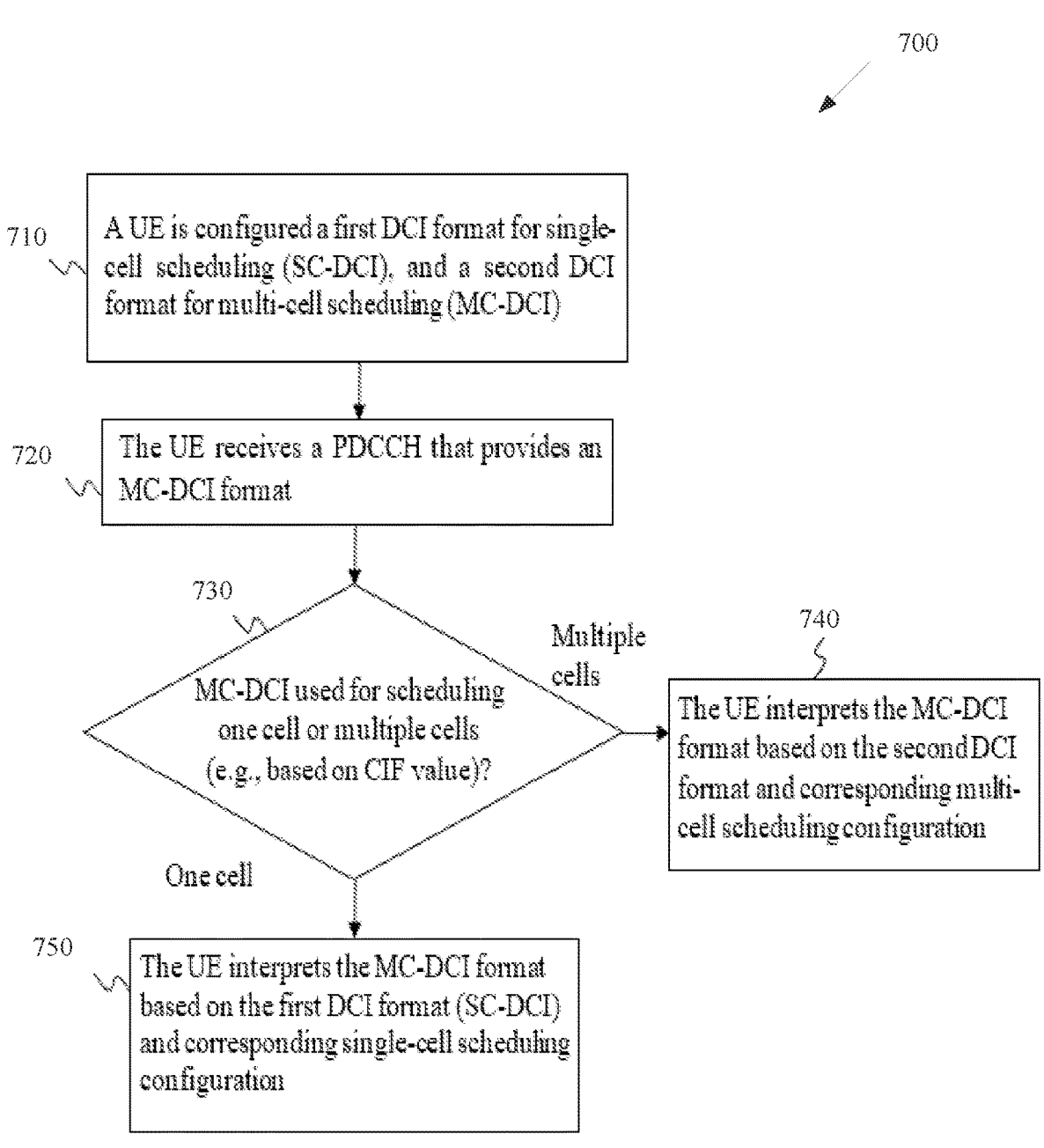

700

710  A UE is configured a first DCI format for single-cell scheduling (SC-DCI), and a second DCI format for multi-cell scheduling (MC-DCI)

720  The UE receives a PDCCH that provides an MC-DCI format

730  MC-DCI used for scheduling one cell or multiple cells (e.g., based on CIF value)?

Multiple cells

740  The UE interprets the MC-DCI format based on the second DCI format and corresponding multi-cell scheduling configuration One cell 750  The UE interprets the MC-DCI format based on the first DCI format (SC-DCI) and corresponding single-cell scheduling configuration

FIG. 7

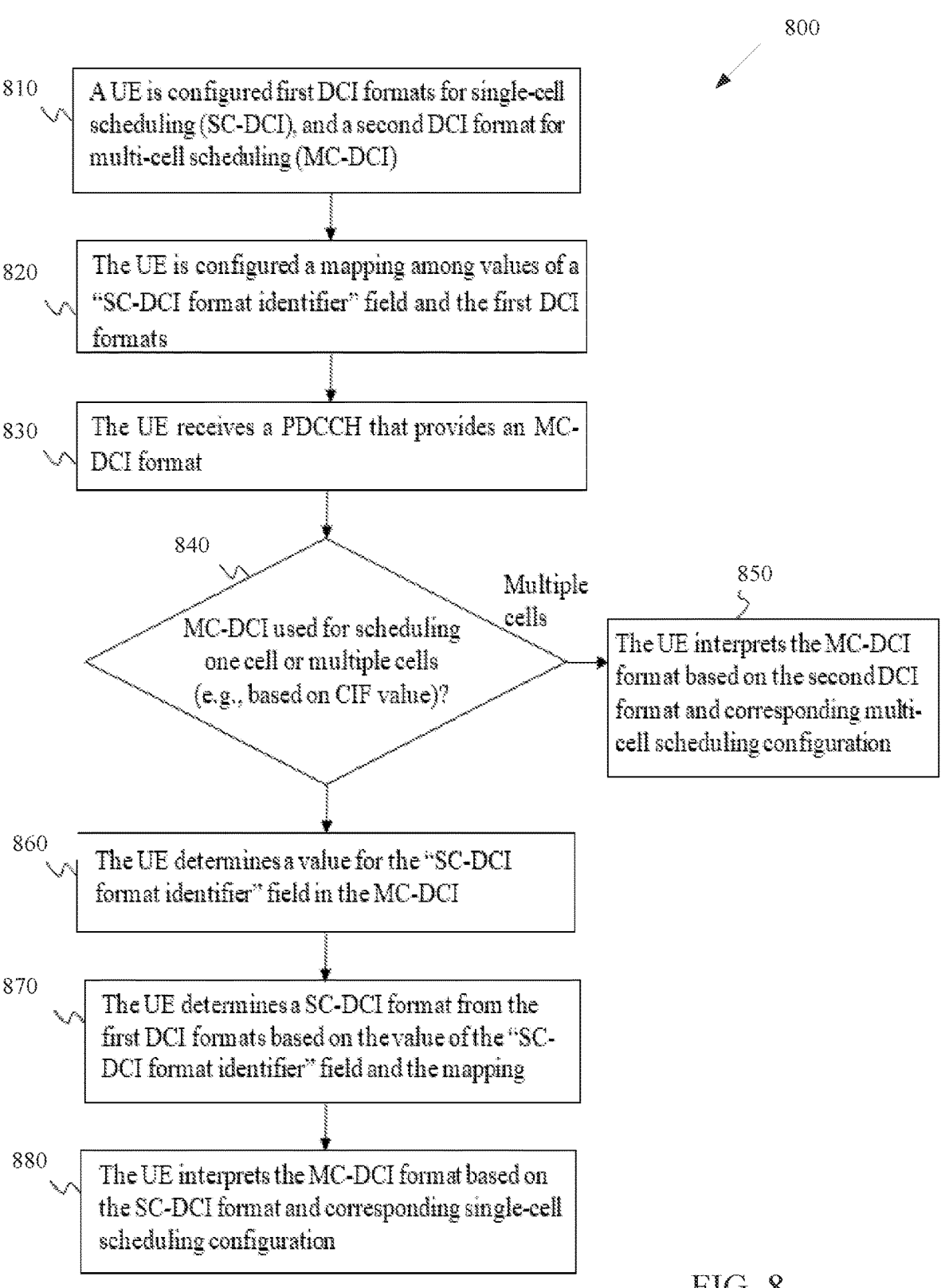

800

810  A UE is configured first DCI formats for single-cell scheduling (SC-DCI), and a second DCI format for multi-cell scheduling (MC-DCI)

820  The UE is configured a mapping among values of a "SC-DCI format identifier" field and the first DCI formats 830  The UE receives a PDCCH that provides an MC-DCI format 840  MC-DCI used for scheduling one cell or multiple cells (e.g., based on CIF value)?

Multiple cells

850  The UE interprets the MC-DCI format based on the second DCI format and corresponding multi-cell scheduling configuration 860  The UE determines a value for the "SC-DCI format identifier" field in the MC-DCI 870  The UE determines a SC-DCI format from the first DCI formats based on the value of the "SC-DCI format identifier" field and the mapping 880  The UE interprets the MC-DCI format based on the SC-DCI format and corresponding single-cell scheduling configuration

FIG. 8

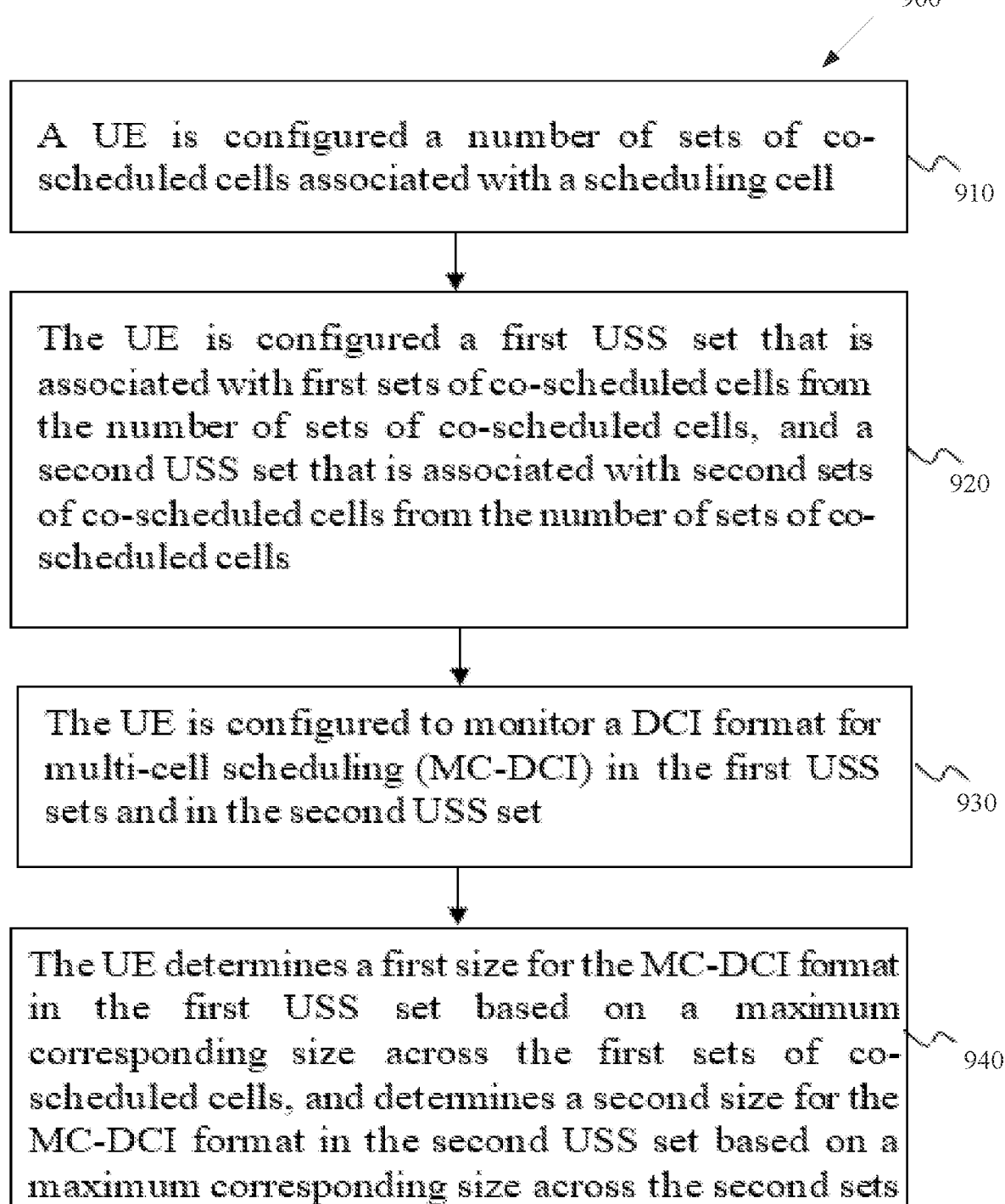

900

A UE is configured a number of sets of co-scheduled cells associated with a scheduling cell

910

The UE is configured a first USS set that is associated with first sets of co-scheduled cells from the number of sets of co-scheduled cells, and a second USS set that is associated with second sets of co-scheduled cells from the number of sets of co-scheduled cells

920

The UE is configured to monitor a DCI format for multi-cell scheduling (MC-DCI) in the first USS sets and in the second USS set

930

The UE determines a first size for the MC-DCI format in the first USS set based on a maximum corresponding size across the first sets of co-scheduled cells, and determines a second size for the MC-DCI format in the second USS set based on a maximum corresponding size across the second sets of co-scheduled cells

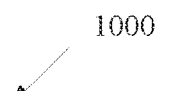

A UE is configured a number of sets of co-scheduled cells associated with a scheduling cell ⎞ 1010

The UE is configured a first USS set that is associated with first sets of co-scheduled cells from the number of sets of co-scheduled cells, and a second USS set that is associated with second sets of co-scheduled cells from the number of sets of co-scheduled cells ⎞ 1020

The UE is configured to monitor a DCI format for multi-cell scheduling (MC-DCI) in the first USS sets and in the second USS set ⎞ 1030

The UE determines, in both the first USS sets and the second USS set, a size for the MC-DCI format based on a maximum corresponding size across the number of sets of co-scheduled cells ⎞ 1040

FIG. 10

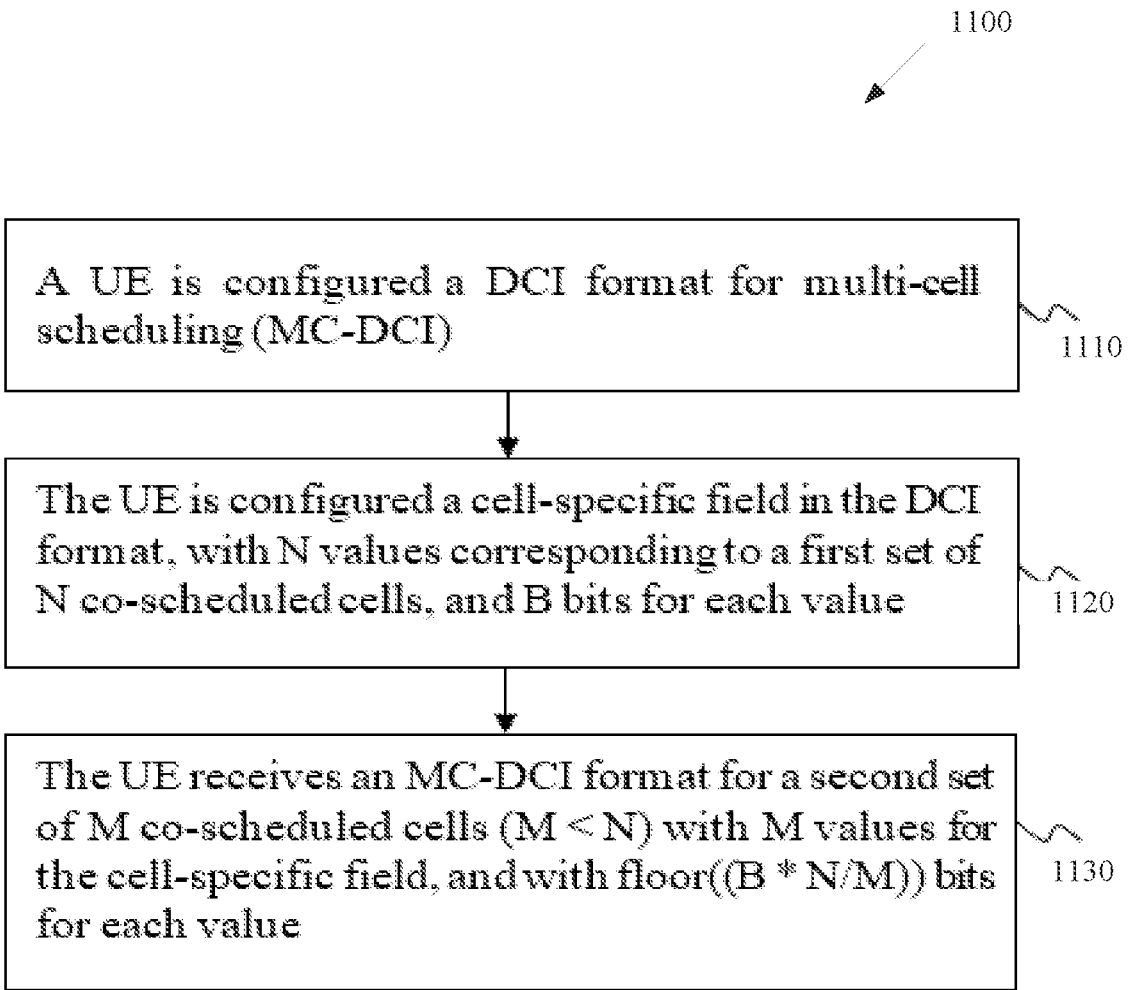

1100

A UE is configured a DCI format for multi-cell scheduling (MC-DCI)

1110

The UE is configured a cell-specific field in the DCI format, with N values corresponding to a first set of N co-scheduled cells, and B bits for each value

1120

The UE receives an MC-DCI format for a second set of M co-scheduled cells (M < N) with M values for the cell-specific field, and with floor((B * N/M)) bits for each value

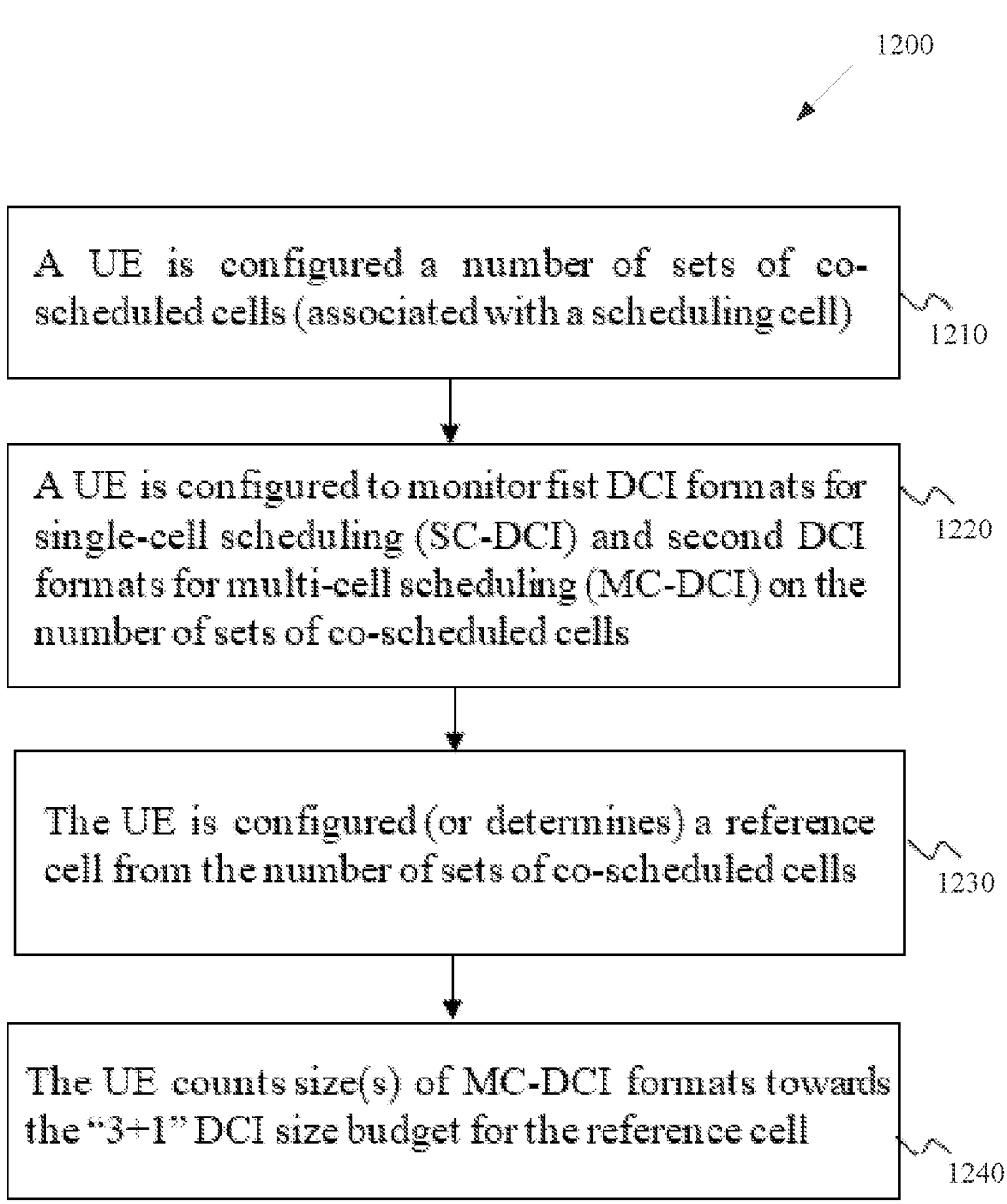

A UE is configured a number of sets of co-scheduled cells (associated with a scheduling cell)    1210

A UE is configured to monitor fist DCI formats for single-cell scheduling (SC-DCI) and second DCI formats for multi-cell scheduling (MC-DCI) on the number of sets of co-scheduled cells    1220

The UE is configured (or determines) a reference cell from the number of sets of co-scheduled cells    1230

The UE counts size(s) of MC-DCI formats towards the "3+1" DCI size budget for the reference cell    1240

FIG. 12

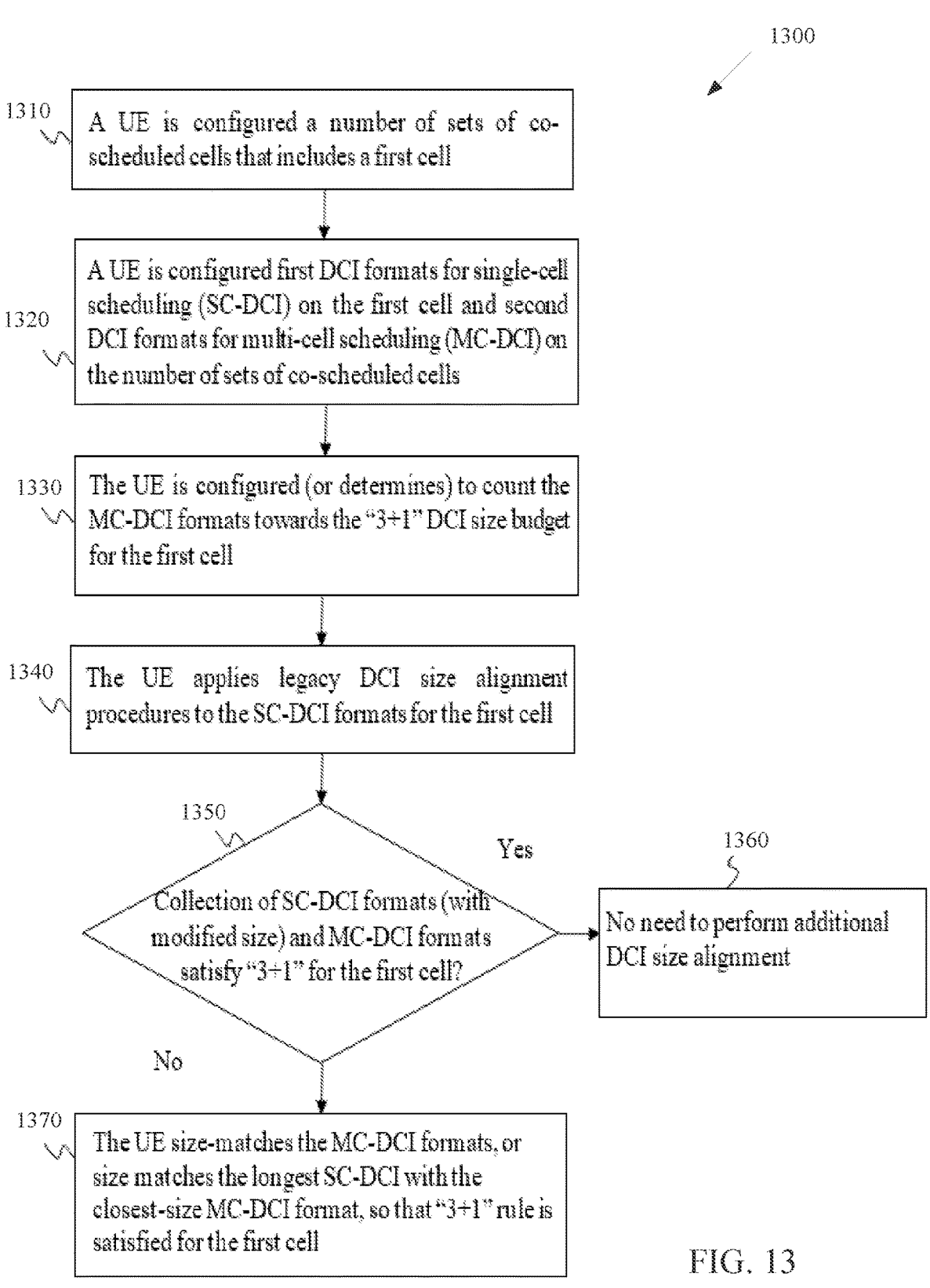

1300

1310  A UE is configured a number of sets of co-scheduled cells that includes a first cell 1320  A UE is configured first DCI formats for single-cell scheduling (SC-DCI) on the first cell and second DCI formats for multi-cell scheduling (MC-DCI) on the number of sets of co-scheduled cells 1330  The UE is configured (or determines) to count the MC-DCI formats towards the "3+1" DCI size budget for the first cell 1340  The UE applies legacy DCI size alignment procedures to the SC-DCI formats for the first cell 1350  Collection of SC-DCI formats (with modified size) and MC-DCI formats satisfy "3+1" for the first cell?

Yes

1360  No need to perform additional DCI size alignment

No

1370  The UE size-matches the MC-DCI formats, or size matches the longest SC-DCI with the closest-size MC-DCI format, so that "3+1" rule is satisfied for the first cell

FIG. 13

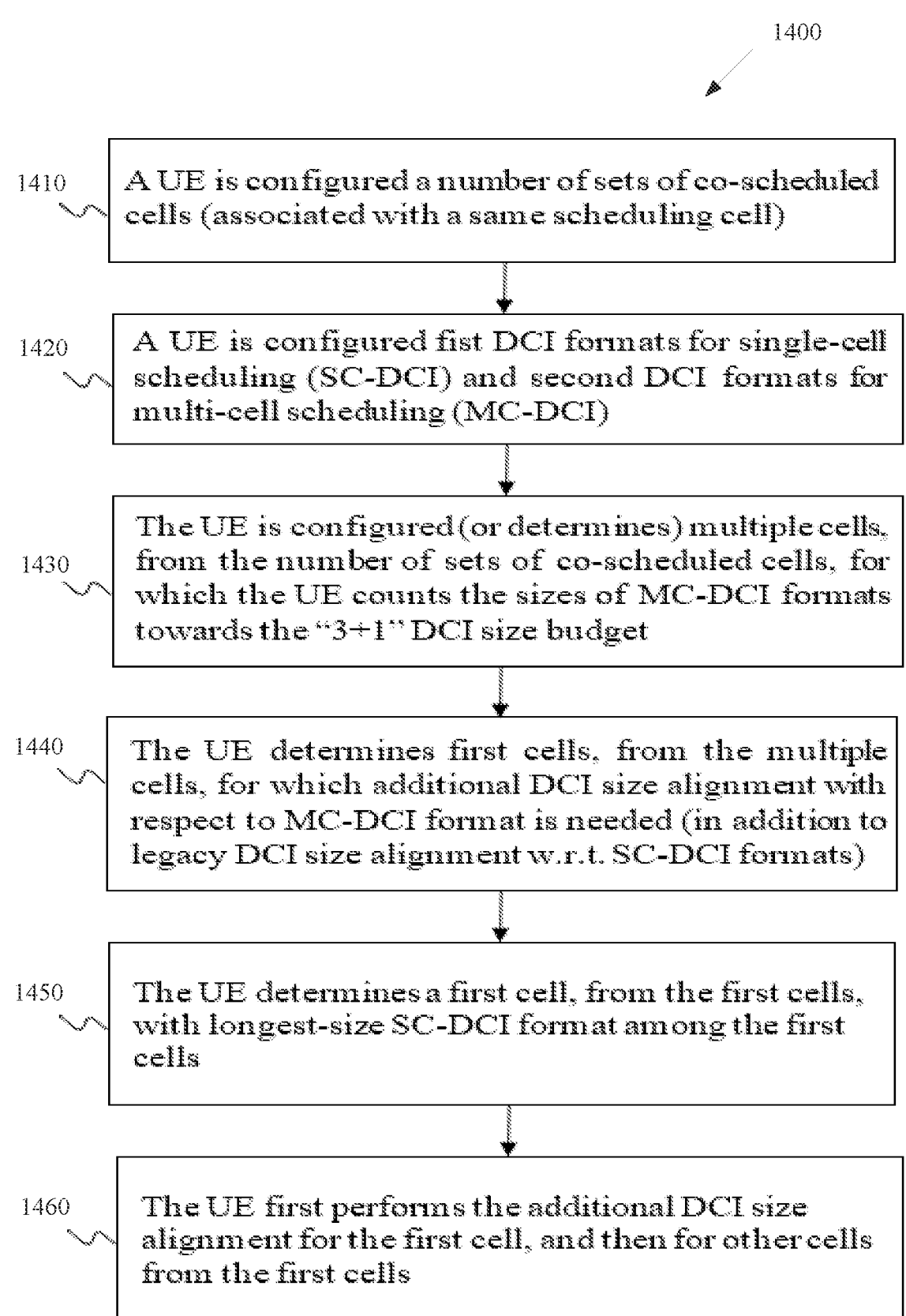

1400

1410 — A UE is configured a number of sets of co-scheduled cells (associated with a same scheduling cell)

1420 — A UE is configured fist DCI formats for single-cell scheduling (SC-DCI) and second DCI formats for multi-cell scheduling (MC-DCI)

1430 — The UE is configured (or determines) multiple cells, from the number of sets of co-scheduled cells, for which the UE counts the sizes of MC-DCI formats towards the "3+1" DCI size budget 1440 — The UE determines first cells, from the multiple cells, for which additional DCI size alignment with respect to MC-DCI format is needed (in addition to legacy DCI size alignment w.r.t. SC-DCI formats)

1450 — The UE determines a first cell, from the first cells, with longest-size SC-DCI format among the first cells 1460 — The UE first performs the additional DCI size alignment for the first cell, and then for other cells from the first cells

FIG. 14

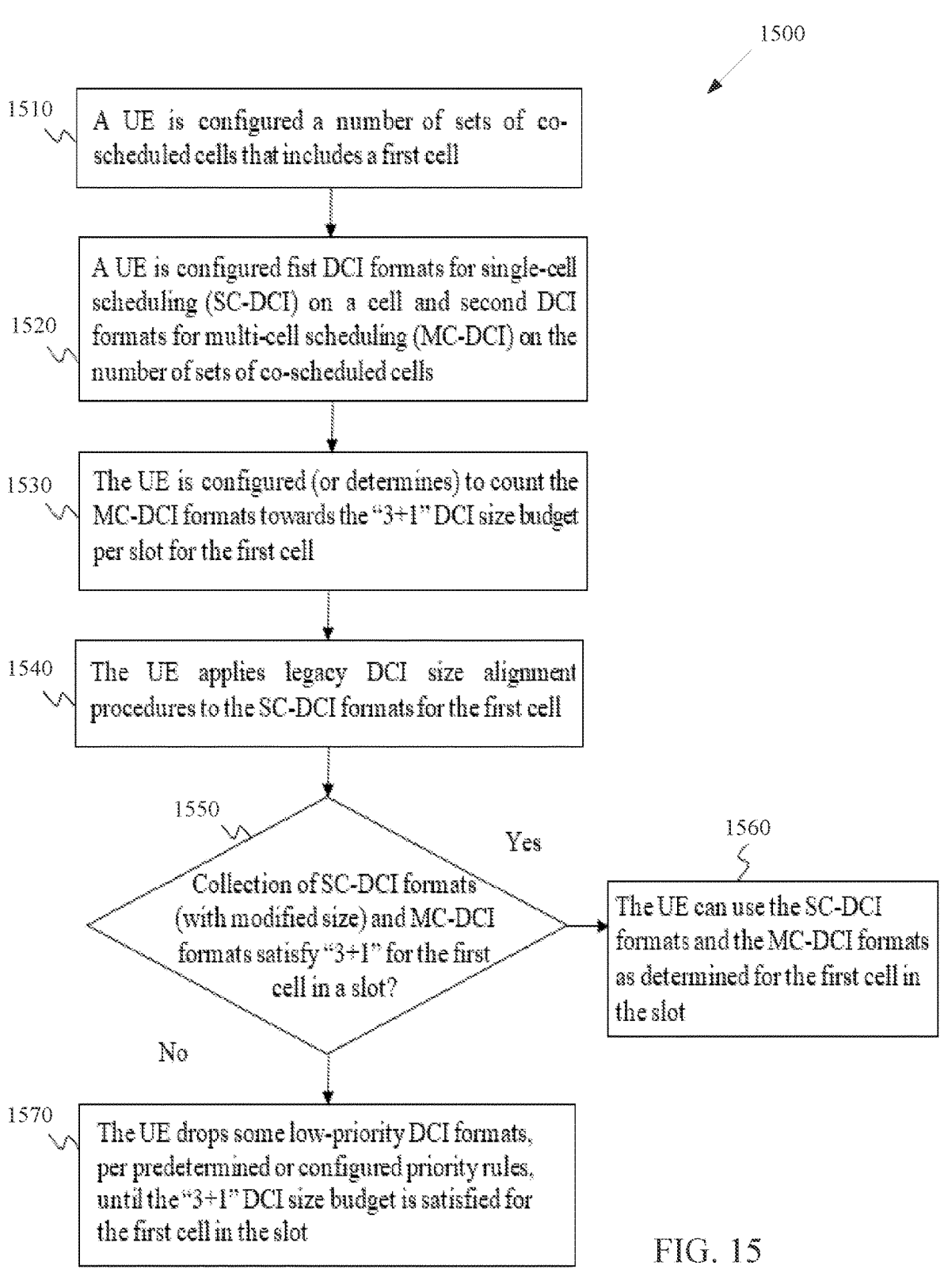

1500

1510   A UE is configured a number of sets of co-scheduled cells that includes a first cell 1520   A UE is configured fist DCI formats for single-cell scheduling (SC-DCI) on a cell and second DCI formats for multi-cell scheduling (MC-DCI) on the number of sets of co-scheduled cells 1530   The UE is configured (or determines) to count the MC-DCI formats towards the "3+1" DCI size budget per slot for the first cell 1540   The UE applies legacy DCI size alignment procedures to the SC-DCI formats for the first cell 1550   Collection of SC-DCI formats (with modified size) and MC-DCI formats satisfy "3+1" for the first cell in a slot?

Yes

1560   The UE can use the SC-DCI formats and the MC-DCI formats as determined for the first cell in the slot No 1570   The UE drops some low-priority DCI formats, per predetermined or configured priority rules, until the "3+1" DCI size budget is satisfied for the first cell in the slot

FIG. 15

METHOD AND APPARATUS FOR DCI SIZE FOR MULTI-CELL SCHEDULING

CROSS-REFERENCE TO RELATED APPLICATIONS AND CLAIM OF PRIORITY

The present application claims priority to: U.S. Provisional Patent Application No. 63/391,198, filed on Jul. 21, 2022, and U.S. Provisional Patent Application No. 63/446, 746, filed on Feb. 17, 2023. The contents of the above-identified patent documents are incorporated herein by reference.

TECHNICAL FIELD

The present disclosure relates generally to wireless communication systems and, more specifically, the present disclosure relates to a downlink control information (DCI) size for multi-cell scheduling in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a DCI size for multi-cell scheduling in a wireless communication system.

In one embodiment, a method is provided. The method includes receiving first information for a set of cells, identifying first combinations of cells from the set of cells, and determining a first maximum size among first sizes of a first DCI format. The first DCI format schedules physical downlink shared channel (PDSCH) receptions on a first combination of cells from the first combinations of cells, and the first sizes correspond to the first combinations of cells. The method further includes receiving the first DCI format based on the first maximum size.

In another embodiment, a user equipment (UE) is provided. The UE includes a transceiver configured to receive first information for a set of cells and a processor operably coupled to the transceiver. The processor is configured to identify first combinations of cells from the set of cells, identify second combinations of cells from the set of cells and determine a first maximum size among first sizes of a first DCI format. The first DCI format schedules PDSCH receptions on a first combination of cells from the first combinations of cells and the first sizes correspond to the first combinations of cells. The transceiver is further configured to receive the first DCI format based on the first maximum size.

In yet another embodiment, a base station is provided. The BS includes a transceiver configured to transmit first information for a set of cells and a processor operably coupled to the transceiver. The processor is configured to identify first combinations of cells from the set of cells, identify second combinations of cells from the set of cells and determine a first maximum size among first sizes of a first DCI format. The first DCI format schedules PDSCH transmissions on a first combination of cells from the first combinations of cells and the first sizes correspond to the first combinations of cells. The transceiver is further configured to transmit the first DCI format based on the first maximum size.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a flowchart of procedure for distinguishing a multi-cell scheduling DCI format from a single-cell scheduling DCI format according to embodiments of the present disclosure;

FIG. 7 illustrates a flowchart of procedure for interpreting a multi-cell scheduling DCI (MC-DCI) format as a single-cell scheduling DCI format according to embodiments of the present disclosure;

FIG. 8 illustrates a flowchart of procedure for interpreting a MC-DCI format as one from multiple SC-DCI formats based on indication in the MC-DCI according to embodiments of the present disclosure;

FIG. 9 illustrates a flowchart of procedure for determining a size of the MC-DCI format based on the search space set in which the UE monitors the MC-DCI format according to embodiments of the present disclosure;

FIG. 10 illustrates a flowchart of procedure for determining a size of the MC-DCI format that is common across different sets of co-scheduling co-scheduled cells associated with a scheduling cell according to embodiments of the present disclosure;

FIG. 11 illustrates a flowchart of procedure for determining a size of a cell-specific field in an MC-DCI format, with adjustable granularity based on the number of co-scheduled cells according to embodiments of the present disclosure;

FIG. 12 illustrates a flowchart of procedure for counting DCI sizes for MC-DCI formats for DCI size budget of a reference cell according to embodiments of the present disclosure;

FIG. 13 illustrates a flowchart of procedure for DCI size alignment for a cell for which a size of the MC-DCI format is counted towards the DCI size budget for the cell according to embodiments of the present disclosure;

FIG. 14 illustrates a flowchart of procedure for determining an order among cells with MC-DCI format configuration for which additional DCI size alignment is applied according to embodiments of the present disclosure; and FIG. 15 illustrates a flowchart of procedure for DCI size determination in the presence of MC-DCI formats based on a rule for "3+1" DCI size budget per slot according to embodiments of the present disclosure.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.1.0, "NR; Physical channels and modulation"; 3GPP TS 38.212 v17.1.0, "NR; Multiplexing and Channel coding"; 3GPP TS 38.213 v17.1.0, "NR; Physical Layer Procedures for Control"; 3GPP TS 38.214 v17.1.0, "NR; Physical Layer Procedures for Data"; 3GPP TS 38.321 v17.0.0, "NR; Medium Access Control (MAC) protocol specification," 3GPP TS 38.331 v17.0.0, "NR; Radio Resource Control (RRC) Protocol Specification"; and 3GPP TS 38.300 Rel-17 v17.0.0, "NR; NR and NG-RAN Overall Description; Stage 2"; and 3GPP TR 38.822 Rel-16 v16.3.0, "NR; User Equipment (UE) feature list."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
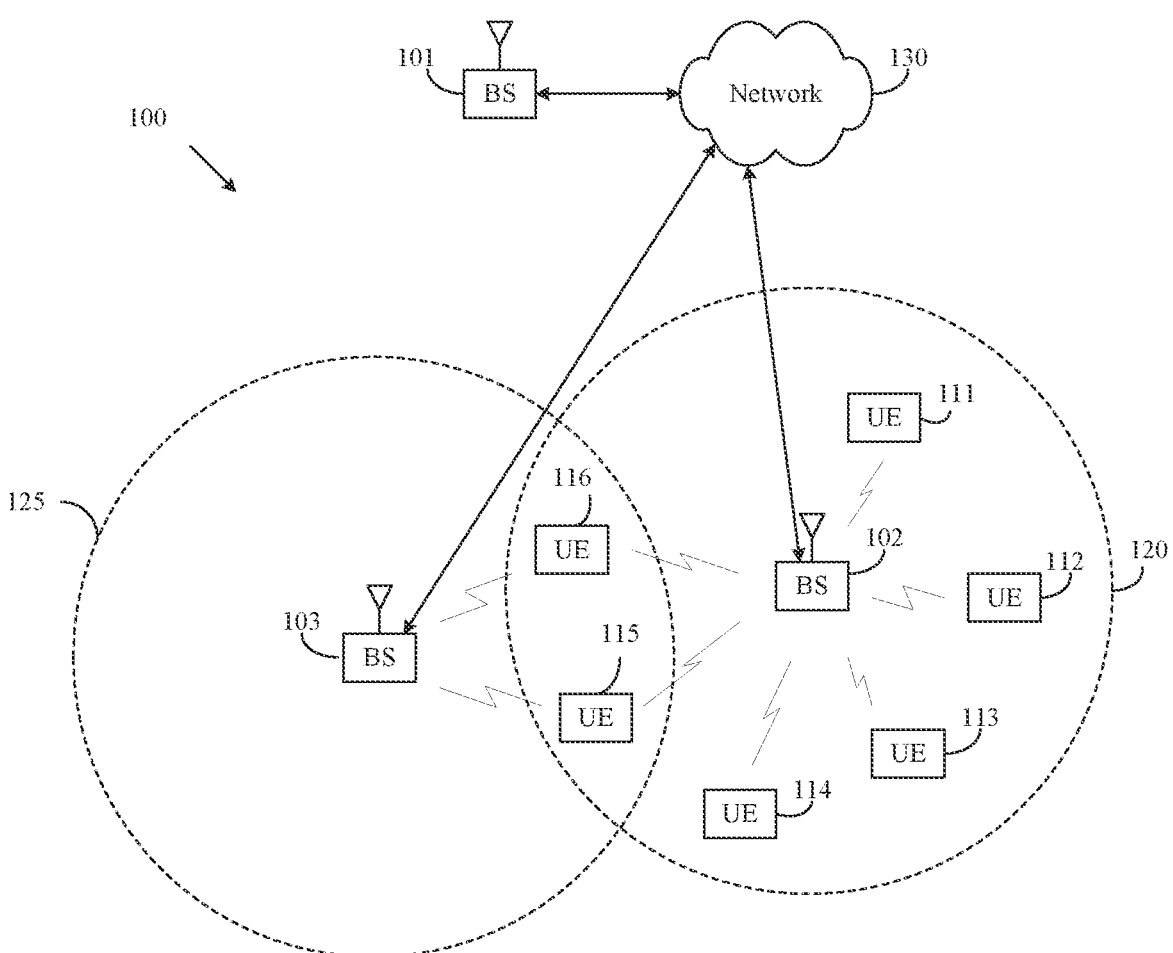
FIG. 1 illustrates an example of wireless network according to embodiments of the present disclosure.
Figure 2:
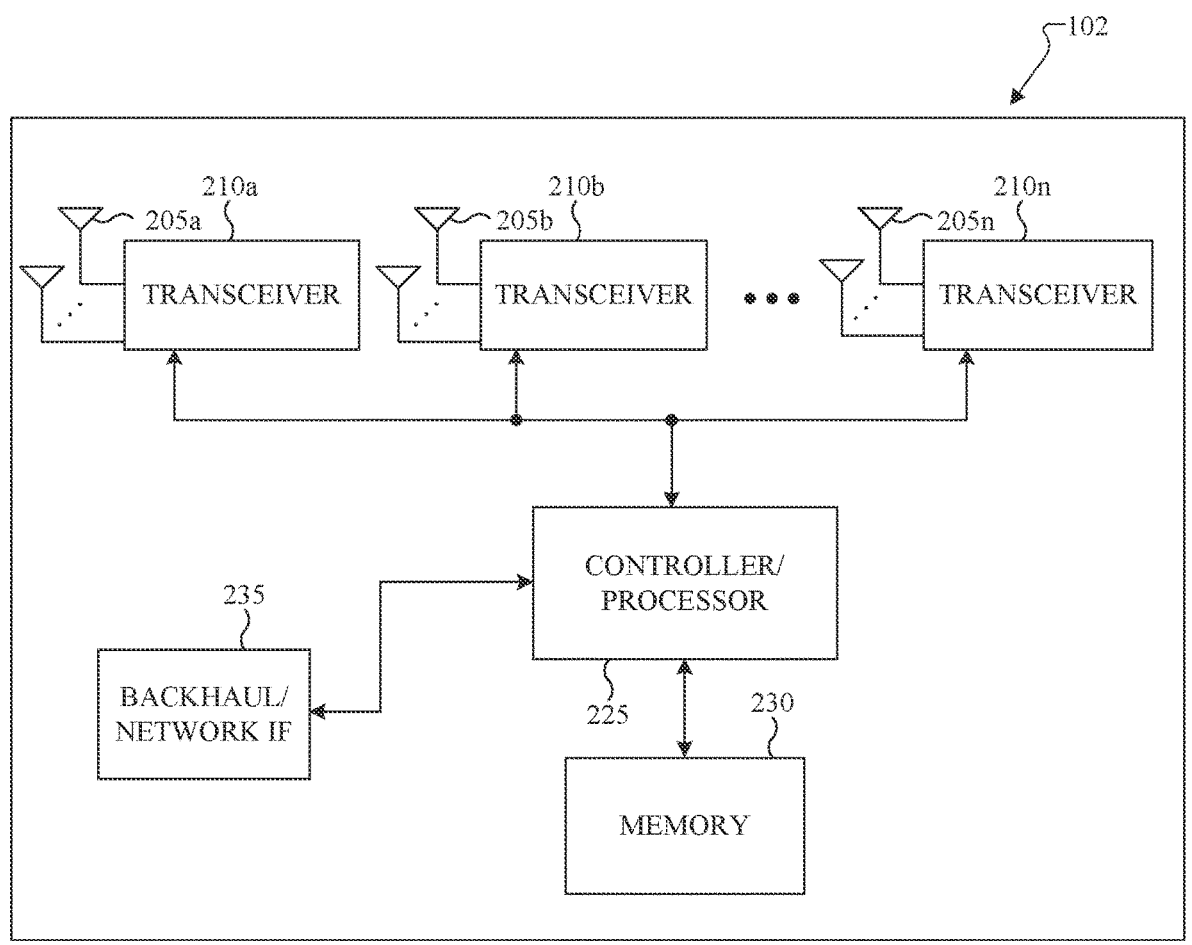
FIG. 2 illustrates an example of gNB according to embodiments of the present disclosure.
Figure 3:
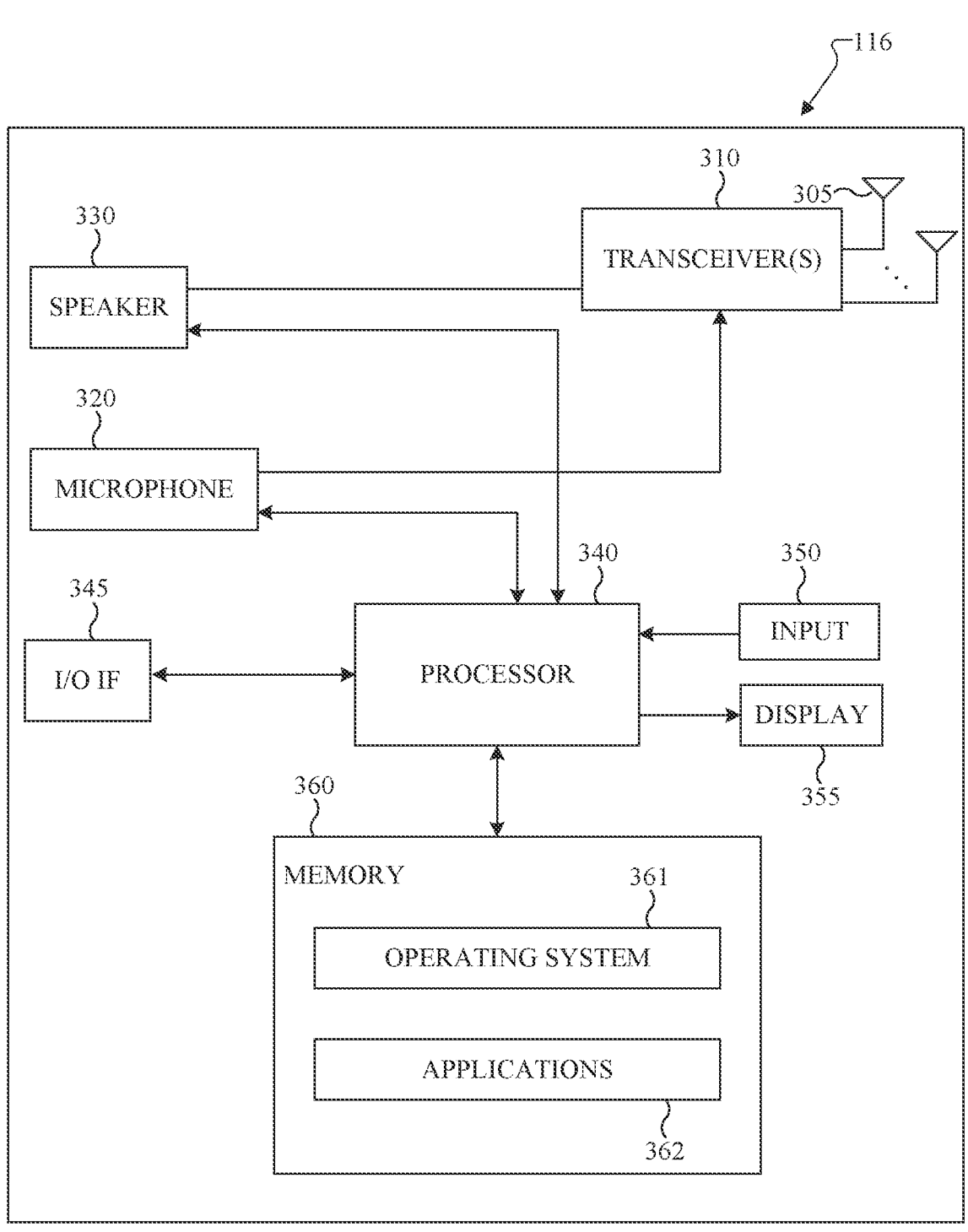
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for determining or utilizing a DCI size for multi-cell scheduling in a wireless communication system. In certain embodiments, and one or more of the gNBs 101-103 includes circuitry, programing, or a combination thereof, to support determination of a DCI size for multi-cell scheduling in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting determination of DCI sizes for multi-cell scheduling in a wireless communication system as discussed in embodiments of the present disclosure. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for determining or utilizing DCI sizes for multi-cell scheduling in a wireless communication system according to embodiments of the present disclosure.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
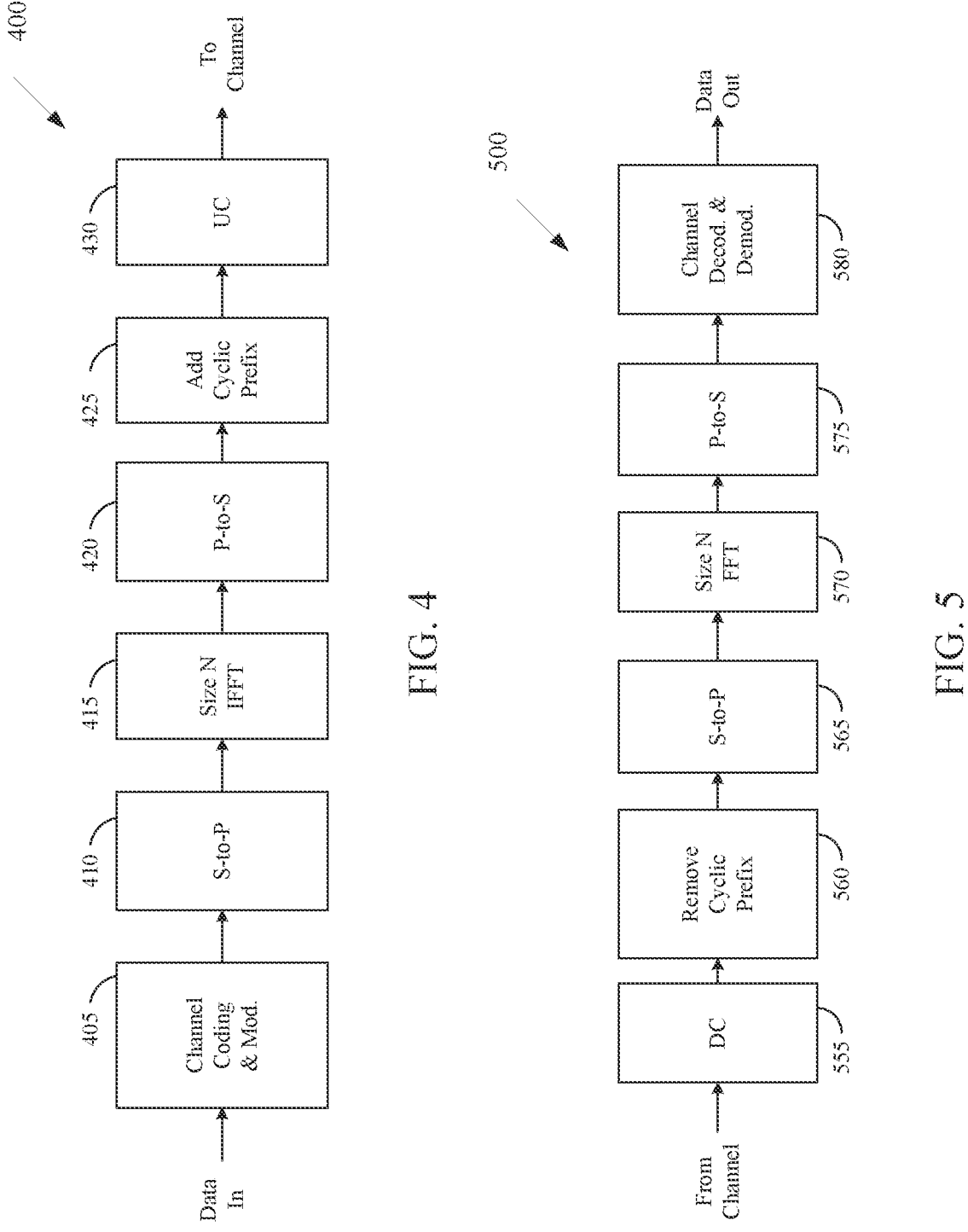
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support use or determination of a DCI size for multi-cell scheduling in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure relates to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

The present disclosure considers PDCCH monitoring aspects for cross-carrier scheduling operation in a carrier aggregation (CA) framework that supports joint scheduling of multiple cells.

In legacy 5G NR systems, a downlink or uplink data transmission can be scheduled only on a single serving cell. A DCI format provides scheduling information parameters for a PDSCH or a PUSCH on a single serving cell. If the serving cell is a scheduled cell, the UE receives a DCI format for the PDSCH/PUSCH in a PDCCH that the UE receives on a corresponding scheduling cell. In case of cross-carrier scheduling, based on a carrier indication field (CIF) in the DCI format, the UE can determine a serving cell on which the UE can receive the PDSCH or transmit the PUSCH.

A legacy NR system does not support joint scheduling of multiple PDSCHs or multiple PUSCH on multiple cells by using single/common control signaling, such as by using a single DCI format. For such operation, the UE receives multiple DCI formats, wherein each DCI format can schedule one of the multiple PDSCHs or PUSCHs. Such operation achieves the intended outcome, but introduces signaling overhead that is proportional to the number of scheduled PDSCHs or PUSCHs. In various scenarios, it is possible that several scheduling parameters or corresponding UE operations are shared/common among the multiple PDSCHs or PUSCHs on the "co-scheduled" cells.

For example, the UE may use a same PUCCH resource to transmit a PUCCH providing HARQ-ACK feedback corresponding to the multiple PDSCHs. Therefore, an indication for the same PUCCH resource (and corresponding operations for PUCCH transmission) in DCI formats scheduling PDSCH receptions on multiple cells at a same time may be unnecessarily repeated multiple times. In addition, in some scenarios, such as intra-band CA, it is likely that physical channel conditions are correlated, so various scheduling parameters such as for link adaptation, MIMO/beamforming operation, and possibly even resource allocation can be common and repeated among the co-scheduled cells. Such unnecessary overhead in control signaling can be significant, especially when the number of co-scheduled cells are large, such as 4-8 cells. Also, CRC bits need to be repeated in each of the DCI formats scheduling PDSCHs or PUSCHs on multiple cells which incurs significant signaling overhead, especially for a large number of scheduled cells/DCI formats.

Similar, PDCCH monitoring aspects in the legacy 5G NR system are based on single-cell scheduling mechanisms, with either self-carrier or cross-carrier scheduling procedures. In order to detect a single-cell scheduling DCI format, a UE needs to monitor PDCCH according to search space sets associated with one or more control resource sets (CORESETs) to receive and decode DCI formats for a number of PDCCH candidates. There are predetermined limits on the number of PDCCH candidates and a number of non-overlapping control channel elements (CCEs) that the UE can monitor in a slot, wherein the latter refers to channel estimation for the resources associated with the PDCCH candidates in the slot. In addition, the specifications support search space set overbooking procedures, wherein the UE can drop certain US-specific search space sets (USS sets) on a primary cell (with lowest priority, namely, with largest index) when the predetermined limits on the number of PDCCH candidates or the number of non-overlapping CCEs is/are exceeded.

A UE can be configured to monitor, on a scheduling cell, PDCCHs for detection of DCI formats performing multi-cell scheduling (MC-DCI) for PDSCHs or PUSCHs on a number of sets of co-scheduled cells. Such MC-DCI formats, similar to DCI formats for single-cell scheduling (SC-DCI), can be subject to a UE budget for a maximum number of DCI format sizes that the UE can decode. When a UE is not configured to monitor PDCCHs for detection of MC-DCI formats, the UE determines such DCI size budget per scheduled cell, for example per the "3+1" rule for the DCI size budget as described in TS 38.213 and the UE performs DCI size alignment procedures, when needed, to ensure the DCI size budget is met for each scheduled cell as described in TS 38.212.

There is a need for a procedure to identify how the UE determines a size of MC-DCI format. For example, whether a size of an MC-DCI format, or a bit-width of one or more fields in the MC-DCI format, depends on a number of co-scheduled cells or whether such size/bit-width is same regardless of the number of co-scheduled cells.

There is another need to determine whether/how sizes for MC-DCI formats contribute to a DCI size budget. For example, there is a need to determine whether the MC-DCI format is counted towards the DCI size budget for all co-scheduled cells, or only for some of the co-scheduled cells (such as only one cell), or for none of the co-scheduled cells.

There is a further need to describe how a UE applies DCI size alignment for cells for which the UE counts the size of an MC-DCI format towards the DCI size budget. It needs to be determined how the existing DCI size alignment procedure can be modified or whether to define new procedures to meet the DCI size budget when the UE is configured to monitor PDCCH for detection of MC-DCI formats.

The present disclosure provides method and apparatus for DCI size determination and alignment in case of multi-cell scheduling operation with reduced signaling overhead, such as when a set of serving cells are jointly scheduled, referred to as "co-scheduled" cells.

A size of an MC-DCI format can be determined based on a maximum size among different sets of co-scheduled cells, for example, corresponding to a set of co-scheduled cells with a largest number of cells, or corresponding to largest bit-widths for fields in the MC-DCI format. When an MC-DCI format schedules a set of co-scheduled cells with a smaller number of cells than the largest number of cells, some field values (for example, corresponding to non-scheduled cells) can be reserved, or such reserved bits can be used to indicate values for the smaller number of scheduled cells with larger granularity (for example, 2 FDRA values each with 10 bits in case of 2 scheduled cells, instead of 4 FDRA values each with 5 bits in case of a maximum of 4 scheduled cells).

The UE can be configured, or the UE can be (pre) determined, to count sizes of MC-DCI formats towards the DCI size budget for only a reference cell from a set of co-scheduled cell, or for all cells in the set of co-scheduled cells. For a cell that an MC-DCI format contributes to the DCI size budget, the UE first performs DCI size alignment only for SC-DCI formats, and when the DCI size budget is exceeded, the UE can perform additional DCI size alignment with respect to the MC-DCI formats. For example, the UE can size-match the downlink MC-DCI format for PDSCHs with the uplink MC-DCI format for PUSCHs, or the UE can size-match a largest SC-DCI format for a scheduled cell with a MC-DCI format that is closer in size to the largest SC-DCI format.

Different MC-DCI formats can have respective different reference cells for DCI size alignment. For example, an MC-DCI format scheduling PDSCH receptions on subsets of cells from a first set of co-scheduled cells can have a first cell from the first set of cells as a reference cell for DCI size alignment and an MC-DCI format scheduling PUSCH transmissions on subsets of cells from a second set of co-scheduled cells can have a second cell from the second set of cells as a reference cell for DCI size alignment. The first and second sets of cells can be same or different. The first cell and the second cell can be indicated by higher layer signaling or can be determined based on a rule defined in the specifications of the system operation such as a cell with a lowest index from the first or second set of cells where the "3+1" DCI size budget holds without any DCI size alignment, or based on the UE implementation based on a condition that the UE expects, for each MC-DCI format, the "3+1" DCI format size budget to be valid for at least one cell from a corresponding set of cells without requiring alignment of DCI format sizes.

In an alternative, a UE can apply a DCI size budget per slot, and when a DCI size budget is exceeded for a cell in a slot, the UE can drop some DCI formats based on configured or predetermined rules, such as predetermined priority rules for the DCI formats or corresponding search space sets. For example, the UE can prioritize PDCCH monitoring according to CSS sets for detection of first DCI formats, and continue with PDCCH monitoring according to USS sets (with MC-DCI format configuration) for detection of second DCI formats in ascending order of USS set indexes until the UE reaches a USS set index where PDCCH monitoring for detection of a DCI format from the second DCI format may exceed a DCI size budget for the cell. Accordingly, the UE can drop PDCCH monitoring associated for the second DCI format and, in general, for any DCI formats with additional/new DCI sizes that may result to increasing a DCI size budget for decoding of DCI formats.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively. In general, the embodiments apply to any deployments, verticals, or scenarios including inter-band CA, with eMBB, URLLC and IIoT and XR, mMTC and IoT, with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the disclosure for supporting PDCCH monitoring enhancements in case of multi-cell scheduling with reduced signaling overhead are summarized in the following and are fully elaborated further below.

In one embodiment, a UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells jointly by a single DCI format, or by using complementary embodiments such as those described in mentioned embodiment in the present disclosure. For convenience of presentation, such DCI format may be referred to as a multi-cell scheduling DCI (MC-DCI) format. The MC-DCI format can be a new DCI format, such as DCI format 0_3 for co-scheduled PUSCHs or DCI format 1_3 for co-scheduled PDSCHs.

Additionally, the UE can be indicated via a DCI format, such as the MC-DCI format, in a PDCCH, or via a MAC CE in a PDSCH, a subset of a set of co-scheduled cells, wherein cells of the subset can change across different PDCCH monitoring occasions (MOs). For example, a first MC-DCI format in a first MO can indicate a first set/subset of co-scheduled cells, and a second DCI format in a second MO can indicate a second set/subset of co-scheduled cells.

For a UE that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary embodiments.

When a UE is configured a set of co-scheduled cells including a first cell, the UE can receive a PDCCH with a DCI format that schedules a PDSCH reception or PUSCH transmission only on the first cell (single-cell scheduling DCI format). The UE can distinguish a single-cell scheduling DCI (SC-DCI) format from a multi-cell scheduling DCI (MC-DCI) format via various embodiments, such as a DCI format size, or an RNTI used for scrambling a CRC of a DCI format for multi-cell scheduling, or by an explicit indication or implicit indication by a field in the DCI format, or by a dedicated CORESET and associated search space sets.

In one embodiment, when an MC-DCI format, such as 0_3 or 1_3, is used for scheduling only a single cell, two different embodiments can be considered. In one embodiment, the MC-DCI format for scheduling one single cell has same structure/fields as an MC-DCI format for scheduling multiple cells, including any absent or disabled or restricted field(s). In one embodiment, the structure/fields of MC-DCI format when used for scheduling a single cell can be different from the structure/fields of MC-DCI format when used for scheduling multiple cells.

For a UE configured with one or more sets of co-scheduled cells, a size of a multi-cell-scheduling DCI format can be set-specific (where set refers to a set of co-scheduled cells), or set-size-specific (where set size refers to a size of a set of co-scheduled cells), or search space set specific, or scheduling cell specific, or common across different scheduling cells. In addition, the UE can be configured, for each field of the MC-DCI format, a same bit-width regardless of the set/number of co-scheduled cells, or different bit-widths depending on the set/number of co-scheduled cells. For a cell-specific field in the MC-DCI format with up to N values corresponding to a maximum of N co-scheduled cells, the UE can be configured a same bit-width for each of the N values, including any unused/reserved values for non-scheduled cells, or can be configured/determine different bit-widths based on the number of co-scheduled cells. The latter can be beneficial, for example, to provide an increased granularity level for the cell-specific fields when the MC-DCI co-schedules fewer cells.

In one embodiment, a UE can have a constraint/budget on a number of DCI format sizes that the UE can monitor PDCCH per serving cell, per slot or across all time slots, wherein a size of a DCI format for multi-cell scheduling can be counted towards the UE constraint/budget based on a fractional count or a full count, or as part of a separate UE constraint/budget for sizes of DCI formats, with counting for each/all co-scheduled cells or one/some co-scheduled cells, or not counted at all.

In one embodiment, when a UE: (1) is configured to monitor PDCCH for detection of an MC-DCI format; (2) is (pre)determined or configured to count a size of the MC-DCI format towards a UE budget for a maximum number of DCI sizes that the UE can monitor corresponding PDCCH for a cell (such as the "3+1" rule); and (3) determines that a counted number of DCI sizes for the cell exceeds the UE budget for the maximum number of DCI sizes for the cell.

The UE performs DCI size alignment for the cell based on predetermined or configured rules, so that a number of DCI sizes for the cell after the alignment does not exceed the UE budget for DCI format sizes. Such rules can include zero padding or truncating or dropping one or more of the DCI formats for scheduling on the cell. The UE applies the DCI size alignment to a predetermined or configured reference cell, or to any cell from sets of co-scheduled cells associated with a same scheduling cell. The DCI size alignment can include size matching for downlink MC-DCI (for co-schedule PDSCHs) and uplink MC-DCI (for co-scheduled PUSCHs), or size matching SC-DCI formats with largest sizes, such as a DCI format 1_1, with closest-size MC-DCI formats, or vice versa.

Throughout the present disclosure, the term "configuration" or "higher layer configuration" and variations thereof (such as "configured" and so on) are used to refer to one or more of: a system information signalling such as by a MIB or a SIB (such as SIB 1), a common or cell-specific higher layer/RRC signalling, or a dedicated or UE-specific or BWP-specific higher layer/RRC signalling.

Throughout the present disclosure, the term signal quality is used to refer to e.g., RSRP or RSRQ or RSSI or SNR or SINR, with or without filtering such as L1 or L3 filtering, of a channel or a signal such as a reference signal (RS) including SSB, CSI-RS, or SRS.

In carrier aggregation (CA), two or more Component Carriers (CCs) are aggregated. A UE may simultaneously receive or transmit on one or multiple CCs depending on its capabilities: (1) a UE with single timing advance capability for CA can simultaneously receive and/or transmit on multiple CCs corresponding to multiple serving cells sharing the same timing advance (multiple serving cells grouped in one TAG); (2) a UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell; and (3) a non-CA capable UE can receive on a single CC and transmit on a single CC corresponding to one serving cell only (one serving cell in one TAG).

CA is supported for both contiguous and non-contiguous CCs in frequency. When CA is deployed frame timing and SFN are aligned across cells that can be aggregated, or an offset in multiples of slots between the PCell/PSCell and an SCell is configured to the UE. The maximum number of configured CCs for a UE is 16 for DL and 16 for UL.

When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). Depending on UE capabilities, secondary cells (SCells) can be configured to form together with the PCell a set of serving cells. The configured set of serving cells for a UE therefore includes one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reduced UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform CQI measurements. Conversely, when an SCell is active, the UE may receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) may not be activated. NG-RAN ensures that SCells mapped to PUCCH SCell are deactivated before the PUCCH SCell is changed or removed.

When reconfiguring the set of serving cells: (1) SCells added to the set are initially activated or deactivated; and (2) SCells which remain in the set (either unchanged or reconfigured) do not change their activation status (activated or deactivated).

At handover or connection resume from RRC_INACTIVE: (1) SCells are activated or deactivated.

To enable reduced UE battery consumption when CA is configured and enable reduced UE complexity, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCell(s) or one or more SCell group(s).

The dormant BWP is one of the UE's dedicated BWPs configured by network via dedicated RRC signalling. The SpCell and PUCCH SCell cannot be configured with a dormant BWP.

Cross-carrier scheduling using a carrier indicator field (CIF) allows a DCI format provided by a PDCCH on a serving/scheduling cell to schedule resources on another serving/scheduled cell with the following restrictions: (1) when cross-carrier scheduling from an SCell to PCell is not configured to a UE, the UE can be scheduled transmission or reception on the PCell only by a DCI format provided by a PDCCH reception on the PCell; (2) when cross-carrier scheduling from an SCell to PCell is configured to a UE: (i) PDCCH on that SCell can provide a DCI format that schedules a PDSCH reception or a PUSCH transmission from the UE on the PCell; (ii) PDCCH on the PCell can provide a DCI format that schedules a PDSCH reception or a PUSCH transmission from the UE on the PCell; and (iii) Only one SCell can be configured to the UE for cross-carrier scheduling on the PCell; (3) when an SCell is configured to a UE as a scheduling cell, a PDSCH reception or a PUSCH transmission from the UE is scheduled by a DCI format provided by a PDCCH reception on the SCell; (4) when an SCell is not configured to a UE as a scheduling cell, a PDSCH reception or a PUSCH transmission from the UE is scheduled by a DCI format provided by a PDCCH reception on another serving cell; and (5) a PDCCH reception on a scheduling cell can have same or different numerology than an associated PDSCH reception or PUSCH transmission on a scheduled cell.

The physical downlink control channel (PDCCH) can be used to schedule DL transmissions on PDSCH and UL transmissions on PUSCH, where the Downlink Control Information (DCI) on PDCCH includes: (1) downlink assignments containing at least modulation and coding format, resource allocation, and hybrid-ARQ information related to DL-SCH; and (2) uplink scheduling grants containing at least modulation and coding format, resource allocation, and hybrid-ARQ information related to UL-SCH.

In addition to scheduling, PDCCH can be used to for: (1) activation and deactivation of configured PUSCH transmission with configured grant; (2) activation and deactivation of PDSCH semi-persistent transmission; (3) notifying one or more UEs of the slot format; (4) notifying one or more UEs of the PRB(s) and OFDM symbol(s) where the UE may assume no transmission is intended for the UE; (5) transmission of TPC commands for PUCCH and PUSCH; (6) transmission of one or more TPC commands for SRS transmissions by one or more UEs; (7) switching a UE's active bandwidth part; (8) initiating a random access procedure; (8) indicating the UE(s) to monitor the PDCCH during the next occurrence of the DRX on-duration; (9) in IAB context, indicating the availability for soft symbols of an IAB-DU; (10) triggering one shot HARQ-ACK codebook feedback; and (11) for operation with shared spectrum channel access: (i) triggering search space set group switching; (ii) indicating one or more UEs about the available RB sets and channel occupancy time duration; and (iii) indicating downlink feedback information for configured grant PUSCH (CG-DFI).

A UE monitors a set of PDCCH candidates in the configured monitoring occasions in one or more configured COntrol REsource SETs (CORESETs) according to the corresponding search space sets configurations.

A CORESET includes a set of PRBs with a time duration of 1 to 3 OFDM symbols. The resource units resource element groups (REGs) and control channel elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for a DCI format in a PDCCH. Each resource element group carrying PDCCH carries its own DM-RS. QPSK modulation is used for coded symbols of a DCI format in a PDCCH.

A UE monitors a set of PDCCH candidates in one or more CORESETs on the active DL BWP on each activated serving cell configured with PDCCH monitoring according to corresponding search space sets where monitoring implies receiving each PDCCH candidate and decoding the received information after demodulation according to the monitored DCI formats for the PDCCH candidate.

If a UE is provided monitoringCapabilityConfig for a serving cell, the UE obtains an indication to monitor PDCCH on the serving cell for a maximum number of PDCCH candidates and non-overlapping CCEs: (1) per slot if monitoringCapabilityConfig=r15monitoringcapability, or (2) per span if monitoringCapabilityConfig= r16monitoringcapability.

If the UE is not provided monitoringCapabilityConfig, the UE monitors PDCCH on the serving cell for a maximum number of PDCCH candidates and non-overlapping CCEs per slot.

A UE can indicate a capability to monitor PDCCH according to one or more of the combinations (X, Y)=(2, 2), (4, 3), and (7, 3) per SCS configuration of $\mu$=0 and $\mu$=1. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

If a UE can support: (1) a first set of $$N_{cells,0}^{DL}$$

serving cells where the UE is either not provided coresetPoolIndex or is provided coresetPoolIndex with a single value for all CORESETs on all DL BWPs of each scheduling cell from the first set of serving cells, and (2) a second set of $$N_{cells,1}^{DL}$$

serving cells where the UE is not provided coresetPoolIndex or is provided coresetPoolIndex with a value 0 for a first CORESET, and with a value 1 for a second CORESET on any DL BWP of each scheduling cell from the second set of serving cells.

The UE determines, for the purpose of reporting pdcch-BlindDetectionCA, a number of serving cells as $$N_{cells,0}^{DL} + R \cdot N_{cells,1}^{DL}$$

where R is a value reported by the UE.

If a UE indicates in UE-NR-Capability a carrier aggregation capability larger than 4 serving cells and the UE is not provided monitoringCapabilityConfig for any downlink cell or if the UE is provided monitoringCapabilityConfig= r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells.

When a UE is not configured for NR-DC operation, the UE determines a capability to monitor a maximum number of PDCCH candidates and a maximum number of non-overlapped CCEs per slot that corresponds to $$N_{cells}^{cap}$$

downlink cells, where:

$$N_{cells}^{cap} \text{ is } N_{cells,0}^{DL} + R \cdot N_{cells,1}^{DL} \qquad (1)$$

if the UE does not provide pdcch-BlindDetectionCA where $$N_{cells,0}^{DL} + N_{cells,1}^{DL}$$

is the number of configured downlink serving cells; and (2) otherwise, $$N_{cells}^{cap}$$

is the value of pdcch-BlindDetectionCA.

When a UE is configured for NR-DC operation, the UE determines a capability to monitor a maximum number of PDCCH candidates and a maximum number of non-overlapped CCEs per slot that corresponds to $$N_{cells}^{cap} = N_{cells}^{MCG}$$

downlink cells for the MCG where $$N_{cells}^{MCG}$$

is provided by pdcch-BlindDetection for the MCG and determines a capability to monitor a maximum number of PDCCH candidates and a maximum number of non-overlapped CCEs per slot that corresponds to $$N_{cells}^{cap} = N_{cells}^{SCG}$$

downlink cells for the SCG where $$N_{cells}^{SCG}$$

is provided by pdcch-BlindDetection for the SCG. When the UE is configured for carrier aggregation operation over more than 4 cells, or for a cell group when the UE is configured for NR-DC operation, the UE does not expect to monitor per slot a number of PDCCH candidates or a number of non-overlapped CCEs that is larger than the maximum number as derived from the corresponding value of $$N_{cells}^{cap},$$

If a UE indicates in UE-NR-Capability-r16 a carrier aggregation capability larger than two downlink cells, the UE includes in UE-NR-Capability-r16 an indication for a maximum number of PDCCH candidates and a maximum number of non-overlapped CCEs that the UE can monitor per span when the UE is configured for carrier aggregation operation over more than two downlink cells with monitoringCapabilityConfig=r16monitoringcapability. When a UE is not configured for NR-DC operation and the UE is provided monitoringCapabilityConfig=r16monitoringcapability for all downlink cell where the UE monitors PDCCH, the UE determines a capability to monitor a maximum number of PDCCH candidates and a maximum number of non-overlapped CCEs per span that corresponds to $$N_{cells}^{cap-r16}$$

downlink cells, where:

$$N_{cells}^{cap-r16} \qquad (1)$$

is the number of configured downlink cells if the UE does not provide pdcch-MonitoringCA; and (2) otherwise, $$N_{cells}^{cap-r16}$$

is the value of pdcch-MonitoringCA.

When the UE is configured for carrier aggregation operation over more than 2 cells, or for a cell group when the UE is configured for NR-DC operation, the UE does not expect to monitor per span a number of PDCCH candidates or a number of non-overlapped CCEs that is larger than the maximum number as derived from the corresponding value of $$N_{cells}^{cap-r16}.$$

If a UE indicates in UE-NR-Capability a carrier aggregation capability larger than one downlink cell with monitoringCapabilityConfig=r15monitoringcapability or larger than one downlink cell with monitoringCapabilityConfig=r16monitoringcapability, the UE includes in UE-NR-Capability-r16 an indication for a maximum number of PDCCH candidates and a maximum number of non-overlapped CCEs the UE can monitor for downlink cells with monitoringCapabilityConfig= r15monitoringcapability or for downlink cells with monitoringCapabilityConfig=r16monitoringcapability when the UE is configured for carrier aggregation operation over more than two downlink cells with at least one downlink cell with monitoringCapabilityConfig=r15monitoringcapability and at least one downlink cell with monitoringCapabilityConfig=r16monitoringcapability.

When a UE is not configured for NR-DC operation, the UE determines a capability to monitor a maximum number of PDCCH candidates and a maximum number of non-overlapped CCEs per slot or per span that corresponds to $$N_{cells,r15}^{cap-r16}$$

downlink cells or to $$N_{cells,r16}^{cap-r16}$$

downlink cells, respectively, where:

$$N_{cells,r15}^{cap-r16}$$

is the number of configured downlink cells if the UE does not provide pdcch-BlindDetectionCA1 otherwise: (1) if the UE reports only one combination of (pdcch-BlindDetectionCA1, pdcch-BlindDetectionCA2), $$N_{cells,r15}^{cap-r16}$$

is the value of pdcch-BlindDetectionCA1, else, $$N_{cells,r15}^{cap-r16}$$

is the value of pdcch-BlindDetectionCA1 from a combination of (pdcch-BlindDetectionCA1, pdcch-BlindDetectionCA2) that is provided by pdcch-BlindDetectionCA-CombIndicator, and $$N_{cells,r16}^{cap-r16}$$

is the number of configured downlink cells if the UE does not provide pdcch-BlindDetectionCA2, otherwise: (1) if the UE reports only one combination of (pdcch-BlindDetectionCA1, pdcch-BlindDetectionCA2)

$$N_{cells,r16}^{cap-r16}$$

is the value of pdcch-BlindDetectionCA2; (2) else, $$N_{cells,r16}^{cap-r16}$$

is the value of pdcch-BlindDetectionCA2 from a combination of (pdcch-BlindDetectionCA1, pdcch-BlindDetectionCA2) that is provided by pdcch-BlindDetectionCA-CombIndicator.

A set of PDCCH candidates for a UE to monitor is defined in terms of PDCCH search space sets. A search space set can be a CSS set or a USS set. A UE monitors PDCCH candidates in one or more of the following search spaces sets.

In one example, a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG.

In another example, a Type0A-PDCCH CSS set configured by searchSpaceOtherSystemInformation in PDCCH- SearchSpace, ra-SearchSpace, or a CSS set by PDCCH-Config, and (2) a SI-RNTI, a P-RNTI, a RA-RNTI, a MsgB-RNTI, a SFI-RNTI, an INT-RNTI, a TPC-PUSCH-RNTI, a TPC-PUCCH-RNTI, or a TPC-SRS-RNTI then, for a RNTI from any of these RNTIs, the UE does not expect to process information from more than one DCI format with CRC scrambled with the RNTI per slot.

For each DL BWP configured to a UE in a serving cell, the UE can be provided by higher layer signalling with: (1) $P \le 3$ CORESETs if coresetPoolIndex is not provided, or if a value of coresetPoolIndex is same for all CORESETs if coresetPoolIndex is provided; and (2) $P \le$CORESETs if coresetPoolIndex is not provided for a first CORESET, or is provided and has a value 0 for a first CORESET, and is provided and has a value 1 for a second CORESET.

For each CORESET, the UE is provided the following by ControlResourceSet as shown in TABLE 1.

TABLE 1

- a CORESET index p, by controlResourceSetId or by controlResourceSetId-v1610, where
  - $0 < p < 12$ if coresetPoolIndex is not provided, or if a value of coresetPoolIndex is same for all CORESETs if coresetPoolIndex is provided;
  - $0 < p < 16$ if coresetPoolIndex is not provided for a first CORESET, or is provided and has a value 0 for a first CORESET, and is provided and has a value 1 for a second CORESET;
- a DM-RS scrambling sequence initialization value by pdcch-DMRS-ScramblingID;
- a precoder granularity for a number of REGs in the frequency domain where the UE can assume use of a same DM-RS precoder by precoderGranularity;
- a number of consecutive symbols provided by duration;
- a set of resource blocks provided by frequencyDomainResources;
- CCE-to-REG mapping parameters provided by cce-REG-MappingType;
- an antenna port quasi co-location, from a set of antenna port quasi co-locations provided by TCI-State, indicating quasi co-location information of the DM-RS antenna port for PDCCH reception in a respective CORESET;
  - if the UE is provided by simultaneousTCI-UpdateList1 or simultaneousTCI-UpdateList2 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command
- an indication for a presence or absence of a transmission configuration indication (TCI) field for a DCI format, other than DCI format 1_0, that schedules PDSCH receptions or indicates SPS PDSCH release or indicates SCell dormancy or indicates a request for a Type-3 HARQ-ACK codebook report without scheduling PDSCH and is transmitted by a PDCCH in CORESET p, by tci-PresentInDCI or tci-PresentDCI-1-2.

ConfigCommon for a DCI format with CRC scrambled by a SI-RNTI on the primary cell of the MCG.

In yet another example, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell.

In yet another example, a Type2-PDCCH CSS set configured by pagingSearchSpace in PDCCH-ConfigCommon for a DCI format with CRC scrambled by a P-RNTI on the primary cell of the MCG.

In yet another example, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

If a UE is provided: (1) one or more search space sets by corresponding one or more of searchSpaceZero, searchSpaceSIB1, searchSpaceOtherSystemInformation, paging- When precoderGranularity=allContiguousRBs, a UE does not expect: (1) to be configured a set of resource blocks of a CORESET that includes more than four sub-sets of resource blocks that are not contiguous in frequency; and (2) any RE of a CORESET to overlap with any RE determined from lte-CRS-ToMatchAround, or from LTE-CRS-Pattern-List, or with any RE of a SS/PBCH block.

For each CORESET in a DL BWP of a serving cell, a respective frequencyDomainResources provides a bitmap: (1) if a CORESET is not associated with any search space set configured with freqMonitorLocations, the bits of the bitmap have a one-to-one mapping with non-overlapping groups of 6 consecutive PRBs, in ascending order of the PRB index in the DL BWP bandwidth of $$N_{RB}^{BWP}$$

PRBs with starting common RB position $$N_{BWP}^{start},$$

where the first common RB of the first group of 6 PRBs has common RB index $$6 \cdot \lceil N_{BWP}^{start} / 6 \rceil$$

if rb-Offset is not provided, or the first common RB of the first group of 6 PRB s has common RB index $$N_{BWP}^{start} + N_{RB}^{offset} \text{ where } N_{RB}^{offset}$$

is provided by rb-Offset; and (2) if a CORESET is associated with at least one search space set configured with freqMonitorLocations, the first $$N_{RBG,set0}^{size}$$

bits of the bitmap have a one-to-one mapping with non-overlapping groups of 6 consecutive PRBs, in ascending order of the PRB index in each RB set k in the DL BWP bandwidth of $$N_{RB}^{BWP}$$

with starting common RB position $$RB_{s0+k,DL}^{start,\mu},$$

see REF 4, where the first common RB of the first group of 6 PRBs has common RB index $$RB_{s0+k,DL}^{start,\mu} + N_{RB}^{offset}$$

and k is indicated by freqMonitorLocations if provided for a search space set; otherwise, k=0.

$$N_{RBG,set0}^{size} = \lfloor (N_{RB,set0}^{size} - N_{RB}^{offset})/6 \rfloor, N_{RB,set0}^{size} \text{ Offset or } N_{RB}^{offset} = 0$$

is a number of available PRBs in the RB set 0 for the DL BWP, and $$N_{RB}^{offset}$$

is provided by rb $$c_{PDCCH}^{CSS}$$

if rb-Offset is not provided. If a UE is provided RB sets in the DL BWP, the UE expects that the RBs of the CORESET are within the union of the PRBs in the RB sets of the DL BWP.

For a CORESET other than a CORESET with index 0: (1) if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in REF 5, the UE assumes that the DM-RS antenna port associated with PDCCH receptions is quasi co-located with the SS/PBCH block the UE identified during the initial access procedure; and (2) if a UE has been provided a configuration of more than one TCI states by tci-StatesPDCCH-ToAddList and tci-StatesPDCCH-ToReleaseList for the CORESET as part of Reconfiguration with sync procedure as described in REF 6 but has not received a MAC CE activation command for one of the TCI states as described in REF 5, the UE assumes that the DM-RS antenna port associated with PDCCH receptions is quasi co-located with the SS/PBCH block or the CSI-RS resource the UE identified during the random access procedure initiated by the Reconfiguration with sync procedure as described in 3GPP standard specification.

For a CORESET with index 0, the UE assumes that a DM-RS antenna port for PDCCH receptions in the CORESET is quasi co-located with: (1) the one or more DL RS configured by a TCI state, where the TCI state is indicated by a MAC CE activation command for the CORESET, if any, or (2) a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that a CSI-RS configured with qcl-Type set to "typeD" in a TCI state indicated by a MAC CE activation command for the CORESET is provided by a SS/PBCH block: (1) if the UE receives a MAC CE activation command for one of the TCI states, the UE applies the activation command in the first slot that is after slot $$k + 3N_{slot}^{subframe,\mu}$$

where k is the slot where the UE may transmit a PUCCH with HARQ-ACK information for the PDSCH providing the activation command and μ is the SCS configuration for the PUCCH. The active BWP is defined as the active BWP in the slot when the activation command is applied.

The IE SearchSpace defines how/where to search for PDCCH candidates. Each search space is associated with one ControlResourceSet. For a scheduled cell in the case of cross carrier scheduling, except for nrofCandidates, all the optional fields are absent (regardless of their presence conditions). TABLE 2 shows information elements.

TABLE 2

```
SearchSpace information element
-- ASN1START
-- TAG-SEARCHSPACE-START
SearchSpace ::=                          SEQUENCE {
    searchSpaceId                        SearchSpaceId,
    controlResourceSetId                 ControlResourceSetId                    OPTIONAL,
-- Cond SetupOnly
    monitoringSlotPeriodicityAndOffset            CHOICE {
        sl1                     NULL,
        sl2                     INTEGER (0..1),
        sl4                     INTEGER (0..3),
        sl5                     INTEGER (0..4),
        sl8                     INTEGER (0..7),
        sl10                    INTEGER (0..9),
        sl16                    INTEGER (0..15),
        sl20                    INTEGER (0..19),
        sl40                    INTEGER (0..39),
        sl80                    INTEGER (0..79),
        sl160                   INTEGER (0..159),
        sl320                   INTEGER (0..319),
        sl640                   INTEGER (0..639),
        sl1280                  INTEGER (0..1279),
        sl2560                  INTEGER (0..2559)
    }                                                          OPTIONAL,
-- Cond Setup
    duration                    INTEGER (2..2559)              OPTIONAL, -- Need R
    monitoringSymbolsWithinSlot           BIT STRING (SIZE (14))           OPTIONAL,
-- Cond Setup
    nrofCandidates                       SEQUENCE {
        aggregationLevel1                ENUMERATED {n0, n1, n2, n3, n4, n5, n6, n8},
        aggregationLevel2                ENUMERATED {n0, n1, n2, n3, n4, n5, n6, n8},
        aggregationLevel4                ENUMERATED {n0, n1, n2, n3, n4, n5, n6, n8},
        aggregationLevel8                ENUMERATED {n0, n1, n2, n3, n4, n5, n6, n8},
        aggregationLevel16               ENUMERATED {n0, n1, n2, n3, n4, n5, n6, n8},
    }                                                          OPTIONAL,
-- Cond Setup
    searchSpaceType                      CHOICE {
        common                           SEQUENCE {
            dci-Format0-0-AndFormat1-0               SEQUENCE {
                ...
            }                                              OPTIONAL, -- Need R
            dci-Format2-0                SEQUENCE {
                nrofCandidates-SFI                   SEQUENCE {
                    aggregationLevel1                ENUMERATED {n1, n2}          OPTIONAL, -
- Need R
                    aggregationLevel2                ENUMERATED {n1, n2}          OPTIONAL, -
- Need R
                    aggregationLevel4                ENUMERATED {n1, n2}          OPTIONAL, -
- Need R
                    aggregationLevel8                ENUMERATED {n1, n2}          OPTIONAL, -
- Need R
                    aggregationLevel16               ENUMERATED {n1, n2}          OPTIONAL -
- Need R
                },
                ...
            }                                              OPTIONAL, -- Need R
            dci-Format2-1                SEQUENCE {
                ...
            }                                              OPTIONAL, -- Need R
            dci-Format2-2                SEQUENCE {
                ...
            }                                              OPTIONAL, -- Need R
            dci-Format2-3                SEQUENCE {
                dummy1                               ENUMERATED {sl1, sl2, sl4, sl5,
sl8, sl10, sl16, sl20}
OPTIONAL, -- Cond Setup
                dummy2                               ENUMERATED {n1, n2},
                ...
            }                                              OPTIONAL, -- Need R
        },
        ue-Specific                      SEQUENCE {
            dci-Formats                              ENUMERATED {formats0-0-And-1-0,
formats0-1-And-1-1},
            ...,
```

TABLE 2-continued

| | | |
|---|---|---|
| [[ | | |
| dci-Formats-MT-r16 | ENUMERATED {formats2-5} | OPTIONAL, -- Need R |
| dci-FormatsSL-r16 | ENUMERATED {formats0-0-And-1-0, | |
| formats0-1-And-1-1, formats3-0, formats3-1, | | |
| | formats3-0-And-3-1} | OPTIONAL, -- Need R |
| dci-FormatsExt-r16 | ENUMERATED {formats0-2-And-1-2, | |
| formats0-1-And-1-1And-0-2-And-1-2} | | |
| | | OPTIONAL -- Need R |
| ]] | | |
| } | | |
| } | | |
| } | OPTIONAL | |
| -- Cond Setup2 | | |
| } | | |
| SearchSpaceExt-r16 ::= | SEQUENCE { | |
| controlResourceSetId-r16 | ControlResourceSetId-r16 | OPTIONAL, -- Need R |
| Cond SetupOnly2 | | |
| searchSpaceType-r16 | SEQUENCE { | |
| common-r16 | SEQUENCE { | |
| dci-Format2-4-r16 | SEQUENCE { | |
| nrofCandidates-CI-r16 | SEQUENCE { | |
| aggregationLevel1-r16 | ENUMERATED {n1, n2} | OPTIONAL, |
| -- Need R | | |
| aggregationLevel2-r16 | ENUMERATED {n1, n2} | OPTIONAL, |
| -- Need R | | |
| aggregationLevel4-r16 | ENUMERATED {n1, n2} | OPTIONAL, |
| -- Need R | | |
| aggregationLevel8-r16 | ENUMERATED {n1, n2} | OPTIONAL, |
| -- Need R | | |
| aggregationLevel16-r16 | ENUMERATED {n1, n2} | OPTIONAL, |
| -- Need R | | |
| }, | | |
| ... | | |
| } | | OPTIONAL, -- Need R |
| dci-Format2-5-r16 | SEQUENCE { | |
| nrofCandidates-IAB-r16 | SEQUENCE { | |
| aggregationLevel1-r16 | ENUMERATED {n1, n2} | OPTIONAL, |
| -- Need R | | |
| aggregationLevel2-r16 | ENUMERATED {n1, n2} | OPTIONAL, |
| -- Need R | | |
| aggregationLevel4-r16 | ENUMERATED {n1, n2} | OPTIONAL, |
| -- Need R | | |
| aggregationLevel8-r16 | ENUMERATED {n1, n2} | OPTIONAL, |
| -- Need R | | |
| aggregationLevel16-r16 | ENUMERATED {n1, n2} | OPTIONAL |
| -- Need R | | |
| }, | | |
| ... | | |
| } | | OPTIONAL, -- Need R |
| dci-Format2-6-r16 | SEQUENCE{ | |
| ... | | |
| } | | OPTIONAL, -- Need R |
| ... | | |
| } | | |
| } | | OPTIONAL, |
| -- Cond Setup3 | | |
| searchSpaceGroupIdList-r16 | SEQUENCE (SIZE (1.. 2)) OF INTEGER (0..1) | |
| OPTIONAL, -- Need R | | |
| freqMonitorLocations-r16 | BIT STRING (SIZE (5)) | OPTIONAL -- Need R |
| } | | |
| -- TAG-SEARCHSPACE-STOP | | |
| | -- ASN1STOP | |

For each DL BWP configured to a UE in a serving cell, the UE is provided by higher layers with S≤10 search space sets where, for each search space set from the S search space sets, the UE is provided the following by SearchSpace as shown in TABLE 3.

TABLE 3

| SearchSpace |
|---|
| - a search space set index s, $0 < s < 40$ , by searchSpaceId |
| - an association between the search space set s and a CORESET p by controlResourceSetId or by controlResourceSetId-v1610 |

TABLE 3-continued

SearchSpace

- a PDCCH monitoring periodicity of $k_s$ slots and a PDCCH monitoring offset of $o_s$ slots, by monitoring SlotPeriodicityAndOffset
- a PDCCH monitoring pattern within a slot, indicating first symbol(s) of the CORESET within a slot for PDCCH monitoring, by monitoringSymbolsWithinSlot
- a duration of $T_s < k_s$ slots indicating a number of slots that the search space set s exists by duration
- a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively
- an indication that search space set s is either a CSS set or a USS set by searchSpaceType
- if search space set s is a CSS set
  - an indication by dci-Format0-0-AndFormat1-0 to monitor PDCCH candidates for DCI format 0_0 and DCI format 1_0
  - an indication by dci-Format2-0 to monitor one or two PDCCH candidates, or to monitor one PDCCH candidate per RB set if the UE is provided freqMonitorLocations for the search space set, for DCI format 2_0 and a corresponding CCE aggregation level
  - an indication by dci-Format2-1 to monitor PDCCH candidates for DCI format 2_1
  - an indication by dci-Format2-2 to monitor PDCCH candidates for DCI format 2_2
  - an indication by dci-Format2-3 to monitor PDCCH candidates for DCI format 2_3
  - an indication by dci-Format2-4 to monitor PDCCH candidates for DCI format 2_4
  - an indication by dci-Format2-6 to monitor PDCCH candidates for DCI format 2_6
- if search space set s is a USS set, an indication by dci-Formats to monitor PDCCH candidates either for DCI format 0_0 and DCI format 1_0, or for DCI format 0_1 and DCI format 1_1, or an indication by dci-FormatsExt to monitor PDCCH candidates for DCI format 0_2 and DCI format 1_2, or for DCI format 0_1, DCI format 1_1, DCI format 0_2, and DCI format 1_2, or for DCI format 3_0, or for DCI format 3_1, or for DCI format 3_0 and DCI format 3_1
- a bitmap by freqMonitorLocations, if provided, to indicate an index of one or more RB sets for the search space set s, where the MSB k in the bitmap corresponds to RB set k − 1 in the DL BWP. For RB set k indicated in the bitmap, the first PRB of the frequency domain monitoring location confined within the RB set is given by $RB_{s0+k,DL}^{start,\mu} + N_{RB}^{offset}$, where $RB_{s0+k,DL}^{start,\mu}$ is the index of first common RB of the RB set k, see REF 4, and $N_{RB}^{offset}$ is provided by rb-Offset or $N_{RB}^{offset} = 0$ if rb-Offset is not provided. For each RB set with a corresponding value of 1 in the bitmap, the frequency domain resource allocation pattern for the monitoring location is determined based on the first $N_{RBG,set0}^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

A UE does not expect to be provided a first symbol and a number of consecutive symbols for a CORESET that results to a PDCCH candidate mapping to symbols of different slots.

A UE does not expect any two PDCCH monitoring occasions on an active DL BWP, for a same search space set or for different search space sets, in a same CORESET to be separated by a non-zero number of symbols that is smaller than the CORESET duration.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.$$

The UE monitors PDCCH candidates for search space set s for $T_s$ consecutive slots, starting from slot $$n_{s,f}^{\mu},$$

and does not monitor PDCCH candidates for search space set s for the next $k_s$–$T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in an USS, if the UE is not configured with a carrier indicator field, the UE monitors the PDCCH candidates without carrier indicator field. For an active DL BWP of a serving cell on which a UE monitors PDCCH candidates in an USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ are given by L·

$$\left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mathrm{mod} \lfloor N_{CCE,p} / L \rfloor \right\} + i$$

where for any CSS, $$Y_{p,n_{s,f}^{\mu}} = 0;$$

for a USS, $$Y_{p,n_{s,f}^{\mu}} = \left( A_p \cdot Y_{p,n_{s,f}^{\mu}-1} \right) \mathrm{mod} D,$$

$Y_{p,-1}=n_{RNTI}\neq 0$, $A_p=39827$ for pmod3=0, $A_p=39829$ for pmod3=1, $A_p=39839$ for pmod3=2, and D=65537; i=0, . . . , L−1; $N_{CCE,p}$ is the number of CCEs, numbered from 0 to $N_{CCE,p}-1$, in CORESET p and, if any, per RB set; $n_{CI}$ is the carrier indicator field value if the UE is configured with a carrier indicator field by CrossCarrierSchedulingConfig for the serving cell on which PDCCH is monitored; otherwise, including for any CSS, $$n_{CI} = 0; m_{s,n_{CI}} = 0, \ldots , M_{s,n_{CI}}^{(L)} - 1, \text{ where } M_{s,n_{CI}}^{(L)}$$

is the number of PDCCH candidates the UE is configured to monitor for aggregation level L of a search space set s for a serving cell corresponding to $n_{CI}$; for any CSS, $$M_{s,max}^{(L)} = M_{s,0}^{(L)}; \text{ for a USS, } M_{s,max}^{(L)}$$

is the maximum of $$M_{s,n_{CI}}^{(L)}$$

over all configured $n_{CI}$ values for a CCE aggregation level L of search space set s; the RNTI value used for $n_{RNTI}$ is the C-RNTI.

A UE expects to monitor PDCCH candidates for up to 4 sizes of DCI formats that include up to 3 sizes of DCI formats with CRC scrambled by C-RNTI per serving cell. (This rule is sometimes referred to as the "3+1" DCI format size budget.) The UE counts a number of sizes for DCI formats per serving cell based on a number of configured PDCCH candidates in respective search space sets for the corresponding active DL BWP.

A PDCCH candidate with index $m_{s,n_{CI}}$ for a search space set $s_j$ using a set of CCEs in a CORESET p on the active DL BWP for serving cell $n_{CI}$ is not counted for monitoring if there is a PDCCH candidate with index $m_{s_i,n_{CI}}$ for a search space set $s_i \leq s_j$, or if there is a PDCCH candidate with index $n_{s_j,n_{CI}}$ and $n_{s_j,n_{CI}} < m_{s_i,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted for monitoring.

A UE does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided monitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

TABLE 4 provides the maximum number of monitored PDCCH candidates, $$M_{PDCCH}^{max,slot,\mu},$$

per slot for a UE in a DL BWP with SCS configuration μ for operation with a single PDCCH serving cell.

TABLE 4

Maximum number $M_{PDCCH}^{max,slot,\mu}$ of monitored PDCCH candidates per slot for a DL BWP with SCS configuration $\mu \in \{0, 1, 2, 3\}$ for a single serving cell

| μ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

TABLE 5 provides the maximum number of monitored PDCCH candidates, $$M_{PDCCH}^{max,(X,Y),\mu},$$

per span for a UE in a DL BWP with SCS configuration μ for operation with a single serving cell.

TABLE 5

Maximum number $M_{PDCCH}^{max,(X,Y),\mu}$ of monitored
PDCCH candidates in a span for combination (X, Y)
for a DL BWP with SCS configuration $\mu \in \{0, 1\}$
for a single serving cell

| | Maximum number $M_{PDCCH}^{max,(X,Y),\mu}$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

TABLE 6 provides the maximum number of non overlapped CCEs, $$C_{PDCCH}^{max,slot,\mu},$$

for a DL BWP with SCS configuration $\mu$ that a UE is expected to monitor corresponding PDCCH candidates per slot for operation with a single serving cell. CCEs for PDCCH candidates are non-overlapped if they correspond to: (1) different CORESET indexes, or (2) different first symbols for the reception of the respective PDCCH candidates.

TABLE 6

Maximum number $C_{PDCCH}^{max,slot,\mu}$ of non-overlapped CCEs
per slot for a DL BWP with SCS configuration $\mu \in$
$\{0, 1, 2, 3\}$ for a single serving cell

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

TABLE 7 provides the maximum number of non-overlapped CCEs, $$C_{PDCCH}^{max,(X,Y),\mu},$$

for a DL BWP with SCS configuration $\mu$ that a UE is expected to monitor corresponding PDCCH candidates per span for operation with a single serving cell.

TABLE 7

Maximum number $C_{PDCCH}^{max,(X,Y),\mu}$ of non-overlapped CCEs
in a span for combination (X, Y) for a DL BWP with SCS
configuration $\mu \in \{0, 1\}$ for a single serving cell

| | Maximum number $C_{PDCCH}^{max,(X,Y),\mu}$ of non-overlapped CCEs per span for combination (X, Y) and per serving cell | | |
|---|---|---|---|
| $\mu$ | (2, 2) | (4, 3) | (7, 3) |
| 0 | 18 | 36 | 56 |
| 1 | 18 | 36 | 56 |

If a UE: (1) does not report pdcch-BlindDetectionCA or is not provided BDFactorR, $\gamma$=R; and (2) reports pdcch-BlindDetectionCA, the UE can be indicated by BDFactorR either $\gamma$=1 or $\gamma$=R.

If a UE is configured with $$N_{cells,0}^{DL,\mu} + N_{cells,1}^{DL,\mu}$$

downlink cells for which the UE is not provided monitoringCapabilityConfig-r16, or is provided monitoringCapabilityConfig-r16=r15monitoringcapability but not provided CORESETPoolIndex, with associated PDCCH candidates monitored in the active DL BWPs of the scheduling cells using SCS configuration $\mu$ where $$\sum_{\mu=0}^{3}\left(N_{cells,0}^{DL,\mu} + \gamma \cdot N_{cells,1}^{DL,\mu}\right) \le N_{cells}^{cap},$$

the UE is not required to monitor, on the active DL BWPs of the scheduling cells: (1) more than $$M_{PDCCH}^{total,slot,\mu} = M_{PDCCH}^{max,slot,\mu}$$

PDCCH candidates or more than $$C_{PDCCH}^{total,slot,\mu} = C_{PDCCH}^{max,slot,\mu}$$

non-overlapped CCEs per slot for each scheduled cell when the scheduling cell is from the $$N_{cells,0}^{DL,\mu}$$

downlink cells, (2) more than $$M_{PDCCH}^{total,slot,\mu} = \gamma \cdot M_{PDCCH}^{max,slot,\mu}$$

PDCCH candidates or more than $$C_{PDCCH}^{total,slot,\mu} = \gamma \cdot C_{PDCCH}^{max,slot,\mu}$$

non-overlapped CCEs per slot for each scheduled cell when the scheduling cell is from the $$N_{cells,1}^{DL,\mu}$$

downlink cells; or (3) more than $$M_{PDCCH}^{max,slot,\mu}$$

PDCCH candidates or more than $$C_{PDCCH}^{max,slot,\mu}$$

non-overlapped CCEs per slot for CORESETs with same coresetPoolIndex value for each scheduled cell when the scheduling cell is from the $$N_{cells,1}^{DL,\mu}$$

downlink cells.

$$N_{cells}^{cap}$$

is replaced by $$N_{cells,r15}^{cap-r16},$$

if a UE is configured with downlink cells for which the UE is provided both monitoringCapabilityConfig-r16=r15monitoringcapability and monitoringCapability-Config-r16=r16monitoringcapability.

If a UE: (1) is configured with $$N_{cells,0}^{DL,\mu} + N_{cells,1}^{DL,\mu}$$

downlink cells for which the UE is not provided monitoringCapabilityConfig, or is provided monitoringCapability-Config-r16=r15monitoringcapability but not provided coresetPoolIndex; (2) with associated PDCCH candidates monitored in the active DL BWPs of the scheduling cell(s) using SCS configuration μ, where $$\sum_{\mu=0}^{3} \left( N_{cells,0}^{DL,\mu} + \gamma \cdot N_{cells,1}^{DL,\mu} \right) > N_{cells}^{cap},$$

and (3) a DL BWP of an activated cell is the active DL BWP of the activated cell, and a DL BWP of a deactivated cell is the DL BWP with index provided by firstActiveDown-linkBWP-Id for the deactivated cell.

The UE is not required to monitor more than $$M_{PDCCH}^{total,slot,\mu} = \left\lfloor N_{cells}^{cap} \cdot M_{PDCCH}^{max,slot,\mu} \cdot \left( N_{cells,1}^{DL,\mu} + \gamma \cdot N_{cells,1}^{DL,\mu} \right) / \sum_{j=0}^{3} \left( N_{cells,0}^{DL,j} + \gamma \cdot N_{cells,1}^{DL,j} \right) \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot \left( N_{cells,1}^{DL,\mu} + \gamma \cdot N_{cells,1}^{DL,\mu} \right) / \sum_{j=0}^{3} \left( N_{cells,0}^{DL,j} + \gamma \cdot N_{cells,1}^{DL,j} \right) \right\rfloor$$

non-overlapped CCEs per slot on the active DL BWP(s) of scheduling cell(s) from the $$N_{cells,0}^{DL,\mu} + N_{cells,1}^{DL,\mu}$$

downlink cells.

$$N_{cells}^{cap}$$

is replaced by $$N_{cells,r15}^{cap-r16}$$

if a UE is configured with downlink cells for which the UE is provided both monitoringCapabilityConfig-r16=r15monitoringcapability and monitoringCapability-Config-r16=r16monitoringcapability.

For each scheduled cell from the $$N_{cells,0}^{DL,\mu}$$

downlink cells, the UE is not required to monitor on the active DL BWP with SCS configuration μ of the scheduling cell more than $$\min\left( M_{PDCCH}^{max,slot,\mu}, M_{PDCCH}^{total,slot,\mu} \right)$$

PDCCH candidates or more than $$\min\left( C_{PDCCH}^{max,slot,\mu}, C_{PDCCH}^{total,slot,\mu} \right)$$

non-overlapped CCEs per slot.

For each scheduled cell from the $$N_{cells,1}^{DL,\mu}$$

downlink cells, the UE is not required to monitor on the active DL BWP with SCS configuration μ of the scheduling cell: (1) more than $$\min\left( \gamma \cdot M_{PDCCH}^{max,slot,\mu}, M_{PDCCH}^{total,slot,\mu} \right)$$

PDCCH candidates or more than $$\min\left( \gamma \cdot C_{PDCCH}^{max,slot,\mu}, C_{PDCCH}^{total,slot,\mu} \right)$$

non-overlapped CCEs per slot; and (2) more than $$\min\left( M_{PDCCH}^{max,slot,\mu}, M_{PDCCH}^{total,slot,\mu} \right)$$

PDCCH candidates or more than $$\min\left(C_{PDCCH}^{max,slot,\mu}, C_{PDCCH}^{total,slot,\mu}\right)$$

non-overlapped CCEs per slot for CORESETs with same coresetPoolIndex value.

If a UE is configured with $$N_{cells,r16}^{DL,\mu}$$

downlink cells for which the UE is provided monitoringCapabilityConfig=r16monitoringcapability and with associated PDCCH candidates monitored in the active DL BWPs of the scheduling cells using SCS configuration μ, and with $$N_{cells,r16}^{DL,(X,Y),\mu} \text{ of the } N_{cells,r16}^{DL,\mu}$$

downlink cells using combination (X, Y) for PDCCH monitoring, where $$\sum_{\mu=0}^{1} N_{cells,r16}^{DL,\mu} \le N_{cells}^{cap-r16},$$

the UE is not required to monitor, on the active DL BWP of the scheduling cell, more than $$M_{PDCCH}^{total,} = M_{PDCCH}^{max,(X,Y),\mu,},$$

PDCCH candidates or more than $$C_{PDCCH}^{total,(X,Y),\mu} = C_{PDCCH}^{max,(X,Y),\mu}$$

non-overlapped CCEs per span for each scheduled cell when the scheduling cell is from the $$N_{cells,r16}^{DL,(X,Y),\mu}$$

downlink cells. If a UE is configured with downlink cells for which the UE is provided both monitoringCapabilityConfig=r15monitoringcapability and monitoringCapabilityConfig=r16monitoringcapability, $$N_{cells}^{cap-r16}$$

is replaced by $$N_{cells,r16}^{cap-r16}.$$

If a UE is configured only with $$N_{cells,r16}^{DL,\mu}$$

downlink cells for which the UE is provided monitoringCapabilityConfig=r16monitoringcapability and with associated PDCCH candidates monitored in the active DL BWPs of the scheduling cells using SCS configuration μ, and with $$N_{cells,r16}^{DL,} \text{ of the } N_{cells,r16}^{DL,\mu}$$

downlink cells using combination (X, Y) for PDCCH monitoring, where $$\sum_{\mu=0}^{1} N_{cells,r16}^{DL,\mu} > N_{cells}^{cap-r16},$$

a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $$M_{PDCCH}^{total,(X,Y),\mu} = \left\lfloor N_{cells}^{cap-r16} \cdot M_{PDCCH}^{max,(X,Y),\mu} \cdot N_{cells,r16}^{DL,(X,Y),\mu} / \sum_{j=0}^{1} N_{cells,r16}^{DL,j} \right\rfloor$$

PDCCH candidates or more than $$C_{PDCCH}^{total,(X,Y),\mu} = \left\lfloor N_{cells}^{cap-r16} \cdot C_{PDCCH}^{max,(X,Y),\mu} \cdot N_{cells,r16}^{DL,(X,Y),\mu} / \sum_{j=0}^{1} N_{cells,r16}^{DL,j} \right\rfloor$$

non-overlapped CCES: (1) per set of spans on the active DL BWP(s) of all scheduling cell(s) from the $$N_{cells,r16}^{DL,(X,Y),\mu}$$

downlink cells within every X symbols, if the union of PDCCH monitoring occasions on all scheduling cells from the $$N_{cells,r16}^{DL,(X,Y),\mu}$$

downlink cells results to PDCCH monitoring according to the combination (X, Y) and any pair of spans in the set is within Y symbols, where first X symbols start at a first symbol with a PDCCH monitoring occasion and next X symbols start at a first symbol with a PDCCH monitoring occasion that is not included in the first X symbols; and (2) per set of spans across the active DL BWP(s) of all scheduling cells from the $$N_{cells,r16}^{DL,(X,Y),\mu}$$

downlink cells, with at most one span per scheduling cell for each set of spans, otherwise.

Where $$N_{cells,r16}^{DL,j}$$

is a number of configured cells with associated PDCCH candidates monitored in the active DL BWPs of the scheduling cells using SCS configuration j. If a UE is configured with downlink cells for which the UE is provided both monitoringCapabilityConfig=r15monitoringcapability and monitoringCapabilityConfig=r16monitoringcapability, $$N_{cells}^{cap-r16}$$

is replaced by $$N_{cells,r16}^{cap-r16}.$$

For each scheduled cell from the $$N_{cells,r16}^{DL,(X,Y),\mu}$$

downlink cells using combination (X, Y), the UE is not required to monitor on the active DL BWP with SCS configuration μ of the scheduling cell, more than $$\min\left(M_{PDCCH}^{max,(X,Y),\mu}, M_{PDCCH}^{total,(X,Y),\mu}\right)$$

PDCCH candidates or more than $$\min\left(C_{PDCCH}^{max,(X,Y),\mu}, C_{PDCCH}^{total,(X,Y),\mu}\right)$$

non-overlapped CCEs span.

A UE does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided monitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

For all search space sets within a slot n or within a span in slot n, denote by $S_{CSS}$ a set of CSS sets with cardinality of $I_{CSS}$ and by $S_{USS}$ a set of USS sets with cardinality of $J_{USS}$. The location of USS sets $s_j$, $0 \le j < J_{USS}$, in $S_{USS}$ is according to an ascending order of the search space set index.

Denote by $$M_{S_{CSS}(i)}^{(L)}, 0 \le i < I_{css},$$

the number of counted PDCCH candidates for monitoring for CSS set $S_{CSS}(i)$ and by $$M_{S_{uss}(j)}^{(L)}, 0 \le j < J_{uss},$$

the number of counted PDCCH candidates for monitoring for USS set $S_{USS}(j)$.

For the CSS sets, a UE monitors $$M_{PDCCH}^{CSS} = \sum_{i=0}^{I_{CSS}-1} \sum_{L} M_{S_{CSS}(i)}^{(L)}$$

PDCCH candidates requiring a total of $C_{PDCCH}{}^{CSS}$ non-overlapping CCEs in a slot or in a span.

The UE allocates PDCCH candidates for monitoring to USS sets for the primary cell having an active DL BWP with SCS configuration μ in a slot if the UE is not provided monitoringCapabilityConfig for the primary cell or if the UE is provided monitoringCapabilityConfig=r15monitoringcapability for the primary cell, or in the first span of each slot if the UE is provided monitoringCapabilityConfig=r16monitoringcapability for the primary cell, according to the following pseudocode. If for the USS sets for scheduling on the primary cell the UE is not provided coresetPoolIndex for first CORESETs, or is provided coresetPoolIndex with value 0 for first CORESETs, and is provided coresetPoolIndex with value 1 for second CORESETs, and if $$\min\left(\gamma \cdot M_{PDCCH}^{max,slot,\mu}, M_{PDCCH}^{total,slot,\mu}\right) >$$

$$\min\left(M_{PDCCH}^{max,slot,\mu}, M_{PDCCH}^{total,slot,\mu}\right) \text{ or } \min\left(\gamma \cdot C_{PDCCH}^{max,slot,\mu}, C_{PDCCH}^{total,slot,\mu}\right) >$$

$$\min\left(C_{PDCCH}^{max,slot,\mu}, C_{PDCCH}^{total,slot,\mu}\right),$$

the following pseudocode applies only to USS sets associated with the first CORESETs. A UE does not expect to monitor PDCCH in a USS set without allocated PDCCH candidates for monitoring. In the following pseudocode, if the UE is provided monitoringCapabilityConfig=r16monitoringcapability for the primary cell, $$M_{PDCCH}^{max,slot,\mu} \text{ and } C_{PDCCH}^{max,slot,\mu}$$

41 are replaced by $$M_{PDCCH}^{max,(X,Y),\mu} \text{ and } C_{PDCCH}^{max,(X,Y),\mu}$$

respectively, and $$M_{PDCCH}^{total,slot,\mu} \text{ and } C_{PDCCH}^{total,slot,\mu}$$

are replaced by $$M_{PDCCH}^{total,(X,Y),\mu} \text{ and } C_{PDCCH}^{total,(X,Y),\mu}$$

respectively.

Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$ where the non-overlapping CCEs for search space set $S_{USS}(j)$ are determined considering the allocated PDCCH candidates for monitoring for the CSS sets and the allocated PDCCH candidates for monitoring for all search space sets $S_{USS}(k)$, $0 \le k \le j$ as shown in TABLE 8.

TABLE 8

Search space sets

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set $j = 0$ while $\sum_L M_{S_{uss}(j)}^{(L)} \le M_{PDCCH}^{uss}$ AND $\mathcal{C}(V_{CCE}(S_{uss}(j))) \le C_{PDCCH}^{uss}$ allocate $\sum_L M_{S_{uss}(j)}^{(L)}$ PDCCH candidates for monitoring to USS set $S_{uss}(j)$ $M_{PDCCH}^{uss} = M_{PDCCH}^{uss} - \sum_L M_{S_{uss}(j)}^{(L)}$;

$C_{PDCCH}^{uss} = C_{PDCCH}^{uss} - \mathcal{C}(V_{CCE}(S_{uss}(j)))$;
$j = j + 1$;
end while
If a UE
  - is configured for single cell operation or for operation with carrier aggregation in a same frequency band, and
  - monitors PDCCH candidates in overlapping PDCCH monitoring occasions in multipleCORESETs that have been configured with same or different qcl-Type set to "typeD"properties on active DL BWP(s) of one or more cells
the UE monitors PDCCHs only in a CORESET, and in any other CORESET from the multiple CORESETs that have been configured with qcl-Type set to same "typeD" properties as the CORESET, on the active DL BWP of a cell from the one or more cells
  - the CORESET corresponds to the CSS set with the lowest index in the
    cell with the lowest index containing CSS, if any; otherwise, to the USS set with the lowest index in the cell with lowest index
  - the lowest USS set index is determined over all USS sets with at least one PDCCH candidate in overlapping PDCCH monitoring occasions
  - for the purpose of determining the CORESET, a SS/PBCH block is considered to have different QCL "typeD" properties than a CSI-RS
  - for the purpose of determining the CORESET, a first CSI-RS associated with a SS/PBCH block in a first cell and a second CSI-RS in a second cell that is also associated with the SS/PBCH block are assumed to have same QCL "typeD" properties

42

TABLE 8-continued

Search space sets

- the allocation of non-overlapping CCEs and of PDCCH candidates for PDCCH monitoring is according to all search space sets associated with the multiple CORESETs on the active DL BWP(s) of the one or more cells
  - the number of active TCI states is determined from the multiple CORESETs
If a UE
  - is configured for single cell operation or for operation with carrier aggregation in a same frequency band, and
  - monitors PDCCH candidates in overlapping PDCCH monitoring occasions in multiple CORESETs where none of the CORESETs has TCI-states configured with qcl-Type set to "typeD,"
the UE is required to monitor PDCCH candidates in overlapping PDCCH monitoring occasions for search space sets associated with different CORESETs.

For a scheduled cell and at any time, a UE expects to have received at most 16 PDCCHs for DCI formats with CRC scrambled by C-RNTI, CS-RNTI, or MCS-C-RNTI scheduling 16 PDSCH receptions for which the UE has not received any corresponding PDSCH symbol and at most 16 PDCCHs for DCI formats with CRC scrambled by C-RNTI, CS-RNTI, or MCS-C-RNTI scheduling 16 PUSCH transmissions for which the UE has not transmitted any corresponding PUSCH symbol.

If a UE is not provided monitoringCapability-Config=r16monitoringcapability for any serving cell, and: (1) is not configured for NR-DC operation and indicates through pdcch-BlindDetectionCA a capability to monitor PDCCH candidates for $$N_{cells}^{cap} \ge 4$$

downlink cells and the UE is configured with $$N_{cells}^{DL} > 4$$

downlink cells or $$N_{cells}^{UL} > 4$$

uplink cells, or (2) is configured with NR-DC operation and for a cell group with $$N_{cells}^{DL}$$

downlink cells or $$N_{cells}^{UL}$$

uplink cells.

The UE expects to have respectively received at most $$16 \cdot N_{cells}^{cap}$$

PDCCHs for: (1) DCI formats with CRC scrambled by a C-RNTI, or a CS-RNTI, or a MCS-C-RNTI scheduling $$16 \cdot N_{cells}^{cap}$$

PDSCH receptions for which the UE has not received any corresponding PDSCH symbol over all $$N_{cells}^{DL}$$

downlink cells; and (2) DCI formats with CRC scrambled by a C-RNTI, or a CS-RNTI, or a MCS-C-RNTI scheduling $$16 \cdot N_{cells}^{cap}$$

PUSCH transmissions for which the UE has not transmitted any corresponding PUSCH symbol over all $$N_{cells}^{UL}$$

uplink cells.

If a UE is provided monitoringCapabilityConfig= r16monitoringcapability for all serving cells, and: (1) is not configured for NR-DC operation and indicates through pdcch-MonitoringCA a capability to monitor PDCCH candidates for $$N_{cells}^{cap-r16} \geq 2$$

downlink cells and the UE is configured with $$N_{cells}^{DL} > 2$$

downlink cells or $$N_{cells}^{UL} > 2$$

uplink cells, or (2) is configured with NR-DC operation and for a cell group with $$N_{cells}^{DL}$$

downlink cells or $$N_{cells}^{UL}$$

uplink cells.

The UE expects to have respectively received at most $$16 \cdot N_{cells}^{cap-r16}$$

PDCCHs for: (1) DCI formats with CRC scrambled by a C-RNTI, or a CS-RNTI, or a MCS-C-RNTI scheduling $$16 \cdot N_{cells}^{cap-r16}$$

PDSCH receptions for which the UE has not received any corresponding PDSCH symbol over all $$N_{cells}^{DL}$$

downlink cells; and (2) DCI formats with CRC scrambled by a C-RNTI, or a CS-RNTI, or a MCS-C-RNTI scheduling $$16 \cdot N_{cells}^{cap-r16}$$

PUSCH transmissions for which the UE has not transmitted any corresponding PUSCH symbol over all $$N_{cells}^{UL}$$

uplink cells.

If a UE is provided monitoringCapabilityConfig= r16monitoringcapability for at least one serving cell and is not provided monitoringCapabilityConfig=r16monitor-ingcapability for at least one serving cell, and: (1) is not configured for NR-DC operation, and indicates a capability to monitor PDCCH candidates for $$N_{cells,r15}^{cap-r16} \geq 1$$

downlink cells and $$N_{cells,r16}^{cap-r16} \geq 1$$

downlink cells, and the UE is configured with $$N_{cells}^{DL} > 1$$

downlink cell or $$N_{cells}^{UL} > 1$$

uplink cell, or (2) is configured with NR-DC operation and for a cell group with $$N_{cells}^{DL}$$

downlink cells or $$N_{cells}^{UL}$$

uplink cells.

The UE expects to have respectively received: (1) at most $$16 \cdot N_{cells,r15}^{cap-r16}$$

PDCCHs for DCI formats with CRC scrambled by a C-RNTI, or a CS-RNTI, or a MCS-C-RNTI scheduling $$16 \cdot N_{cells,r15}^{cap-r16}$$

PDSCH receptions for which the UE has not received any corresponding PDSCH symbol over all serving cells that are not provided monitoringCapabilityConfig=r16monitoringcapability; (2) at most $$16 \cdot N_{cells,r15}^{cap-r16}$$

PDCCHs for DCI formats with CRC scrambled by a C-RNTI, or a CS-RNTI, or a MCS-C-RNTI scheduling $$16 \cdot N_{cells,r15}^{cap-r16}$$

PUSCH transmissions for which the UE has not transmitted any corresponding PUSCH symbol over all serving cells that are not provided monitoringCapabilityConfig= r16monitoringcapability; (3) at most $$16 \cdot N_{cells,r16}^{cap-r16}$$

PDCCHs for DCI formats with CRC scrambled by a C-RNTI, or a CS-RNTI, or a MCS-C-RNTI scheduling $$16 \cdot N_{cells,r16}^{cap-r16}$$

PDSCH receptions for which the UE has not received any corresponding PDSCH symbol over all serving cells that are provided monitoringCapabilityConfig=r16monitoringcapability; or (4) at most $$16 \cdot N_{cells,r16}^{cap-r16}$$

PDCCHs for DCI formats with CRC scrambled by a C-RNTI, or a CS-RNTI, or a MCS-C-RNTI scheduling $$16 \cdot N_{cells,r16}^{cap-r16}$$

PUSCH transmissions for which the UE has not transmitted any corresponding PUSCH symbol over all serving cells that are provided monitoringCapabilityConfig=r16monitoringcapability.

If a UE: (1) is configured to monitor a first PDCCH candidate for a DCI format 0_0 and a DCI format 1_0 from a CSS set and a second PDCCH candidate for a DCI format 0_0 and a DCI format 1_0 from an USS set in a CORESET with index zero on an active DL BWP, (2) the DCI formats 0_0/1_0 associated with the first PDCCH candidate and the DCI formats 0_0/1_0 associated with the second PDCCH candidate have same size, and (3) the UE receives the first PDCCH candidate and the second PDCCH candidate over a same set of CCEs, and (4) the first PDCCH candidate and the second PDCCH candidate have identical scrambling, and (5) the DCI formats 0_0/1_0 for the first PDCCH candidate and the DCI formats 0_0/1_0 for the second PDCCH candidate have CRC scrambled by either C-RNTI, or MCS-C-RNTI, or CS-RNTI.

The UE decodes only the DCI formats 0_0/1_0 associated with the first PDCCH candidate.

If a UE detects a DCI format with inconsistent information, the UE discards all the information in the DCI format.

A UE configured with a bandwidth part indicator in a DCI format determines, in case of an active DL BWP or of an active UL BWP change, that the information in the DCI format is applicable to the new active DL BWP or UL BWP, respectively.

For unpaired spectrum operation, if a UE is not configured for PUSCH/PUCCH transmission on serving cell $c_2$, the UE does not expect to monitor PDCCH on serving cell $c_1$ if the PDCCH overlaps in time with SRS transmission (including any interruption due to uplink or downlink RF retuning time [10, TS 38.133]) on serving cell $c_2$ and if the UE is not capable of simultaneous reception and transmission on serving cell $c_1$ and serving cell $c_2$.

If a UE is provided resourceBlocks and symbolsInResourceBlock in RateMatchPattern, or if the UE is additionally provided periodicityAndPattern in RateMatchPattern, the UE can determine a set of RB s in symbols of a slot that are not available for PDSCH reception as described in TS 38.214. If a PDCCH candidate in a slot is mapped to one or more REs that overlap with REs of any RB in the set of RB s in symbols of the slot, the UE does not expect to monitor the PDCCH candidate.

A UE does not expect to be configured with dci-FormatsSL and dci-FormatsExt in a same USS.

The UE can apply DCI size alignment as subsequently described.

If necessary, padding or truncation may be applied to the DCI formats according to the following steps executed in the order below as shown in TABLE 9.

TABLE 9

| Steps |
| --- |

Step 0:
- Determine DCI format 0_0 monitored in a common search space according to clause 7.3.1.1.1 where $N_{RB}^{UL,BWP}$ is the size of the initial UL bandwidth part.
- Determine DCI format 1_0 monitored in a common search space according to clause 7.3.1.2.1 where $N_{RB}^{DL,BWP}$ is given by
  - the size of CORESET 0 if CORESET 0 is configured for the cell; and
  - the size of initial DL bandwidth part if CORESET 0 is not configured for the cell.
- If DCI format 0_0 is monitored in common search space and if the number of information bits in the DCI format 0_0 prior to padding is less than the payload size of the DCI format 1_0 monitored in common search space for scheduling the same serving cell, a number of zero padding bits are generated for the DCI format 0_0 until the payload size equals that of the DCI format 1_0.
- If DCI format 0_0 is monitored in common search space and if the number of information bits in the DCI format 0_0 prior to truncation is larger than the payload size of the DCI format 1_0 monitored in common search space for scheduling the same serving cell, the bitwidth of the frequency domain resource assignment field in the DCI format 0_0 is reduced by truncating the first few most significant bits such that the size of DCI format 0_0 equals the size of the DCI format 1_0.

Step 1:
- Determine DCI format 0_0 monitored in a UE-specific search space according to clause 7.3.1.1.1 where $N_{RB}^{UL,BWP}$ is the size of the active UL bandwidth part.
- Determine DCI format 1_0 monitored in a UE-specific search space according to clause 7.3.1.2.1 where $N_{RB}^{DL,BWP}$ is the size of the active DL bandwidth part.
- For a UE configured with supplementaryUplink in ServingCellConfig in a cell, if PUSCH is configured to be transmitted on both the SUL and the non-SUL of the cell and if the number of information bits in DCI format 0_0 in UE-specific search space for the SUL is not equal to the number of information bits in DCI format 0_0 in UE-specific search space for the non-SUL, a number of zero padding bits are generated for the smaller DCI format 0_0 until the payload size equals that of the larger DCI format 0_0.
- If DCI format 0_0 is monitored in UE-specific search space and if the number of information bits in the DCI format 0_0 prior to padding is less than the payload size of the DCI format 1_0 monitored in UE-specific search space for scheduling the same serving cell, a number of zero padding bits are generated for the DCI format 0_0 until the payload size equals that of the DCI format 1_0.
- If DCI format 1_0 is monitored in UE-specific search space and if the number of information bits in the DCI format 1_0 prior to padding is less than the payload size of the DCI format 0_0 monitored in UE-specific search space for scheduling the same serving cell, zeros may be appended to the DCI format 1_0 until the payload size equals that of the DCI format 0_0

Step 2:
- Determine DCI format 0_1 monitored in a UE-specific search space according to clause 7.3.1.1.2.
- Determine DCI format 1_1 monitored in a UE-specific search space according to clause 7.3.1.2.2.
- For a UE configured with supplementaryUplink in ServingCellConfig in a cell, if PUSCH is configured to be transmitted on both the SUL and the non-SUL of the cell and if the number of information bits in format 0_1 for the SUL is not equal to the number of information bits in format 0_1 for the non-SUL, zeros may be appended to smaller format 0_1 until the payload size equals that of the larger format 0_1.
- If the size of DCI format 0_1 monitored in a UE-specific search space equals that of a DCI format 0_0/1_0 monitored in another UE-specific search space, one bit of zero padding may be appended to DCI format 0_1.
- If the size of DCI format 1_1 monitored in a UE-specific search space equals that of a DCI format 0_0/1_0 monitored in another UE-specific search space, one bit of zero padding may be appended to DCI format 1_1.

Step 2A:
- Determine DCI format 0_2 monitored in a UE-specific search space according to clause 7.3.1.1.3.
- Determine DCI format 1_2 monitored in a UE-specific search space according to clause 7.3.1.2.3.
- For a UE configured with supplementaryUplink in ServingCellConfig in a cell, if PUSCH is configured to be transmitted on both the SUL and the non-SUL of the cell and if the number of information bits in format 0_2 for the SUL is not equal to the number of information bits in format 0_2 for the non-SUL, zeros may be appended to smaller format 0_2 until the payload size equals that of the larger format 0_2.

Step 3:
- If both of the following conditions are fulfilled the size alignment procedure is complete
  - the total number of different DCI sizes configured to monitor is no more than 4 for the cell
  - the total number of different DCI sizes with C-RNTI configured to monitor is no more than 3 for the cell TABLE 9-continued

| Steps |
| --- |

Step 4:
- Otherwise
  Step 4A:
  - Remove the padding bit (if any) introduced in step 2 above.
  - Determine DCI format 1_0 monitored in a UE-specific search space according to clause
    7.3.1.2.1 where $N_{RB}^{DL,BWP}$ is given by
    - the size of CORESET 0 if CORESET 0 is configured for the cell; and
    - the size of initial DL bandwidth part if CORESET 0 is not configured for the cell.
  - Determine DCI format 0_0 monitored in a UE-specific search space according to clause
    7.3.1.1.1 where $N_{RB}^{UL,BWP}$ is the size of the initial UL bandwidth part.
  - If the number of information bits in the DCI format 0_0 monitored in a UE-specific
    search space prior to padding is less than the payload size of the DCI format 1_0
    monitored in UE-specific search space for scheduling the same serving cell, a number
    of zero padding bits are generated for the DCI format 0_0 monitored in a UE-specific
    search space until the payload size equals that of the DCI format 1_0 monitored in a
    UE-specific search space.
  - If the number of information bits in the DCI format 0_0 monitored in a UE-specific
    search space prior to truncation is larger than the payload size of the DCI format 1_0
    monitored in UE-specific search space for scheduling the same serving cell, the
    bitwidth of the frequency domain resource assignment field in the DCI format 0_0 is
    reduced by truncating the first few most significant bits such that the size of DCI format
    0_0 monitored in a UE-specific search space equals the size of the DCI format 1_0
    monitored in a UE-specific search space.
  Step 4B:
  - If the total number of different DCI sizes configured to monitor is more than 4 for the
    cell after applying the above steps, or if the total number of different DCI sizes with C-
    RNTI configured to monitor is more than 3 for the cell after applying the above steps
    - If the number of information bits in the DCI format 0_2 prior to padding is less than
      the payload size of the DCI format 1_2 for scheduling the same serving cell, a
      number of zero padding bits are generated for the DCI format 0_2 until the payload
      size equals that of the DCI format 1_2.
    - If the number of information bits in the DCI format 1_2 prior to padding is less than
      the payload size of the DCI format 0_2 for scheduling the same serving cell, zeros
      may be appended to the DCI format 1_2 until the payload size equals that of the DCI
      format 0_2.
  Step 4C:
  - If the total number of different DCI sizes configured to monitor is more than 4 for the
    cell after applying the above steps, or if the total number of different DCI sizes with C-
    RNTI configured to monitor is more than 3 for the cell after applying the above steps
    - If the number of information bits in the DCI format 0_1 prior to padding is less than
      the payload size of the DCI format 1_1 for scheduling the same serving cell, a
      number of zero padding bits are generated for the DCI format 0_1 until the payload
      size equals that of the DCI format 1_1.
    - If the number of information bits in the DCI format 1_1 prior to padding is less than
      the payload size of the DCI format 0_1 for scheduling the same serving cell, zeros
      may be appended to the DCI format 1_1 until the payload size equals that of the DCI
      format 0_1.

The UE is not expected to handle a configuration that, after applying the above steps, results in: (1) the total number of different DCI sizes configured to monitor is more than 4 for the cell; (2) the total number of different DCI sizes with C-RNTI configured to monitor is more than 3 for the cell; (3) the size of DCI format 0_0 in a UE-specific search space is equal to DCI format 0_1 in another UE-specific search space; (4) the size of DCI format 1_0 in a UE-specific search space is equal to DCI format 1_1 in another UE-specific search space; (5) the size of DCI format 0_0 in a UE-specific search space is equal to DCI format 0_2 in another UE-specific search space when at least one pair of the corresponding PDCCH candidates of DCI formats 0_0 and 0_2 are mapped to the same resource; (6) the size of DCI format 1_0 in a UE-specific search space is equal to DCI format 1_2 in another UE-specific search space when at least one pair of the corresponding PDCCH candidates of DCI formats 1_0 and 1_2 are mapped to the same resource; (7) the size of DCI format 0_1 in a UE-specific search space is equal to DCI format 0_2 in the same or another UE-specific search space when at least one pair of the corresponding PDCCH candidates of DCI formats 0_1 and 0_2 are mapped to the same resource; (8) or the size of DCI format 1_1 in a UE-specific search space is equal to DCI format 1_2 in the same or another UE-specific search space when at least one pair of the corresponding PDCCH candidates of DCI formats 1_1 and 1_2 are mapped to the same resource.

If DCI format 3_0 or DCI format 3_1 is monitored on a cell, DCI size alignment for DCI format 3_0 and DCI format 3_1 is performed as described in 3GPP standard specification after performing the DCI size alignment described in 3GPP standard specification. The size(s) of the DCI formats configured to monitor for a cell in 3GPP standard specification refers to that after performing the DCI size alignment described in 3GPP standard specification.

If DCI format 3_0 or DCI format 3_1 is monitored on a cell and the total number of DCI sizes of the DCI formats configured to monitor for the cell and DCI format 3_0 or DCI format 3_1 is more than 4, zeros may be appended to DCI format 3_0 if configured and DCI format 3_1 if configured, until the payload size of DCI format 3_0 or DCI format 3_1 equals that of the smallest DCI format configured to monitor for the cell that is larger than DCI format 3_0 or DCI format 3_1.

The UE is not expected to handle a configuration that results in: (1) the total number of different DCI sizes configured to monitor for the cell and DCI format 3_0 or DCI format 3_1 is more than 4; and (2) the payload size of DCI format 3_0 or DCI format 3_1 is larger than the payload size of all other DCI formats configured to monitor for the cell.

Throughout the present disclosure, embodiments are described in terms of multiple PDSCHs or multiple PUSCHs that are jointly scheduled on multiple serving cells, such as a subset/set of cells from among one or more subsets/sets of co-scheduled cells.

The embodiments are generic and can apply to various other scenarios such as when a UE is jointly scheduled to receive/transmit multiple PDSCHs/PUSCHs: (1) from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; (2) in multiple time units, such as multiple slots or multiple transmission time intervals (TTIs); (3) on multiple BWPs associated with one or more cells/carriers/TRPs, including multiple BWPs of a single serving cell/carrier for a UE with a capability of reception/transmission on multiple active BWPs; (4) on one or more TRPs/cells, wherein the UE can receive/transmit more than one PDSCH/PUSCH on each co-scheduled TRP/cell; (5) for multiple transport blocks (TBs), or for multiple codewords (CWs) corresponding to single TB or multiple TB s; or (6) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs," or "co-scheduled slots/TTIs," or "co-scheduled BWPs," or "co-scheduled PDSCHs/PUSCHs," or "co-scheduled TBs/CWs," or "co-scheduled SPS-PDSCHs/CG-PUSCHs," and so on. Similar for other related terms, such as "multi-cell scheduling," and so on.

Various embodiments consider reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

A UE can be provided a number of sets of co-scheduled cells by higher layers. The term set of co-scheduled cells is used to refer to a set of serving cells where the UE can be scheduled PDSCH receptions or PUSCH transmissions on two or more cells from the set of co-scheduled cells jointly by a single DCI format, or by using complementary embodiments such as those described in embodiment of the present disclosure. For convenience of presentation, such DCI format may be referred to as a multi-cell scheduling DCI (MC-DCI) format. The MC-DCI format can be a new DCI format, such as DCI format 0_3 for co-scheduled PUSCHs or 1_3 for co-scheduled PDSCHs. Additionally, the UE can be indicated via a DCI format, such as the MC-DCI format, in a PDCCH, or via a MAC CE in a PDSCH, a subset of a set of co-scheduled cells, wherein cells of the subset can change across different PDCCH monitoring occasions (MOs). For example, a first MC-DCI format in a first MO can indicate a first set/subset of co-scheduled cells, and a second DCI format in a second MO can indicate a second set/subset of co-scheduled cells.

In one example, multi-cell scheduling can also include operations related to DL/UL transmissions such as reporting HARQ-ACK information, beam/CSI measurement or reporting, transmission or reception of UL/DL reference signals, and so on.

In one example, the UE can be configured by higher layers, such as by a UE-specific RRC configuration, a number of sets of co-scheduled cells. For example, the UE can be configured a first set of cells, such as {cell #0, cell #1, cell #4, cell #7} and a second set of cells such as {cell #2, cell #3, cell #5, cell #6}. The multiple sets of co-scheduled cells can be scheduled from a same scheduling cell or from different scheduling cells.

In one example, a set of co-scheduled cells can include a primary cell (PCell/PSCell) and one or more SCells. In another example, a set of co-scheduled cells can include only SCells. In one example, a scheduling cell can belong to a set of co-scheduled cells. In another example, the scheduling cell may not belong to a set of co-scheduled cells. In a further example, the UE does not expect that a scheduling cell belongs to a set of co-scheduled cells.

In one example, per specifications of the system operation, a set of co-scheduled cells is defined as a set that includes all scheduled cells having a same scheduling cell, and additional higher layer configuration is not required for indication of the set of co-scheduled cells. Accordingly, a DCI format for multi-cell scheduling, or other complementary embodiments, can jointly schedule any number of scheduled cells that have a same scheduling cell. For example, a MC-DCI format can include a bitmap to indicate which of the scheduled cells are jointly scheduled.

In another example, a set of co-scheduled cells can have two or more scheduling cells. For example, a UE can receive a first MC-DCI format in a first PDCCH monitoring occasion on a first scheduling cell for scheduling a set of co-scheduled cells, and can receive a second MC-DCI format in a second PDCCH monitoring occasion on a second scheduling cell for scheduling a set of co-scheduled cells. The DCI format can be associated with any search space set type (CSS or USS) or can be restricted to be associated only with USS sets. For example, the DCI format can be associated with multicast scheduling and have CRC scrambled by a G-RNTI and PDCCH candidates monitored according to CSS sets, or can be associated with unicast scheduling and have CRC scrambled by a C-RNTI and PDCCH candidates monitored according to USS sets. Such PDCCH monitoring from two scheduling cells can be simultaneous, for example in a same span of symbol or in a same slot, or can be non-overlapping, such as in different slots (per higher layer configuration, or per indication in a PDCCH or via a MAC CE).

The UE may or may not expect that both the first scheduling cell and the second scheduling cell can schedule, through DCI formats in PDCCH receptions in a same time interval such as a span or a slot, PUSCH transmissions or PDSCH receptions on a same cell. For example, for a given scheduled cell, the UE can be configured to monitor PDCCH providing MC-DCI corresponding to a set of co-scheduled cells that include the given scheduled cell only on the first scheduling cell, or only on the second scheduling cell, or on both the first and second scheduling cells. The UE can also monitor PDCCH for detection of a DCI format providing scheduling only on one cell from the set of co-scheduled cells (single-cell scheduling DCI format). For example, the UE can be configured to monitor PDCCH on a first scheduling cell for single-cell scheduling on a serving cell, and monitor PDCCH on a second scheduling cell for multi-cell scheduling on a set of co-scheduled cells that include the serving cell.

A UE can report one or more of a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability to the gNB. In one example, that capability can depend on an operating frequency band or on a frequency range such as above or below 6 GHz. Accordingly, the UE can be configured with sets/subsets of co-scheduled cells, wherein a number of sets/subsets or a number of cells within the sets/subsets are within corresponding limits reported as the UE capability.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL. The UE can be configured a number of sets/subsets of co-scheduled cells such that the sizes of the sets/subsets do not exceed the corresponding values reported by the UE capability. For example, the UE can be configured separate sets of co-scheduled cells for PDSCH receptions compared to sets of co-scheduled cells for PUSCH transmissions.

A UE can also be configured a number of cells that do not belong to any of the sets of co-scheduled cells. For example, the UE can be configured a cell #8 that does not belong to either the first set or the second set of co-scheduled cells in the previous example.

In one example, restrictions can apply for co-scheduled cells and a UE can expect that co-scheduled cells in a corresponding set: (1) have a same numerology (SCS configuration and CP); (2) have a same numerology for respective active DL/UL BWPs; (3) have a same duplex configuration, for example, all cells have FDD configuration or all cells have TDD configuration and, in case of a TDD configuration, also have a same UL-DL configuration; (4) are within a same frequency band (intra-band CA) or within a same frequency range (such as FR1 or FR2 or FR2-1 or FR2-2); or (5) have a same licensing type, for example, all cells are licensed or all cells are unlicensed.

In one example, the above restrictions may not apply to a scheduling cell if the scheduling cell belongs to a set of co-scheduled cells. For example, a scheduling cell can have a different SCS configuration than (other) cells in a set of co-scheduled cells. For example, a scheduling cell can be in FR1 and an FDD band, and jointly schedule a set of co-scheduled cells in FR2 and in TDD bands.

A serving cell can belong only to a single set of co-scheduled cells so that the sets of co-scheduled cells do not include any common cell, or can belong to multiple sets of co-scheduled cells to enable larger scheduling flexibility to a serving gNB. For example, a serving cell can belong to a first set of co-scheduled cells and to a second set of co-scheduled cells, for example when cells in the first and second sets of co-scheduled cells have a common feature such as a common numerology, duplex configuration, operating frequency band/range, and so on. Also, a serving cell can belong to both a first set of co-scheduled cells and to a second set of co-scheduled cells, when the serving cell has a first common feature with cells in the first set of co-scheduled cells and a second common feature with cells in the second set of co-scheduled cells, wherein the first common feature can be different from the second common feature.

When a first cell using paired spectrum operation (FDD) and a second cell using unpaired spectrum operation (TDD) are in a same set of co-scheduled cells and a DCI format schedules a first PDSCH reception on the first cell and a second PDSCH reception on the second cell and the second PDSCH reception includes symbols that are UL symbols on the second cell, for example as determined based on an TDD UL-DL configuration provided by a SIB or by UE-specific RRC signaling, the UE does not receive the second PDSCH over the UL symbols or does not receive the second PDSCH over any symbols on the second cell. Alternatively, the UE can apply rate matching for the second PDSCH around the UL symbols on the second cell so that the UE receives the second PDSCH with an adjusted rate in other remaining symbols. Similar UE behaviors can apply when the first and second scheduled cells use unpaired spectrum operation with different UL-DL configurations, such as on different frequency bands.

In one example, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}. When a UE is configured a first set and a second set of co-scheduled cells, in one example, the UE expects that there are no serving/scheduled cells configured in both the first and the second sets (that is, no overlap between the first and second sets). In another example, the first and second sets can have common cells, that is, both the first set and the second set can include a first serving/scheduled cell. For example, the latter can apply when both the first and the second sets correspond to a same scheduling cell. For example, the first cell can be the scheduling cell. In one example, the MC-DCI format needs to indicate a set of co-scheduled cells, from the multiple sets of co-scheduled cells. For example, a first MC-DCI can indicate a first set of co-scheduled cells to jointly schedule PDSCHs/PUSCHs on all cells in the first set of co-scheduled cells, and a second MC-DCI can indicate a second set of co-scheduled cells to jointly schedule PDSCHs/PUSCHs on all cells in the second set of co-scheduled cells.

In one example, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

In one example, the subset of cells can be indicated by a MAC CE. Such a MAC CE command can include one or more of an indication for activation or deactivation/release of a subset of cells, an indication for a number of sets of co-scheduled cells, or an indication for a number of subsets of co-scheduled cells from a corresponding number of sets of co-scheduled cells. When a set of co-scheduled cells includes deactivated cells or cells where the UE operates in a dormant BWP, the MC-DCI format can be adjusted in size to include fields only for activated cells or cells with an active BWP that is not the dormant BWP, or the fields of the MC-DCI format can be determined based on the RRC configuration of the set of co-scheduled cells and remain same when cells from the set of co-scheduled cells are deactivated or have respective active BWPs that are dormant BWPs.

For example, a MAC CE activates a first subset of a set of co-scheduled cells and subsequent DCI formats for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI formats for multi-cell scheduling even before receiving a new MAC CE that activates a second subset of co-scheduled cells, but the UE expects to be provided an indication for a subset of co-scheduled cells by the DCI formats, or by using complementary embodiments, such as those described in embodiment of the present disclosure, for multi-cell scheduling.

In one example, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first MC-DCI format in a first PDCCH MO indicates PDSCH or PUSCH scheduling on a first subset of cells, while a second MC-DCI format in a second PDCCH MO indicates PDSCH or PUSCH scheduling on a second subset of cells. In such manner, a size of the MC-DCI format can be dimensioned according to a subset of cells from the set of co-scheduled cells, such as the first subset or the second subset, while the MC-DCI format can schedule, by different PDCCHs, more cells than in the first subset or the second subset, including all cells in the set of co-scheduled cells.

In one example, a DCI format for multi-cell scheduling provides an index for a subset of cells that are co-scheduled such as a CIF value that corresponds to a subset of one or more cells from a set of co-scheduled cells. For example, UE-specific RRC signaling can indicate first/second/third/fourth indexes and corresponding first/second/third/fourth subsets that include one or more cells from a set of co-scheduled cells, wherein a subset can also include all cells from the set of co-scheduled cells. Then, a CIF field of 2 bits in a DCI format can provide a value that indicates the subset of scheduled cells. Such CIF refers, in general, to sets of co-scheduled cells, rather than individual scheduled cells, so can be referred to as "set-level" CIF (compared to "cell-level" CIF for the latter). The UE can be provided separate configuration for a first number of sets/subsets of co-scheduled cells for PDSCH reception, compared to a second number of sets/subsets of co-scheduled cells for PUSCH transmission. Therefore, the UE can be provided a first set of indexes for set-level CIFs for PDSCH receptions that are different from a second set of indexes for set-level CIFs for PUSCH transmissions. For example, the UE can be provided 4 bits for "set-level" CIF for PDSCH receptions, and 3 bits for "set-level" CIF for PUSCH transmissions.

In one example, when using a two-stage embodiment for joint scheduling of a set/subset of co-scheduled cells, as described in embodiment, when the $1^{st}$ stage DCI is on a first PDCCH on a first cell, and the $2^{nd}$ stage DCI is on a first PDSCH on a second cell, and the first PDSCH schedules second PDSCHs/PUSCHs, in one option, the UE considers the scheduling cell for the second PDSCHs/PUSCHs to be the first cell, and corresponding CIF associations are defined with respect to the first cell and configuration thereof. In another option, the UE considers the scheduling cell for the second PDSCHs/PUSCHs to be the second cell, and corresponding CIF associations are defined with respect to the second cell and configuration thereof.

In one example, a DCI format can include a 1-bit flag field to indicate whether the DCI format is for single-cell scheduling or for multi-cell scheduling in order for a UE to accordingly interpret fields of the DCI format that may also include the CIF field. Then, for single-cell scheduling, the CIF field can be interpreted as in case of single-cell cross-carrier scheduling while for multi-cell scheduling the CIF field can be interpreted as indicating a subset from the set of co-scheduled cells. In one example, instead of an explicit 1-bit flag to indicate single-cell scheduling or multi-cell scheduling, the UE can be configured a number of sets/subsets of co-scheduled cells, some of which include only one scheduled cell and others include more than one scheduled cell. Therefore, the CIF values for single-cell scheduling can be separate from CIF values for multi-cell scheduling. For example, CIF values 0, 1, 2, 3 correspond to scheduling individual cells, and CIF values 4, 5, 6, 7 correspond to sets/subsets of co-scheduled cells and the functionality of the 1-bit flag can be absorbed in the CIF. Therefore, the UE can determine whether the DCI format is for single-cell scheduling or for multi-cell scheduling based on the CIF value.

In one example, a DCI format for multi-cell scheduling provides a number of co-scheduled cells, and the indexes of the co-scheduled cells are provided by additional embodiments, such as by an additional DCI format or by higher layer signaling as described in embodiment of the present disclosure.

In one example, a CIF field in a DCI format for multi-cell scheduling can be a bitmap mapping to the individual cells or subsets of cells from the set of co-scheduled cells. For example, when the UE is configured a maximum number of N scheduled cells, such as N=8 cells, associated with a scheduling cell, the UE can be configured a bitmap with N bits, wherein a value "1" for a bit in the bitmap indicates scheduling on the corresponding cell, and a value "0" for the bit in the bitmap indicates no scheduling on the corresponding cell. For example, the bitmap can be in ascending or descending order of cell indexes or (cell-level) CIF values or cell indexes for the scheduled cells. For example, the left-most bit (respectively, the right-most bit) can correspond to a scheduled cell with the smallest cell index or cell-level CIF, and the second left-most bit (respectively, the second right-most bit) can correspond to a scheduled cell with the second smallest cell index or cell-level CIF, and so on. For example, if the UE is configured a number M scheduled cells, such as M=4 cells, that is less than a maximum supported number of N scheduled cells, such as N=8 cells, in one option, the bitmap can include 8 bits, and the remaining rightmost (respectively, the remaining leftmost) M−N bits, such as 8−4=4 bits, can be all zeros or all ones. In another option, the bitmap can include only M=4 bits.

In one example, a UE can implicitly determine indexes for co-scheduled cells without need for explicit gNB indication. For example, the UE can determine indexes for co-scheduled cells based on a PDCCH monitoring parameter, such as: (1) a CORESET index; (2) a search space set index, or a carrier indicator parameter n_CI corresponding to the search space set index; or (3) a set of CCEs in the search space set or a first/last CCE in the search space set, where the UE received a PDCCH providing the DCI format for multi-cell scheduling.

According to the third option, the UE can be configured a mapping among values for PDCCH monitoring parameters, such as search space sets, and a number of co-scheduled cells or indexes of the co-scheduled cells. In one example, first and second values for parameter n_CI in a search space set can respectively indicate first and second subsets of co-scheduled cells. According to this example, the parameter n_CI can correspond to a single cell or can correspond to a group of cells, such as a subset/set of co-scheduled cells.

In one example, a UE can determine a set of co-scheduled cells based on other fields in an MC-DCI format, without using a CIF field. For example, when the UE is provided a joint TDRA or FDRA table for multi-cell scheduling, an index of the joint TDRA or FDRA table can indicate a set/subset of co-scheduled cells. For example, an entry/row in the joint TDRA or FDRA table configured by the RRC includes a first TDRA or FDRA information for a first cell and a second TDRA or FDRA information for a second cell, and so on, while the entry may include no information for a third cell. Therefore, when the MC-DCI format includes an indication of the entry/row of the joint TDRA or FDRA table implies that the first and second cells are jointly scheduled by the MC-DCI format, while the third cells is not scheduled. In one example, other DCI fields with joint indication can be used other than TDRA or FDRA, such as the FDRA field.

In another example, a UE expects that an MC-DCI format includes a number N a cell-specific field(s) such as TDRA or FDRA fields corresponding to a maximum number N of supported/configured scheduled cells for a scheduling cell, wherein a certain value such as all zeros or all ones for the cell-specific fields is reserved to indicate no scheduling on the corresponding cell. Therefore, when the UE receives an MC-DCI format that includes M cell-specific fields (out of the N maximum number of fields) with the reserved value, the UE determines that the MC-DCI format does not schedule the corresponding M cells and jointly schedules only the corresponding N-M cells. In one example, other DCI fields with separate indication can be used other than the TDRA field, such as the FDRA field.

In another example, when a HARQ process number (HPN) field or a redundancy version (RV) field, or a new data indicator (NDI) field are separately provided for each scheduled cell (from a maximum number N of supported/configured scheduled cells for a scheduling cell) in an MC-DCI format and a combination of those fields, such as all of those fields, have same predetermined values for a subset of co-scheduled cells, such as HPN all 1s such as 15 (when counting from 0 to 15 for a HPN field of 4 bits), RV 1, and NDI 1, for each cell in the subset of cells, the subset of co-scheduled cells can be assumed as not being scheduled by the MC-DCI format. The MC-DCI format jointly schedules only the remaining cells from the set of co-scheduled cells.

In another example, when an MCS field is separately provided for each scheduled cell (from a maximum number N of supported/configured scheduled cells for a scheduling cell) in an MC-DCI format and the MCS field has a predetermined value, such as 0, for a subset of co-scheduled cells, the subset of co-scheduled cells can be assumed as not being scheduled by the MC-DCI format. The MC-DCI format jointly schedules only the remaining scheduled cells.

Receptions or transmissions on a respective subset of cells that are jointly scheduled by a single DCI format, or by using complementary embodiments such as those described in embodiment of the present disclosure, can refer to PDSCHs or PUSCHs that may or may not overlap in time. For example, the UE can be indicated to receive PDSCHs or to transmit PUSCHs on respective co-scheduled cells wherein all receptions/transmissions are in a same slot or at least one reception/transmission is in a different slot than the remaining ones.

A UE that is configured for multi-cell scheduling can be provided a first set of cell-common parameters whose values apply for scheduling on all co-scheduled cells, and a second set of cell-specific parameters whose values apply for scheduling on each corresponding co-scheduled cell. The UE can determine cell-common and cell-specific scheduling information parameters based on the specifications of the system operation, or based on higher layer configuration. For some cell-specific scheduling information parameters, the UE can be provided differential values compared to a reference value wherein the reference value can correspond, for example, to a first scheduled cell from a set of scheduled cells. For example, the reference value can correspond to the scheduled cell with the smallest cell index or smallest (cell-level) CIF value.

For a UE that is configured a number of sets of co-scheduled cells, a DCI format for multi-cell scheduling can provide complete or partial information for cell-common or cell-specific scheduling parameters, for multiple PDSCH receptions or multiple PUSCH transmissions on respective multiple co-scheduled cells. When the DCI format for multi-cell scheduling provides partial information for a scheduling parameter, the UE can determine remaining information from UE-specific RRC signaling or by other complementary embodiments.

A PDSCH reception or a PUSCH transmission on any cell from a set of co-scheduled cells can be scheduled by a DCI format that does not schedule any other PDSCH reception or PUSCH transmission on any other cell from the set of co-scheduled cells, such as for example by a DCI format not having a multi-cell scheduling capability, or when there is no traffic associated with the other cells. For example, for a UE that is configured cross-carrier scheduling for a set of co-scheduled cells by a scheduling cell, the UE can receive on the scheduling cell a first PDCCH that includes a first DCI format for scheduling a single cell from the number of co-scheduled cells and a second PDCCH that includes a second DCI format for scheduling all cells in the set of co-scheduled cells.

Herein, a DCI format for multi-cell scheduling can refer to, for example, one or more or a combination of: (1) a concatenated DCI format for multi-cell scheduling; (2) a DCI format based on multi-cell mapping; (3) a first DCI format in a first PDCCH or a second DCI format or an M-DCI format or a collection of M-DCI formats included in a first PDSCH that is scheduled by the first DCI/PDCCH; or (4) a first DCI format in a first PDCCH or a second DCI format in a second PDCCH, wherein the first DCI/PDCCH and the second DCI/PDCCH are linked in a two-stage DCI operation, wherein the aforementioned terms and procedures are described in embodiment of the present disclosure.

For a UE that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary embodiments.

In one example, referred to as concatenated DCI format for multi-cell scheduling, a single DCI format can include information of all scheduling parameters for all the co-scheduled PDSCH receptions or PUSCH transmissions, except possibly for some information that is provided by higher layers or predetermined by the specifications for system operations or determined by the UE. For example, the MC-DCI format can provide separate values of fields for PDSCH reception or PUSCH transmission on each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This example can be beneficial, for example, for co-scheduling cells that have different channel characteristics or configurations, such as for inter-band CA operation, or for co-scheduling a PDSCH reception and a PUSCH transmission.

Some DCI fields can be cell-common and provided only once in a concatenated DCI format. In one example, a functionality of a field in a first DCI format scheduling PDSCH reception or PUSCH transmission on a single cell and provides information for multiple cells, such as a SCell dormancy indicator field as described in TS 38.213, can remain same in a second DCI format scheduling PDSCH receptions or PUSCH transmissions on multiple cells and the field can remain as in the first DCI format. Alternatively, such fields can be omitted from the second DCI format.

In one example, referred to as multi-cell scheduling via multi-cell mapping, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. For example, the field can be an MCS field wherein a value indicated in the DCI format can be for a PDSCH reception on a first cell and a value for a PDSCH reception on a second cell can be determined from the first value and a configured offset value. It is also possible that a same MCS value applies for all PDSCH receptions or PUSCH transmissions. This example can be beneficial, for example, for co-scheduling cells that have several similar physical channel characteristics or configurations, such as for intra-band CA operation.

In one example, referred to as single-cell DCI pointing to a PDSCH with multi-cell scheduling, a UE can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This example can be beneficial, for example, for co-scheduling several (such as 4-8) cells that have different channel characteristics or configurations, such as for inter-band CA operation.

In one example, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

In one example, multi-cell scheduling information is multiplexed as M-DCI in a PDSCH. The UE receives a first PDSCH that is scheduled by a single-cell scheduling DCI format, and the UE receives additional scheduling information for one or more PDSCH(s)/PUSCH(s) on one or more respective co-scheduled cell(s). The UE allocates the coded modulation symbols for M-DCIs to time/frequency resources within the first PDSCH, for example in a frequency-first, time-second manner, except for reserved resources corresponding to reference signals or other cell-level broadcast transmissions. The UE can start receiving the M-DCIs in a first symbol of the first PDSCH, or in a first symbol after first symbols with DM-RS REs, in the first PDSCH. The M-DCIs can be jointly coded and include a single CRC.

In one example, referred to as multi-stage PDCCHs/DCIs for multi-cell scheduling, a UE can be provided information for multi-cell scheduling of multiple PDSCHs/PUSCHs on multiple respective cells using a multi-stage DCI embodiment, such as a 2-stage DCI wherein, for example, a first-stage DCI format includes a set of cell-common fields, and a second-stage DCI format includes cell-specific fields. The UE receives the first-stage DCI format in a first PDCCH and the second-stage DCI format in a second PDCCH. The first PDCCH and the second PDCCH are linked. In one example, the first and the second PDCCHs are in a same search space set. This example can be beneficial, for example, for co-scheduling several cells that have several common physical characteristics, such as a time-domain resource allocation or a frequency-domain resource allocation using the first-stage DCI format and without incurring latency or having a DCI format size that is too large (that may result if the first-stage and second-stage DCI formats were combined into a single DCI format) for receiving cell-specific parameters when the second PDCCH is received in a same slot as the first PDCCH.

The first-stage DCI format can also indicate a time/frequency resource for a PDCCH providing the second-stage DCI format, such as an index of a PDCCH candidate for a corresponding CCE aggregation level, so that the UE can interpret the contents of the second-stage DCI format or reduce a number of PDCCH receptions. A UE can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s), or based on PDCCH monitoring parameters, such as CORE-SET, search space, CCEs, or monitoring occasions in which the UE receives the first and the second linked PDCCHs.

When a UE is configured a set of co-scheduled cells including a first cell, the UE can receive a PDCCH with a DCI format that schedules a PDSCH reception or PUSCH transmission only on the first cell (single-cell scheduling DCI format). The UE can distinguish a single-cell scheduling DCI (SC-DCI) format from a multi-cell scheduling DCI (MC-DCI) format via various embodiments, such as a DCI format size, or an RNTI used for scrambling a CRC of a DCI format for multi-cell scheduling, or by an indication by a field in the DCI format, or by a dedicated CORESET and associated search space sets.

In one example, a first DCI format size for multi-cell scheduling can be different from a second DCI format size for single-cell scheduling. The first DCI format size can be such that it can include a field (such as set-level CIF) identifying a set of co-scheduled cells and possibly a number of fields, such as cell-common scheduling parameters, enabling a UE to decode remaining scheduling information, or a PDCCH candidate that provides a second-stage DCI format.

For example, the UE can distinguish multi-cell scheduling from single-cell scheduling based on one or more dedicated DCI formats or DCI format sizes for multi-cell scheduling, that are not used for single-cell scheduling. For example, the UE can be configured a DCI format 0_3 for transmission of multiple PUSCHs or a DCI format 1_3 for reception of multiple PDSCHs on a set of co-scheduled cells. In one example, a size of an MC-DCI format can be same regardless of how many cells are jointly scheduled by the MC-DCI. In another example, a size of a DCI format for multi-cell scheduling can also depend on a number of co-scheduled cells or a set of cell-common or cell-specific scheduling parameters for multi-cell scheduling. A DCI format size for scheduling transmission of multiple PUSCHs can be different from a DCI format size for scheduling reception of multiple PDSCHs on a set of co-scheduled cells.

In another example, a UE is not configured a size for MC-DCI formats by higher layers and determines a size of the MC-DCI format based on the bit-width configuration of fields in the MC-DCI formats, possibly along with any applicable zero padding in a DCI size alignment procedure. The specifications for system operation ensure that sizes of MC-DCI formats are not same as sizes for SC-DCI formats in a same scheduled cell. Zero padding can be used, if needed, to ensure the different DCI sizes. Such aspects are described in embodiment of the present disclosure.

To avoid requiring a larger number of DCI format sizes for a UE to support multi-cell scheduling and avoid fragmentation of a number of PDCCH candidates that a UE can monitor over an increased number of DCI format sizes, it is beneficial to provide additional means for distinguishing multi-cell scheduling from single-cell scheduling by means other than DCI format size. Therefore, an MC-DCI format can have a same size as an SC-DCI format. Accordingly, other examples can be considered to identify whether a DCI format performs single-cell scheduling or multi-cell scheduling as described in the following.

In one example, a UE can distinguish multi-cell scheduling based on a new/dedicated RNTI, such as a M-RNTI, for scrambling a CRC of a DCI format for multi-cell scheduling. For example, such an RNTI can be configured by UE-specific RRC signaling.

In one example, a UE can distinguish multi-cell scheduling based on an field or an indication in a DCI format for multi-cell scheduling. For example, a DCI format can include a 1-bit flag, with a value "1" corresponding to multi-cell scheduling, and a value "0" corresponding to single-cell scheduling. Such field needs to be present in both MC-DCI formats and SC-DCI formats. In one example, there can be restrictions on a size of an MC-DCI format. For example, the UE does not expect that an MC-DCI format has a same size as a DCI format 0_0 or 1_0. Accordingly, a 1-bit flag to indicate single-cell versus multi-cell scheduling is only present in certain SC-DCI formats, such as DCI formats 0_1 or 1_1 or DCI formats 0_2 or 1_2.

In one example, a UE can distinguish multi-cell scheduling based on values of CIF or other fields in the DCI format. For example, the UE can be configured separate values for cell-level CIF corresponding to individual scheduled cells, and set-level CIF values corresponding to sets/ subsets of co-scheduled cells. For example, the UE can be configured CIF values 0, 1, 2, 3 corresponding to cells #0, #1, #2, and #3, respectively, and CIF values 4, 5, 6, and 7 corresponding to four different sets/subset of co-scheduled cells. Then, the UE can determine whether the DCI format is for scheduling one or multiple cells (that is, interpret the DCI format as SC-DCI or MC-DCI) based on the CIF value. The role of the 1-bit flag described above can be absorbed into the CIF value. In another example, values for other fields, such as TDRA or FDRA, or a validation procedure on one or more fields in the DCI format, such as a combination of HPN, RV, or NDI, can be used to determine the cells scheduled by the DCI format, as described earlier, which in turn can determine whether the DCI format is scheduling one (SC-DCI) or multiple (MC-DCI) cells.

In yet another example, a UE can distinguish multi-cell scheduling based on a validation procedure for an MC-DCI format (respectively, SC-DCI format. For example, when values for one or more DCI fields in an MC-DCI format (respectively, SC-DCI format) is set to default/predetermined values, the UE determines that the DCI format is used for multi-cell scheduling. In example, one or more DCI fields corresponding to cell-specific scheduling parameters, such as HPN, RV, NDI, SRI, TCI state, antenna ports (Aps), TDRA, FDRA, or MCS, can be set to all-zeros or all-ones values, for the case of multi-cell scheduling.

In one example, a UE can distinguish multi-cell scheduling based on a CORESET associated with a search space set that is configured for receiving PDCCH that provides a DCI format for multi-cell scheduling. For example, the UE can be configured with a dedicated CORESET for multi-cell scheduling, so that search space sets for multi-cell scheduling do not overlap with search space sets that are not used for multi-cell scheduling.

In one example, a combination of the above options can be used. For example, for multi-cell scheduling based on a first stage DCI format and a second stage DCI format, the UE determines a DCI format (in a first PDCCH) that is scrambled by a new/dedicated RNTI, such as an M-RNTI, and also satisfies the aforementioned validation procedure, to be a first-stage DCI format and a second-stage DCI format can be included in a PDSCH scheduled by the first stage DCI format or in another PDCCH, as described in embodiment of the present disclosure.

FIG. 6 illustrates a flowchart of procedure 600 for distinguishing a multi-cell scheduling DCI format from a single-cell scheduling DCI format according to embodiments of the present disclosure. The procedure 600 as may be performed by a UE (e.g., 111-116 as illustrated in FIG. 1). An embodiment of the procedure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

A UE is configured a first DCI format or a first RNTI for single-cell scheduling, and a second DCI format or a second RNTI for multi-cell scheduling, 610. The UE receives a PDCCH that provides a DCI format, 620. The UE decodes the DCI format based on a first size or a second size or based on a first RNTI or a second RNTI for scrambling a CRC, 630. The UE determines whether the decoded DCI format has the first size or the second size, or has CRC scrambled by the first RNTI or the second RNTI, 640. When the DCI format has the first size or has CRC scrambled by the first RNTI, the UE determines that the DCI format performs single-cell scheduling 650. When the DCI format has the second size or CRC scrambled by the second RNTI, the UE determines that the DCI format performs multi-cell scheduling, 660.

In one example, a UE need not distinguish a DCI format for single-cell scheduling from a DCI format for multi-cell scheduling because the UE only uses one DCI format type, such as only MC-DCI format 0_3 or 1_3, for both scheduling one cell and scheduling multiple cells. For example, the UE does not expect to be configured both MC-DCI formats, such as 0_3 or 1_3, for a set of co-scheduled cell and SC-DCI formats, such as 0_1 or 1_1, for a given scheduled cell or for all scheduled cells in the set of co-scheduled cells. For example, the UE can receive a first MC-DCI format that schedules only on one scheduled cell (that is, a subset of cells that includes one cell), and a second MC-DCI format that schedules on more than one scheduled cells. Such indication can be based on, for example, (i) a CIF value that corresponds to a single cell, or (ii) a field value, such as a TDRA field or FDRA field value, that includes only one value for one cell and reserved values for other cells, or (iii) a field value, such as a TDRA field or FDRA field value, that indicates a row from a joint multi-cell table, such as a joint multi-cell TDRA or FDRA table, wherein the row corresponds only to a single cell, or (iv) a validation procedure wherein one or more fields, such as a combination of HPN, RV, and NDI, in the MC-DCI format are set to predetermined values, as described earlier.

For example, when a cell-specific field (e.g., such as a TDRA or FDRA field) that includes four entries for a corresponding set of four schedules cells has an all-zero value for two of the four entries in a DCI format, a UE can determine that the DCI format does not schedule on the corresponding two cells with the all-zero value for the cell-specific field. Similar, predetermined values for other fields in a DCI format, or their combinations, can be used to indicate absence of scheduling on a subset of cells from a set of scheduled cells associated with the DCI format.

In another example, a UE need not distinguish a DCI format for single-cell scheduling from a DCI format for multi-cell scheduling because an existing single-cell scheduling DCI format such as one of those supported in TS 38.212 can be re-used for multi-cell scheduling, for example, by re-interpreting existing fields or considering new/increased/configurable bit-width for existing fields or by adding new field(s). Herein, the UE determines the existence (or not) of re-interpreted/modified/new DCI fields based on whether a CIF value refers to a single scheduled cell or a set/subset of co-scheduled cells or other embodiments described above. Accordingly, re-interpreted/modified/new DCI fields follow the multi-cell scheduling configuration provided for a set of co-scheduled cells that is indicated by (a set-level value for) the CIF field or determined based on fields in the DCI format.

In one embodiment, when an MC-DCI format, such as 0_3 or 1_3, is used for scheduling only a single cell, various embodiments can be considered to enable such scheduling. In one embodiment, the MC-DCI format for scheduling one single cell has same structure/fields as an MC-DCI format for scheduling multiple cells, including any absent or disabled or restricted field(s). In one embodiment, the structure/fields of MC-DCI format when used for scheduling a single cell can be different from the structure/fields of MC-DCI format when used for scheduling multiple cells.

According to embodiment of the present disclosure, the MC-DCI format for scheduling on one single cell has same structure/fields as an MC-DCI format for scheduling on multiple cells. For example, when a field in the MC-DCI format is (pre)determined or configured to be cell-specific, including N values corresponding to a maximum of N cells, the MC-DCI format will include only one non-reserved value for the one single cell, along with (N−1) reserved values. For example, when the UE is predetermined or configured to exclude a certain field in the MC-DCI format (that is present in an SC-DCI format), that certain DCI field is also excluded/absent when the MC-DCI format is used for scheduling one single cell. For example, if BWP indicator field is not present in an MC-DCI format, the BWP indicator field is not present even when the MC-DCI format is used for scheduling one single cell. For example, BWP indicator field is only present in a SC-DCI format, such as 0_1 or 1_1. Similar for other fields such as one or more of SUL indicator, or CBG related fields for HARQ-ACK reports, or SCell dormancy indication, or PDCCH monitoring adaptation indication, and so on.

According to embodiments of the present disclosure, the structure/fields of MC-DCI format when used for scheduling a single cell can be different from the structure/fields of MC-DCI format when used for scheduling multiple cells. For example, when the UE determines that an MC-DCI format corresponds to a single cell, for example, based on the CIF value or possibly based on a cell-common TDRA or FDRA value with joint multi-cell TDRA or FDRA table or a cell-common FDRA field, the MC-DCI format can exclude some fields that are present when MC-DCI format is used for scheduling multiple cells, or can include some fields that are absent when MC-DCI format is used for scheduling multiple cells. For example, an MC-DCI format used for scheduling a single cell can exclude some/all cell-specific DCI fields. For example, the MC-DCI format can exclude (N−1) reserved values corresponding to non-present cells for a cell-specific field, such as MCS or HPN or RV or NDI, and include only one value corresponding to the single cell that is scheduled by the MC-DCI format.

In another example, although an MC-DCI format when scheduling multiple cells can be (pre)determined or configured to exclude certain DCI fields, such as BWP indicator or SUL indicator or CBG related fields or SCell dormancy indication or PDCCH monitoring adaptation indication, the MC-DCI format when scheduling a single cell can include one or more of such fields. For example, when the MC-DCI is used for scheduling multiple cells, corresponding functionalities of such fields may not be supported by a MC-DCI format or the UE may determine values for such fields based on higher layer configuration or based on default values, or based on predetermined rules. Conversely, when the MC-DCI is used for scheduling a single cell, the UE can determine values for such fields based on indication in the MC-DCI format by interpreting the MC-DCI as a SC-DCI. For example, an MC-DCI format when used for scheduling multiple cells can be (pre)determined or configured to use a restricted value set for a DCI field, such as only 2 bits for the HPN field to indicate one out of 4 HARQ processes.

However, an MC-DCI format when used for scheduling one single cell can be (pre)determined or configured to use an unrestricted value set, such as 4 or 5 bits for HPN to indicate one out of 16 or 32 HARQ processes, as used in a legacy single-cell DCI format, such as DCI format 0_1 or 1_1. For example, when the MC-DCI format schedules on a subset of cells from the set of co-scheduled cells, including on one cell, the MC-DCI format can have a same size as for scheduling on all cells from the set of co-scheduled cells and some fields that are not applicable when scheduling on cells can be re-interpreted as providing other functionality such as for a BWP indicator field, or an A-CSI report triggering field, or for SCell dormancy indication and so on. For example, based on values of the TDRA or FDRA field for scheduled cells, the UE can determine that the MC-DCI performs scheduling on a subset of cells and can re-interpret other fields corresponding to non-scheduled cells, such as an FDRA or an MCS field, to provide other functionalities such as the ones mentioned above and, in general, functionalities the UE is configured to be provided by a SC-DCI format.

One embodiment provides a different interpretation of MC-DCI fields based on UE determination whether the MC-DCI format is used for scheduling a subset of cells, including a single cell, or multiple cells, such as based on CIF value corresponding to a single cell or multiple cells.

With embodiments of the present disclosure, the MC-DCI format can have a same size, such as a DCI size determined based on a maximum number of supported/configured co-schedule cells (for a corresponding scheduling cell), or a DCI size corresponding to a search space set in which the UE monitors the MC-DCI format. Therefore, when necessary, zeros can be padded to the MC-DCI format when used for scheduling a single cell so that a size of the MC-DCI format is same regardless of whether the DCI format is used for scheduling a single cell or multiple cells, and regardless of the examples above. Alternatively, without considering the CRC bits that can be at the end of a DCI format, when a size of a SC-DCI includes M bits and a size of a MC-DCI includes N bits, with N>M, the UE can ignore the last N-M bits when the MC-DCI schedules PDSCH reception or PUSCH transmission on a single cell.

In one example, the structure/fields in an MC-DCI format when scheduling a single cell can be identical to the structure/fields in a certain DCI format for single-cell scheduling, such as DCI format 0_1 or 1_1, that is predetermined in the specifications or configured by higher layers.

In another embodiment, the structure/fields in an MC-DCI format when scheduling on a subset of cells, including on one single cell, can be identical to the structure/fields in a DCI format for single-cell scheduling, that is indicated by the MC-DCI itself. For example, a "cell-subset DCI format identifier" field can be included in the MC-DCI format when used for scheduling on a subset of cells from the set of co-scheduled cells. For example, when the CIF (or any other indication with similar role) in the MC-DCI format does not indicate all cells in a set of co-scheduled cells or does not indicate a maximum number of supported/configured co-scheduled cells (associated with a scheduling cell), leftover bits can be used to enhance the MC-DCI for the subset of scheduled cells (including a single cell), for example, by including additional scheduling information.

For example, each scheduled cell can have a BWP indicator, or there can be a dormancy indicator field (as for an SC-DCI), and so on. Determination of fields and corresponding bit-widths, along with any associated conditions (for example, for a number of scheduled or non scheduled cells) can be predetermined in the specifications for the system operation or can be configured by higher layers. For example, there can be a list of options for such determination, and the "cell-subset DCI format identifier" can include an ID for an option from the list of options. The UE can re-interpret the remaining bits of MC-DCI based on such determination.

In one example, the cell-subset can be a single cell, so the field can be referred to as "single-cell DCI format identifier" wherein values of such field can indicate one of existing SC-DCI formats, such as 0_0/1_0, or 0_1/1_1, or 0_2/1_2.

In one example, the MC-DCI format can exclude a "cell-subset DCI format identifier" field when the MC-DCI format is used for scheduling multiple cells, as determined based on, for example, the CIF value or the TDRA or FDRA field value. In another example, the MC-DCI format can include a "cell-subset DCI format identifier" field regardless of whether the MC-DCI format is used for scheduling a subset of cells or all cells in the set of co-scheduled cells. For example, when the MC-DCI format is used for scheduling all cells in the subset of co-scheduled cells, the "cell-subset DCI format identifier" field can have a reserved value, such as "11" in the example above, to indicate that the interpretation of the fields of the MC-DCI format.

FIG. 7 illustrates a flowchart of procedure 700 for interpreting a multi-cell scheduling DCI (MC-DCI) format as a single-cell scheduling DCI format according to embodiments of the present disclosure. The procedure 700 as may be performed by a UE (e.g., 111-116 as illustrated in FIG. 1). An embodiment of the procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

A UE is configured a first DCI format for single-cell scheduling (SC-DCI), and a second DCI format for multi-cell scheduling (MC-DCI), 710. The UE receives a PDCCH that provides an MC-DCI format, 720. The UE determines whether MC-DCI used for scheduling one cell or multiple cells (e.g., based on CIF value), 730. When the UE determines that the MC-DCI format is used for scheduling multiple cells, the UE interprets the fields in the MC-DCI format based on the second DCI format and corresponding multi-cell scheduling configuration, 740. When the UE determines that the MC-DCI format is used for scheduling one cell, the UE interprets the fields in the MC-DCI format based on the first DCI format and corresponding single-cell scheduling configuration, 750.

FIG. 8 illustrates a flowchart of procedure 800 for interpreting a MC-DCI format as one from multiple SC-DCI formats based on indication in the MC-DCI according to embodiments of the present disclosure. The procedure 800 as may be performed by a UE (e.g., 111-116 as illustrated in FIG. 1). An embodiment of the procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

A UE is configured first DCI formats for single-cell scheduling (SC-DCI), and a second DCI format for multi-cell scheduling (MC-DCI), 810. The UE is configured a mapping among values of a "SC-DCI format identifier" field and the first DCI formats, 820. The UE receives a PDCCH that provides an MC-DCI format, 830 The UE determines whether MC-DCI used for scheduling one cell or multiple cells (e.g., based on CIF value), 840. When the UE determines that the MC-DCI format is used for scheduling multiple cells, the UE interprets the fields in the MC-DCI format based on the second DCI format and corresponding multi-cell scheduling configuration, 850. When the UE determines that the MC-DCI format is used for scheduling one single cell, the UE determines a value for the "SC-DCI format identifier" field in the MC-DCI, 860. The UE determines a SC-DCI format from the first DCI formats based on the value of the "SC-DCI format identifier" field and the mapping, 870. The UE interprets the MC-DCI format based on the SC-DCI format and corresponding single-cell scheduling configuration, 880.

In another example, a UE can interpret an MC-DCI format as performing scheduling on a subset of cells or on all cells from the set of co-scheduled cells based on predetermined values of fields in the MC-DCI format. For example, when the DCI format includes N>1 MCS fields and, expect for value of a first number of MCS fields, the values of all other MCS fields are 0, the UE can interpret the MC-DCI format as performing scheduling on a first number of cell (subset of cells). The interpretation of the MC-DCI format can be for a SC-DCI format that is predetermined in the specifications of the system operation or is configured by higher layers, such as DCI format 1_1. Instead of the MCS field, any other predetermined field, or combinations of fields can be used, such as the HPN field, the RV fields, the NDI fields, and so on as it was previously described.

When an MC-DCI format is used for scheduling on a subset of cells, instead of all cells in the set of co-scheduled cells, the bits of several fields in the MC-DCI format can become available for other purposes. For example, when a predetermined value of a MCS field is used to indicate that the MC-DCI format is used for scheduling on a subset of cells and the MC-DCI format includes separate HPN, RV, NDI, and so on fields for each scheduled cell, the bits of the HPN/RV/NDI/ . . . fields of non-scheduled cells can be interpreted as providing another functionality such as a BWP indicator, a SRS triggering, SCell dormancy indication, and so on or, in general, any functionality that the UE is configured to be provided when MC-DCI format performs scheduling on a single cell, as for example a DCI format 1_1 or DCI format 1_2, and to not be provided when the MC-DCI format performs scheduling on more than one cells.

For a UE configured with one or more sets of co-scheduled cells, a size of a multi-cell-scheduling DCI format can be set-specific (where set refers to a set of co-scheduled cells), or set-size-specific (where set size refers to a size of a set of co-scheduled cells), or search space set specific, or scheduling cell specific, or common across different scheduling cells. In addition, the UE can be configured, for each field of the MC-DCI format, a same bit-width regardless of the set/number of co-scheduled cells or different bit-widths depending on the set/number of co-scheduled cells. For a cell-specific field in the MC-DCI format with up to N values corresponding to a maximum of N co-scheduled cells, the UE can be configured a same bit-width for each of the N values, including any un-used/reserved values for non-scheduled cells, or can be configured different bit-widths based on the number of co-scheduled cells. The latter can be beneficial, for example, to provide an increased granularity level for the cell-specific fields when the MC-DCI co-schedules fewer cells.

In one realization, a size of a MC-DCI format can be set-specific, that is, can depend only on a set of co-scheduled cells with an associated set-level CIF as provided by higher layers. For example, a first MC-DCI format corresponding to a first set of co-scheduled cells (with a first number of cells) can have a first size, and a second MC-DCI format corresponding to a second set of co-scheduled cells (with a second number of cells) can have a second size. For example, the first and second sizes can depend on the configuration (such as presence, absence, or bit-width) of DCI fields as provided for the first and second sets of co-scheduled cells, respectively. The UE determines an associated set-level CIF based on an $n_{CI}$ value configured/ determined for set of co-scheduled cells in a search space set that includes monitoring PDCCH for detection of the first MC-DCI format, or based on a set-level CIF value that is indicated in the carrier indicator field value of the MC-DCI format. For example, when the UE decodes PDCCH candidates in a search space set for detection of an MC-DCI format, and the search space set is associated with a set of co-scheduled cells with a carrier-set indicator value of n_CI, the UE determines a size of the MC-DCI format based on a configuration (for example, for field bit-widths) corresponding to the set of co-scheduled cells.

In one example, the UE determines a size for a first MC-DCI format associated with a first set of co-scheduled cells regardless of whether or not the UE is configured second MC-DCI formats within a same (or different) search space set, or whether or not the first MC-DCI format is configured within a same (or different) search space set and is associated with a second set of co-scheduled cells.

In one realization, a size of a MC-DCI format can be set-size-specific, that is, can be based on a size of (number of cells in) a set of co-scheduled cells. For example, when first and second sets of co-scheduled cells have a same size (that is, a same number of cells), the UE expects a same size for the multi-cell scheduling DCI format for both the first and the second sets of co-scheduled cells. In one example, the same DCI format size applies when the UE monitors the PDCCH for detection of an MC-DCI format corresponding to the first and the second sets of co-scheduled cells in a same search space set. In another example, the same MC-DCI format size applies regardless of whether or not the UE monitors PDCCH for detection of the MC-DCI format corresponding to the first and the second sets of co-scheduled cells in a same search space set. For example, the MC-DCI format size alignment applies across different search space sets (configured on respective DL BWPs of the respective sets of co-scheduled cells). For example, when first sets of co-scheduled cells include N=2 cells, the corresponding MC-DCI format can include 2 values for cell-specific fields, such as the MCS, while for second sets of co-scheduled cells with N=4 cells, the corresponding MC-DCI format can include 4 values for each cell-specific field.

In one example, a same size is achieved prior to any zero padding for size alignment. In another example, the UE expects zero padding a first DCI format with smaller size, so that the first DCI format has a same size as a second DCI format with originally larger size. In one example, the DCI fields are size aligned separately. In another example, zeros are appended to the end of the DCI format with smaller size.

In one realization, a size of a MC-DCI format can be search space set specific, that is, can be based on a search space set in which the UE monitors the DCI format. For example, the UE can determine a first size for a MC-DCI format monitored in a first search space set, and a second size for the MC-DCI format monitored in a second search space set. For example, the DCI format size can depend not only on higher layer configuration for DCI fields for a corresponding set of co-scheduled cells, but also on higher layer configuration for DCI fields for other sets of co-scheduled cells for which the MC-DCI format is monitored in the same search space set or on a number of cells in a set of co-scheduled cells. For example, when a UE determines that a search space set is associated with multiple sets of co-scheduled cells, the UE determines a same size for a MC-DCI format corresponding to the multiple sets of co-scheduled cells, wherein the MC-DCI size alignment can be achieved, for example, by zero padding.

For example, MC-DCI fields can be size aligned separately, or zeros can be appended to the end of the MC-DCI format(s) with smaller size(s) so that their size becomes equal to the largest size. For example, the MC-DCI format size can be based on the largest set of co-scheduled cells, from sets of co-scheduled cells associated with the search space set, that is, the set with the largest number of cells in the set. For example, the MC-DCI format size can be based on a set of co-scheduled cells, from sets of co-scheduled cells associated with the search space set, that requires a largest MC-DCI format size, for example, based on the multi-cell configuration for the set (because a first set may require more bits for a MC-DCI format field than a second set, such as a larger TDRA or FDRA table).

In one example, the UE determines a same size for the MC-DCI format monitored in a search space set regardless of whether the UE applies (same or) different carrier-set indicator field (set-level n_CI) values for different sets of co-scheduled cells that are associated with the search space set. For example, the UE can monitor PDCCH for the search space set with a first carrier-set indicator field (set-level n_CI) value, corresponding to a first set of co-scheduled cells with N=2 cells, and the UE determines the MC-DCI size to be same as that when the UE monitors PDCCH for the search space set with a second carrier-set indicator field (set-level n_CI) value, corresponding to a second set of co-scheduled cells with N=4 cells.

In one realization, a size of a MC-DCI format can be scheduling cell specific, that is, can be based on a corresponding scheduling cell that receives PDCCH for the MC-DCI format. For example, the UE determines a same size for a MC-DCI format corresponding to multiple sets of co-scheduled cells associated with a same scheduling cell. For example, the same size applies regardless of same or different sizes of the multiple sets of co-scheduled cells, or regardless of same or different search space sets in which the UE monitors PDCCH for detection of the MC-DCI format for the multiple sets of co-scheduled cells. For example, the MC-DCI format size alignment can be achieved by zero padding. For example, MC-DCI format fields can be size aligned separately, or zeros can be appended to the end of the MC-DCI formats with smaller sizes so that their size becomes equal to the largest size. For example, the MC-DCI format has a size determined based on fields used for scheduling on all cells from the set of co-scheduled cells regardless of a number of co-scheduled cells that can be smaller than the one for all cells in the set of co-scheduled cells.

In one realization, a size of a MC-DCI format can be BWP-specific, that is, can be based on a DL BWP of the corresponding scheduling cell that receives PDCCH for the MC-DCI format.

In one realization, a size of a MC-DCI format can be same across different scheduling cells. For example, a UE determines a same size for a MC-DCI format corresponding to multiple sets of co-scheduled cells associated with same or different scheduling cells. For example, the MC-DCI size alignment can be achieved by zero padding. For example, MC-DCI format fields can be size aligned separately, or zeros can be appended to the end of the MC-DCI formats with smaller sizes so that their size becomes equal to the largest size.

In one example, the first, or second, or third, or fourth, or fifth realizations above can be applied to structure/fields in a MC-DCI format itself in addition to/instead of only a size of the MC-DCI format. For example, for cell-specific MC-DCI format fields that need to be separately indicated for each co-scheduled cell, the UE can determine a number of values expected to be present in the MC-DCI format based on the embodiments described above. For example, when a set-level CIF value indicates that a MC-DCI format schedules 2 cells jointly, the UE expects that the MC-DCI format includes at least 2 (non-reserved) values for cell-specific DCI fields. Based on the embodiments and realizations described above, the MC-DCI format may additionally include zero or one or more reserved values for each cell-specific MC-DCI format field.

In one example, a size of a MC-DCI format is fixed to a predetermined/configured value regardless of a number of cells included in a set/subset of co-scheduled cells. For example, the predetermined/configured value for the size of the MC-DCI format can be based on a maximum possible/allowed number of co-scheduled cells, such as 8 cells. For example, when a size of a MC-DCI format is less than the predetermined/configured value, zeros are appended at the end of the MC-DCI format or separately for each MC-DCI format field, so that the size of the DCI format after zero-padding equals to the predetermined/configured value.

In another example, the UE can be provided a set-size threshold as well as two values for a size of a MC-DCI format. Then, when a first MC-DCI format schedules multiple PDSCH receptions or PUSCH transmissions on a first set of co-scheduled cells (associated with a first set-level $n_{CI}$ parameter for the respective search space set) that has a first size less than or equal to the set-size threshold, the first DCI format can have a size equal to the first value from the two values. When a second MC-DCI format schedules multiple PDSCH receptions or PUSCH transmission on a second set of co-scheduled cells (associated with a second set-level $n_{CI}$ parameter for the respective search space set) that has a second size greater than the set-size threshold, the first MC-DCI format can have a size equal to the second value from the two values. For example, the set-size threshold can be 4 cells, and the two values for MC-DCI format size can be 96 bits and 124 bits (excluding CRC bits). For sets of co-scheduled cells not exceeding 4 cells, a MC-DCI format size can be 96 bits, and for sets of co-scheduled cells with 5-8 cells, a MC-DCI format size can be 124 bits (excluding CRC bits). For example, this embodiment can be extended to N values for a size of a MC-MC-DCI format, and (N−1) set-size thresholds, such as N=4. For example, the values for the sizes of the MC-DCI format and the set-size thresholds can be predetermined in the specifications for system operation or can be provided by higher layer configuration.

In one example, a size of an MC-DCI format can be fixed in the specifications for system operation. In another example, the specifications for system operation can include a lower bound and/or an upper bound on the size of an MC-DCI format, such as no smaller than 20 bits or no larger than 140 bits.

In one example, a size of an MC-DCI format can be configured by higher layers, such as RRC configuration. The DCI size provided by higher layers can be subject to upper or lower bounds provided by the specifications for system operation.

In one example, a size of an MC-DCI format is determined based on a maximum number of supported/configured co-scheduled cells or a maximum necessary size of MC-DCI format fields to support multi-cell scheduling for the configured sets/subset of co-scheduled cells in respective (active) BWPs of the corresponding cells. That is, a MC-DCI format size (prior to any size matching) is determined, based on a total number of cells in a set of co-scheduled cells, as a sum of sizes for fields included in the MC-DCI format, including fields that are separate for each scheduled cell, such as a HARQ process number field, and fields that are common for among the scheduled cells, such as a HARQ-ACK timing indicator field or a TPC command field.

In one realization, MC-DCI formats are constructed separately for different sets/subsets of co-scheduled cells (corresponding to a same scheduling cell) based on configurations for the cells in the corresponding sets/subsets, including using a number of values equal to the number of actually co-scheduled cells, and then zeros are appended to MC-DCI formats with smaller sizes until their size is equal to the MC-DCI formats with the largest size.

In another realization, MC-DCI formats are constructed with same number of values per MC-DCI format field and same bit-width for all values/fields, across different sets of co-scheduled cells.

FIG. 9 illustrates a flowchart of procedure 900 for determining a size of the MC-DCI format based on the search space set in which the UE monitors the MC-DCI format according to embodiments of the present disclosure. The procedure 900 as may be performed by a UE (e.g., 111-116 as illustrated in FIG. 1). An embodiment of the procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

A UE is configured a number of sets of co-scheduled cells associated with a scheduling cell, 910. The UE is configured a first USS set that is associated with first sets of co-scheduled cells from the number of sets of co-scheduled cells, and a second USS set that is associated with second sets of co-scheduled cells from the number of sets of co-scheduled cells, 920. The UE is configured to monitor a DCI format for multi-cell scheduling (MC-DCI) in the first USS set and in the second USS set, 930. The UE determines a first size for the MC-DCI format in the first USS set based on a maximum corresponding size across the first sets of co-scheduled cells, and determines a second size for the MC-DCI format in the second USS set based on a maximum corresponding size across the second sets of co-scheduled cells, 940.

FIG. 10 illustrates a flowchart of procedure 1000 for determining a size of the MC-DCI format that is common across different sets of co-scheduling co-scheduled cells associated with a scheduling cell according to embodiments of the present disclosure. The procedure 1000 as may be performed by a UE (e.g., 111-116 as illustrated in FIG. 1). An embodiment of the procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

A UE is configured a number of sets of co-scheduled cells associated with a scheduling cell, 1010. The UE is configured a first USS set that is associated with first sets of co-scheduled cells from the number of sets of co-scheduled cells, and a second USS set that is associated with second sets of co-scheduled cells from the number of sets of co-scheduled cells, 1020. The UE is configured to monitor a DCI format for multi-cell scheduling (MC-DCI) in the first USS set and in the second USS set, 1030. The UE determines, in both the first USS set and the second USS set, a size for the MC-DCI format based on a maximum corresponding size across the number of sets of co-scheduled cells, 1040.

In another example, a size/bit-width of one or more DCI field for multi-cell scheduling (including presence or absence thereof) can be configurable based on higher layer configuration for the corresponding set of co-scheduled cells or for any set/subset of co-scheduled cells associated with the same scheduling cell.

Various embodiments can be used to determine a size/bit-width of a MC-DCI format field in an MC-DCI format. In one embodiment, a size/bit-width of a MC-DCI format field is based on the multi-cell scheduling configuration for a corresponding set/subset of co-scheduled cells indicated by the MC-DCI format. For example, a size of a MC-DCI format field can be a first number of bits for a first set/subset of co-scheduled cells, and can be a second number of bits for a second set/subset of co-scheduled cells. For example, when TDRA or FDRA is (pre)determined or configured to be a cell-common MC-field for an MC-DCI format (for example, based on a joint multi-cell TDRA or FDRA table), the MC-DCI can include 8 bits for TDRA or FDRA for a first set of co-scheduled cells and 12 bits for TDRA or FDRA for a second set of co-scheduled cells (since a first TDRA or FDRA table corresponding to the first set includes a smaller number of rows/entries, and a second TDRA or FDRA table corresponding to the second set includes a larger number of rows/entries). In such case, a MC-DCI format size alignment across different sets/subsets of co-scheduled cells, if needed, can be applied after sizes for all MC-DCI format fields are determined (that is, no size alignment for individual MC-DCI format fields, while performing size alignment for the entire MC-DCI format, across different sets/subsets of co-scheduled cells). For example, zeros can be appended so that MC-DCI formats corresponding to different sets/subsets of co-scheduled cells can have a same size.

In one embodiment, a size/bit-width of a MC-DCI format field is based on the multi-cell scheduling configuration across different configured sets/subsets of co-scheduled cells, in respective active DL BWPs or across all configured BWPs, that correspond to a same scheduling cell. For example, a size/bit-width of a field in the MC-DCI format is equal to a maximum size/bit-width determined for different sets/subsets of co-scheduled cells. For example, the UE is configured four different sets/subsets of co-scheduled cells corresponding to a scheduling cell, and the TDRA or FDRA field requires possibly four different sizes, such as 8 bits, 9 bits, 10 bits, and 12 bits, for the four sets/subsets, then the MC-DCI format can include 12 bits for TDRA or FDRA regardless of which set/subset of co-scheduled cells is indicated by the MC-DCI format. For example, the UE uses the bits from the LSBs (or MSBs) of the TDRA or FDRA field, and discards the remaining bits. For example, the UE uses the 8 LSBs (respectively, 8 MSBs) for the first set of co-scheduled cells, and discards the remaining 4 MSBs (respectively, 4 LSBs). In such case, size alignment is applied for each individual MC-DCI format field, among different sets/subsets of co-scheduled cells.

In another example, the UE expects that the configured bit-width for each field of the MC-DCI format is same across different sets of co-scheduled cells. For example, the UE expects that the UE is configured a same bit-width for the TDRA or FDRA field across different sets of co-scheduled cells corresponding to a same scheduling cell. For example, the UE can be configured with reserved values for a field in the MC-DCI format for some sets of co-scheduled cells. For example, the UE can be configured with some reserved rows in TDRA or FDRA tables corresponding to some sets of co-scheduled cells, so that a number of rows in TDRA or FDRA tables is same across different sets of co-scheduled cells.

In one example, (at least) for cell-specific DCI fields in an MC-DCI format that include multiple values for respective multiple co-scheduled cells, in one option, an MC-DCI format includes N values corresponding to N cells that are co-scheduled by the MC-DCI format. For example, the MC-DCI format includes 2 values for a field when the MC-DCI format indicates a set of co-scheduled cells with 2 cells, and the MC-DCI format includes 4 values for the DCI field when the MC-DCI format indicates a set of co-scheduled cells with 4 cells.

In another option, the MC-DCI format includes M≥N values, wherein M denotes the maximum size among different configured sets/subsets of co-scheduled cells, that is, the largest number of cells that is configured for joint scheduling using MC-DCI format (corresponding to a same scheduling cell). For example, when a UE is configured three different sets of co-scheduled cells, first set including 2 cells, and second set including 4 cells, and third set including 8 cells, the MC-DCI format includes 8 values for the cell-specific DCI field (such as HPN or NDI), regardless of whether the MC-DCI format indicates co-scheduling for the first set or the second set or the third set of co-scheduled cells. For example, when the MC-DCI format indicates the first set (respectively, the second set), the MC-DCI format will include 8−4=4 reserved values (respectively, 8−2=6 reserved values) for each cell-specific field. For example, the reserved values can be all zeros (or all ones) or have predetermined values. For example, the reserved values can be used to provide another functionality, such as SCell dormancy or active BWP indication and so on that can be provided by a SC-DCI format and is not provided by the MC-DCI format when it performed scheduling on all cells from the set of co-scheduled cells.

In yet another option, when a size of a cell-specific field in an MC-DCI format is (pre)determined or configured to be based on M values, with M as defined above, and when the MC-DCI format indicates a set of N co-scheduled cells, with N<M, instead of including N values for the N actually co-scheduled cells and (M−N) reserved values for the cell-specific DCI field, the MC-DCI format can exclude the (M−N) reserved values, and only include N values for the N actually co-scheduled cells with increases/scaled bit-width. This option can facilitate an increase in the granularity of the cell-specific DCI field. For example, a bit-width of the cell-specific DCI field can increase based on the ratio of a number of actually co-scheduled cells and a maximum supported/configured number of co-scheduled cells, such as by a scaling factor of MAN. The floor function can apply when the application of the scaling factor does not result to an integer number.

For example, when a UE is configured a maximum of 4 cells in sets of co-scheduled cells and an MC-DCI format co-schedules 2 cells, then the MC-DCI format can allocate 4/2=2 times bit-width for one or more cell-specific DCI fields for each of 2 actually co-scheduled cells (for example, 10 bits for FDRA for each cell instead of a baseline 5-bit FDRA for each cell, such as when co-scheduling 4 cells). In one example, a scaling factor or an increased size for the one or more cell-specific DCI fields can be predetermined by the specifications for system operation or can be configured by higher layers. For example, the one or more DCI fields for which the bit-width can be scaled/increased can be indicated by higher layer configuration or can be predetermined in the specifications for system operation (such as MCS or FDRA). For example, when cell-specific values for differential MCS is provided for co-scheduled cells, the granularity of such differential MCS can be increased (for example, 3 or 4 bits instead of a baseline 2 bits).

For example, FDRA indication can be based on units of 2 or 4 RBs instead of a baseline of 6 or 12 RBs, or based on a higher SCS configuration such as 30 or 60 kHz instead of a baseline SCS configuration of 15 kHz. When a maximum size of a field is reached with a scaling factor smaller than MAN for the configured size in case all cells in the set of co-scheduled cells are scheduled, remaining bits can be set to a predetermined value such as zero.

FIG. 11 illustrates a flowchart of procedure 1100 for determining a size of a cell-specific field in an MC-DCI format, with adjustable granularity based on the number of co-scheduled cells according to embodiments of the present disclosure. The procedure 1100 as may be performed by a UE (e.g., 111-116 as illustrated in FIG. 1). An embodiment of the procedure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

A UE is configured a DCI format for multi-cell scheduling (MC-DCI), 1110. The UE is configured a cell-specific field in the DCI format, with N values corresponding to a first set of N co-scheduled cells, and B bits for each value, 1120. The UE receives an MC-DCI format for a second set of M co-scheduled cells (M<N) with M values for the cell-specific field, and with floor((B*N/M)) bits for each value, 1130.

In either option described above, the UE can determine the bit-width for each value from the N values similar to embodiments of the present disclosure, that is: (1) separate bit-width determination for each of the N values corresponding to each cell based on the corresponding configuration for the cell; (2) same bit-width determination for all of the N values corresponding to the maximum necessary bit-width among the N cells within the same set/subset of co-scheduled cells based on the corresponding configuration for the set/subset of co-scheduled cells; or (3) same bit-width determination for all of the N values corresponding to the maximum necessary bit-width among the cells in different sets/subsets of co-scheduled cells (corresponding to the same scheduling cell) based on the corresponding configuration for the sets/subsets of co-scheduled cells.

For example, when FDRA is a cell-specific field in the MC-DCI format, and when the UE requires 4 bits for FDRA for a first cell and 6 bits for FDRA for a second cell, the UE determines the bit-width for FDRA based as 4+6=10 bits. In another example, the UE allocates the maximum necessary size, that is 6 bits, to both the first and the second cells, so determines the bit-width for FDRA as 6+6=12 bits.

In one example, when a set of co-scheduled cells corresponds to more than one scheduling cells, the UE performs size alignment for the MC-DCI formats and/or for the fields within the MC-DCI formats across the two scheduling cells. For example, a same set of co-scheduled cells corresponds to a same MC-DCI size regardless of which scheduling cell from the two/multiple scheduling cells receives the MC-DCI format.

For example, a size of a cell-common field (also referred to as a Type-1A field) or a field configured as cell-common/Type-1A) in a multi-cell scheduling DCI format (also referred to as DCI 0_X/1_X) can be equal to a maximum size of the field across different cells in a set of cells configured for multi-cell scheduling. Then, the UE reads, based on the corresponding configuration in each of the cells, a number of LSBs from the field value (including 0 bits if no/single value is configured), and ignores the remaining MSBs, if any.

For example, the UE can determine cells to which a cell-common/Type-1A field applies. For example, when a DCI format 0_X/1_X schedules PUSCHs or PDSCHs on a cell combination that is a strict subset of the set of cells configured for multi-cell scheduling (such as, only 2 cells from 4 cells configured for multi-cell scheduling), in one option, the corresponding action applies only to the co-scheduled cell combination indicated by the DCI format 0_X/1_X. In another option, the corresponding action applies to all cells, including non-scheduled cells, from the set of cells configured for multi-cell scheduling.

For example, when the cell-common/Type-1A field is a BWP indicator field, the UE applies BWP switching, if applicable, only for the scheduled cell combination indicated by the DCI format 0_X/1_X. For example, BWP switching is not applied to non-scheduled cells from the set of cells configured for multi-cell scheduling. In another example, BWP switching applies to any cell configured for multi-cell scheduling.

In one example, for DCI fields (referred to as Type-1B fields) that are provided by joint multi-cell mapping, such as a joint multi-cell table, the UE can determine a number of entries in each row of the corresponding joint multi-cell tables. For example, an indicator of co-scheduled cells in a DCI format 0_X/1_X indicates a cell combination that is a strict subset of and has fewer cells than the set of cells configured for multi-cell scheduling. For example, the set can include 4 cells, while the DCI format 0_X/1_X includes only 2 cells. Several options can be considered for the value indicated by a Type-1B field. In one option, the UE expects that that a number of entries in the row is same as the number of cells in the cell combination (e.g., the value is expected to include 2 entries).

Another option is that the value is allowed to indicate a row from the table that includes more entries than the number of cells in the cell combination. In this case, in one embodiment, the UE reads a first number of entries of the row based on the number of cells in the cell combination and discards the rest of entries in the row, if any (e.g., only reads the first 2 entries). In another embodiment, the UE reads a number of entries equal to a number of cells from corresponding locations/indexes of the cells in the set of cells (e.g., if set of cells is {1, 2, 3, 4} and the cell combination is {1, 3}, the UE reads the $1^{st}$ and $3^{rd}$ entries and discards the $2^{nd}$ and $4^{th}$ entries). For example, the UE expects that the row includes a same number of entries as the number of cells in the set of cells, and the UE reads entries with locations/indexes corresponding to the cells in the cell combination.

For example, for a bit-width of a cell-specific filed (also referred to as Type-2 fields) or for fields configured as Type-2, that provide multiple values for multiple co-scheduled cells, the UE can determine a corresponding bit-width for the multiple values. One option is to support different bit-widths for different values corresponding to different co-scheduled cells based on the corresponding configuration for each cell. Another option is to have a same bit-width for different values corresponding to different co-scheduled cells, based on a maximum bit-width across different cells in the set of cells. For example, the cell-specific/Type-2 field can be one or more of HPN, RV, and FDRA.

For example, the UE can determine a number of or a bit-width of values provided for a cell-specific/Type-2 field.

For example, a maximum number of cells across different cell combinations is smaller than the size of the set of cells configured for multi-cell scheduling. For example, the UE can be configured a set of 4 cells for multi-cell scheduling, and cell combinations with 2 or 3 cells are configured for co-scheduling by a DCI format 0_X/1_X (and a cell combination with 4 cells is not configured). In one example, the cell-specific/Type-2 field in DCI format 0_X/1_X can include 3 values. In another example, the cell-specific/Type-2 field in DCI format 0_X/1_X can include 4 values (including some reserved values). For example, several options can be considered: (i) only 3 values with a maximum total bit-width across different cell combinations, (ii) only 3 values with a maximum individual bit-width for each value, i.e., aligned bit-widths for the 3 values, (iii) 4 values each with its own bit-width based on the corresponding configuration on the respective cell, or (iv) 4 values with a same maximum bit-width, i.e., aligned bit-widths for the 4 values based on the maximum bit-width across different cells in the set of cells configured for multi-cell scheduling.

For example, a bit-width of the cell-specific/Type-2 field can be a maximum total bit-width across different cell combinations configured for DCI 0_X/1_X. For example, the UE reads, for each cell indicated by the DCI format 0_X/1_X, a number of bits based on the corresponding configuration on the respective cell, and discards the remaining bits, if any.

In one embodiment, the UE can have a constraint/budget on a number of DCI format sizes that the UE can monitor per serving cell, per slot or across all time slots, wherein a size of a DCI format for multi-cell scheduling can be counted towards the UE constraint/budget based on a fractional count or a full count, or as part of a separate UE constraint/budget for sizes of DCI formats, with counting for each/all co-scheduled cells or one/some co-scheduled cells, or not counted at all.

In 5G NR according to TS 38.213, a UE expects to monitor PDCCH candidates for up to 4 sizes of DCI formats that include up to 3 sizes of DCI formats with CRC scrambled by C-RNTI per serving cell. For brevity, that rule is referred to as the "3+1" rule for a UE's DCI format size budget. The UE counts a number of sizes for DCI formats per serving cell based on a number of configured PDCCH candidates in respective search space sets for the corresponding active DL BWP.

There can be various options for modification of the "3+1" rule when a UE is configured one or multiple sets of co-scheduled cells or the UE is configured to monitor MC-DCI formats. Herein, a size of a MC-DCI format can be determined based on any of the options described above.

In one option, the UE does not count a size of a MC-DCI format towards the UE's "3+1" DCI size budget.

In one option, the UE counts a size of a MC-DCI format based on a fractional count or inverse scaling towards the UE's "3+1" DCI size budget for each cell from a set of co-scheduled cells. For example, a size of a MC-DCI format corresponding to a set of co-scheduled cells with M cells can be counted as a fractional count, such as 1/M, towards the UE's "3+1" DCI size budget for each of the M cells. For example, the fractional count or inverse scaling can be based on a scaling factor that is predetermined in the specifications for system operation, or can be provided by higher layer configuration.

When a first MC-DCI format corresponds to a first set S1 of co-scheduled cells with M1 cells and the size of the first MC-DCI format is aligned, for example by zero padding, with a size of the second MC-DCI format corresponding to a second set S2 of co-scheduled cells with M2 cells, in one option, the UE counts the (aligned) size of the first/second DCI formats as: (1) 1/M1 towards the UE's "3+1" DCI size budget for each of the M1 (or M2) cells; (2) 1/M2 towards the UE's "3+1" DCI size budget for each of the M1 (or M2) cells; (3) 1/min(M1,M2) towards the UE's "3+1" DCI size budget for each of the M1 (or M2) cells; (4) 1/max(M1,M2) towards the UE's "3+1" DCI size budget for each of the M1 (or M2) cells; (5) 1/M* towards the UE's "3+1" DCI size budget for each of the M* cells, wherein M* cells comprise the union of the M1 cells and M2 cells, that is, M*=$|S_1 \cup S_2|$, or (6) 1/$\hat{M}$ towards the UE's "3+1" DCI size budget for each of the $\hat{M}$ cells (or M* cells), wherein $\hat{M}$ cells comprise the intersection of the M1 cells and M2 cells, that is, $\hat{M}=|S_1 \cap S_2|$.

In one option, the UE counts a size of a MC-DCI format as a full count (that is, one size) without any scaling, towards the UE's "3+1" DCI size budget for each cell from a set of co-scheduled cells.

In one option, the UE counts a size of a MC-DCI format as a full count (that is, one size) without any scaling, towards the UE's "3+1" DCI size budget for a reference cell from a set of co-scheduled cells. For example, a reference cell can refer to any of the examples described in embodiment of the present disclosure. In one example, the UE counts a size of a MC-DCI format as a full count (that is, one size) without any scaling, towards the UE's "3+1" DCI size budget for a first cell from the set of co-scheduled cells for which the UE does not expect to be configured more than 3+1 DCI sizes for the first cell. In another example, if for the reference cell the "3+1" limit of DCI format sizes is not met after considering the MC-DCI format, the UE performs an additional size matching.

For example, the additional size matching can be between DCI formats 0_1 and 1_1 or, when size matching between DCI formats 0_1 and 1_1 is already performed, the additional size matching can be that of DCI formats 0_1/1_1 with MC-DCI format. If there are multiple MC-DCI formats, such as for PDSCH scheduling and for PUSCH scheduling, the size matching can also include the multiple MC-DCI formats. For example, for a reference cell used for size matching a MC-DCI format size, after performing the procedures in TS 38.212, the UE size matches the DCI formats used for single cell scheduling and then size matched the MC-DCI format with (the already size-matched) DCI formats 0_1 and 1_1. If there are multiple MC-DCI formats, the size matching procedure continues to include the multiple MC-DCI formats. To alleviate the required size matching, a first reference cell, such as the first cell in the set of co-scheduled cells, can be used for a first MC-DCI format, such as a MC-DCI format performing scheduling of PDSCH receptions, and a second reference cell, such as the second cell in the set of co-scheduled cells, can be used for a second MC-DCI format, such as a MC-DCI format performing scheduling of PUSCH transmissions. The reference cells can also be informed to the UE by UE-specific RRC signaling.

In another example, the UE determines the reference cells based on predetermined rules in the specifications. For example, the two reference cells can correspond to two co-scheduled cells having a largest size (or a largest size and a second largest size) SC-DCI formats among different sets of co-scheduled cells (associated with a same scheduling cell). When there are multiple cells with SC-DCI formats having a largest size, the UE determines the two reference cells to be the ones with the smallest and second-smallest cell indexes. In one example, a reference cell is the PCell. In another example, a reference cell can be a scheduling cell corresponding to the sets of co-scheduled cells. In another example, a reference cell can be a scheduled cell corresponding to the sets of co-scheduled cells that is not a scheduling cell.

In one example, the UE can report a capability corresponding to one or more of the options described above.

FIG. 12 illustrates a flowchart of procedure 1200 for counting DCI sizes for MC-DCI formats for DCI size budget of a reference cell according to embodiments of the present disclosure. The procedure 1200 as may be performed by a UE (e.g., 111-116 as illustrated in FIG. 1). An embodiment of the procedure 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

A UE is configured a number of sets of co-scheduled cells (associated with a scheduling cell), 1210. A UE is configured to monitor fist DCI formats for single-cell scheduling (SC-DCI) and second DCI formats for multi-cell scheduling (MC-DCI) on the number of sets of co-scheduled cells, 1220. The UE is configured (or determines) a reference cell from the number of sets of co-scheduled cells, 1230. The UE counts sizes of MC-DCI formats towards the "3+1" DCI size budget for the reference cell, 1240.

There can be also various alternatives for modification of the "3+1" rule itself when a UE is configured one or multiple set(s) of co-scheduled cells or when the UE is configured to monitor DCI format(s) for multi-cell scheduling.

In one alternative, the "3+1" rule is not modified.

In one alternative, the "3+1" rule can be modified to "3+1+1" or "3+1+2," wherein the additional "1" or "2" corresponds to a UE budget for monitoring 1 or 2 sizes for multi-cell scheduling DCI format(s) separate from existing DCI formats in TS 38.212.

In one alternative, the "3+1" rule can be modified to "N+1," wherein N>3 reflect UE's combined budget for sizes of multi-cell scheduling DCI formats or DCI formats with CRC scrambled by C-RNTI per serving cell.

For example, when a UE is predetermined or configured dedicated DCI formats or DCI format sizes for multi-cell scheduling, the UE is expected to support a larger number of DCI format sizes than when the UE operates only with single-cell scheduling. For example, a UE supporting multi-cell scheduling (by a single DCI format) can be expected to support, or can indicate as a capability, one or two additional DCI format sizes compared to a UE not supporting multi-cell scheduling by a single DCI format. For example, the one or two additional DCI format sizes can correspond to a size of a downlink MC-DCI for scheduling PDSCHs on multiple cells or a size of an uplink MC-DCI for scheduling PUSCHs on multiple cells. The UE counts a number of sizes for DCI formats per serving cell based on a number of configured PDCCH candidates in respective search space sets for the corresponding active DL BWP.

In one alternative, the "3+1" rule can be modified to "3+M," wherein M>1 reflect UE's combined budget for sizes of multi-cell scheduling DCI formats or DCI formats with CRC scrambled not by C-RNTI per serving cell.

In one alternative, the "3+1" rule (or any of the modified rules described in the alternatives above) can be applied per slot, rather than across all slots. For example, a slot can be a slot of a scheduled cell for which the number of DCI format sizes is being counted. For example, a slot can be a slot of smallest SCS or largest SCS, among SCS configurations of a set of co-scheduled cells or among SCS configurations of different sets of co-scheduled cells associated with a scheduling cell, or a slot of the scheduling cell, or a reference slot such as 15 kHz in FR1 and 60 kHz in FR2, or a slot of a primary cell, or a slot of a reference cell that is configured by higher layers or is predetermined in the specifications for the system operations, or a slot of a cell with smallest CIF/cell index, or a slot of a cell with largest CIF/cell index, and so on.

In one alternative, the specifications for system operation can exclude a constraint/restriction such as the "3+1" rule on the UE's DCI size budget. For example, the UE is not subject/limited to only "3+1" DCI format as described in TS 38.213.

In one example, the UE can report a capability for modified UE's DCI size budget rule corresponding to one or more of the alternatives described above. In one example, the UE can be provided, by higher layers, information about which alternative to use as a modified "3+1" rule, wherein a "mode" parameter can indicate, for example, the previous five alternatives, along with any additional higher layer parameters, when applicable.

In one embodiment, when a UE: (1) is configured to monitor PDCCH for an MC-DCI format; (2) is (pre)determined or configured to count a size of the MC-DCI format towards a UE budget for a maximum number of DCI sizes that the UE can monitor PDCCHs for detection of DCI formats on a cell (such as the "3+1" rule); and (3) determines that a counted number of DCI sizes for the cell exceeds the UE budget for the maximum number of DCI sizes for the cell.

The UE performs DCI size alignment for the cell based on predetermined or configured rules, so that a number of (modified) DCI sizes for the cell does not exceed the UE DCI format size budget. Such rules can include zero padding or truncating or dropping one or more of the DCI formats monitored on the cell. The UE applies the DCI size alignment to a predetermined or configured reference cell, or to any cell from sets of co-scheduled cells associated with a same scheduling cell. The DCI size alignment can include size matching for downlink MC-DCI format (for co-schedule PDSCHs) and uplink MC-DCI format (for co-scheduled PUSCHs), or size matching MC-DCI formats with closest-size SC-DCI formats, or vice versa.

In the following, various embodiment and examples are described in terms of the "3+1" rule. Same embodiments or variants thereof can be applied when other rules for the DCI size budget are applied, such as the alternatives described in Embodiment of the present disclosure.

There are a number of possible embodiments for DCI format size alignment procedure in the presence of MC-DCI formats.

In one example, the UE does not expect to be configured with both SC-DCI formats and MC-DCI formats for a scheduled cell, at least if the "3+1" DCI format size budget may be exceeded. Therefore, a modification to DCI format size alignment may not be necessary, and the UE may already meet the "3+1" DCI size budget.

In one example, when a UE is configured MC-DCI formats for a set of co-scheduled cells that includes a cell other than the primary cell, the UE does not expect to be configured DCI formats 0_0 or 1_0 for the cell. In such case, MC-DCI format such 0_3 or 1_3 can be added in the existing procedure for DCI size alignment TS 38.212. To meet the "3+1" rule, in one option, a size of uplink and downlink DCI formats 0_3 and 1_3 can be size aligned. In another option, DCI formats 0_3 and 1_3 can have different sizes and can be associated with different cells, for example as indicated by RRC signaling, for the purpose of DCI format size alignment. In another example, an association of the MC-DCI formats 0_3 and 1_3 with a first cell and a second cell can be determined by the UE, for example, by selecting two cells that have a smallest number of DCI sizes (before performing size alignment for the MC-DCI formats).

In one example, when a size of an MC-DCI format is counted towards the DCI size budget for a primary cell, and the UE is configured to also monitor PDCCH for DCI formats 0_0 or 1_0, the UE expects to monitor PDCCH for the MC-DCI format with a different DCI size compared to the size of DCI format 0_0 or 1_0. In addition, the UE does not expect to drop monitoring PDCCH for detection of DCI format 0_0 or 1_0.

In one example, the UE does not expect a configuration including one or more MC-DCI formats and one or more SC-DCI formats when SC-DCI formats are size aligned based on the existing DCI size alignment procedure TS 38.212, without any size alignment for the MC-DCI formats, expect possibly for an alignment of uplink and downlink MC-DCI formats 0_3 and 1_3.

In another example, when a UE is configured MC-DCI formats for a set of co-scheduled cells that includes a cell, and the UE is also configured to monitor one or more of SC-DCI formats 0_0, 1_0, 0_1, 1_1, 0_2, and 1_2, the UE procedure for DCI size alignment can be modified so that the UE meets the "3+1" DCI size budget.

In one embodiment, the UE performs the DCI size alignment procedure specified in TS 38.212 to align the sizes of the SC-DCI formats for a cell, then: (1) if the MC-DCI formats have the largest size among the DCI formats configured to monitor for the cell, zeros are appended to SC-DCI format(s) with the second-largest DCI size, such as DCI formats 0_1 or 1_1, until those SC-DCI formats have a same size as the MC-DCI formats; and (2) if the MC-DCI formats do not have the largest size among the DCI formats configured to monitor for the cell, zeros are appended to the MC-DCI format(s), such as DCI formats 0_3 or 1_3, until MC-DCI format(s) have a same size as SC-DCI format(s) with smallest size that are larger than the MC-DCI formats.

In one example, a size of the MC-DCI format is counted towards only a single scheduled cell, such as a (pre)determined or configured reference cell. Accordingly, DCI size alignment for MC-DCI format (such as the above procedures) are applied to such reference cell only.

In one example, a size of the MC-DCI format is counted towards multiple scheduled cells, such as cells in a set of co-scheduled cells or cells in different sets of co-scheduled cells (associated with a same scheduling cell). In such a case, the UE can perform DCI size alignment (such as the above procedures) for scheduled cells in an arbitrary order of cells, such as cells for which a size of an MC-DCI format is counted towards the UE DCI size budget. In another example, the UE can perform DCI size alignment (such as the above procedures) for scheduled cells in a predetermined or configured order of such cells. For example, the UE can perform DCI size alignment starting from a cell, from such cells, in a descending order of the longest size SC-DCI format(s). For example, the UE first applies the DCI size alignment to a first cell whose longest size SC-DCI format is the longest among different scheduled cells (associated with a same scheduling cell), and next applies the DCI size alignment to a second cell whose longest size SC-DCI format is the second longest among different scheduled cells, and next applies the DCI size alignment to a third cell whose longest size SC-DCI format is the third longest among different scheduled cells, and so on. In one example, the UE can apply such ordering of cells for DCI size alignment only for the first cell whose longest size SC-DCI format is the second longest size among different scheduled cells, and can perform DCI size alignment for other scheduled cells in any arbitrary order.

If the UE determines different sizes for MC-DCI formats, such as different sizes for the downlink MC-DCI format 1_3 and the uplink MC-DCI format 0_3, then, in one option, the UE first size aligns the MC-DCI formats 0_3 and 1_3, and then applies the procedures described above. In another option, all DCI formats (SC-DCI or MC-DCI) configured to monitor for a cell are sorted in ascending or descending order of DCI sizes, then, largest SC-DCI formats such as 1_1 is size aligned with largest MC-DCI formats such as 1_3 (or vice versa), and second largest SC-DCI formats such as 0_1 or 1_2 is size aligned with second largest MC-DCI formats such as 0_3 (or vice versa), and so on, until each SC-DCI format is size aligned with an MC-DCI format (or vice versa). This additional DCI size alignment can be applied before or after applying the DCI size alignment for SC-DCI formats per TS 38.212.

In one scenario, when the UE receives higher layer configuration for a size of an MC-DCI format, or for fields of an MC-DCI format for all cells in a set of co-scheduled cells, and the size for the MC-DCI format is larger than a total/combined size of DCI field sizes for the MC-DCI format, such as when a number of actually co-scheduled cells is smaller than a number of cells in the set of co-scheduled cells, then: (1) in a first option, zeros can be appended to the MC-DCI format until a size of the MC-DCI format is equal to the configured DCI size; and (2) in a second option, sizes of one or more fields can be scaled/increased, so that a size of the MC-DCI format with the scaled sizes for the one or more DCI fields is equal to the configured DCI size. Herein, scaling or increasing bit-width for one or more DCI fields can be as previously described.

In one example, the UE does not expect a configuration that results in the MC-DCI format being the largest DCI size among DCI formats configured to the UE. In one example, the UE does not expect a configuration that results in DCI format 0_2 or 1_2 or 0_1 or 1_1 having a DCI size larger (before or after any zero-padding, if applicable) than a determined or configured size for the MC-DCI format.

In one example, when the UE: (1) receives a higher layer configuration for a size of an MC-DCI format; (2) counts a size of an MC-DCI format towards a DCI size budget (such as the "3+1" rule) for a cell from a set of co-scheduled cells; and (3) determines that, after applying the steps for DCI size alignment of DCI formats for single-cell scheduling per TS 38.212, the total number of different DCI sizes configured to monitor for is more than 4 for the cell, or that the total number of different DCI sizes with C-RNTI configured to monitor is more than 3 for the cell, then two cases can be considered as shown below.

In one example of case, when the UE determines that the configured size of MC-DCI is the largest DCI size among the configured DCI formats to monitor for the cell, then size align the second largest-size DCI formats configured to monitor PDCCH for the cell, such as DCI format 0_1 or 1_1, based on the configured size for the MC-DCI format, that is, zeros can be appended to the second largest-size DCI formats, such as DCI format 0_1 or 1_1, until their size is equal to the configured size for the MC-DCI format.

In one example of case, when the UE determines that the configured size of MC-DCI format is not the largest DCI size among the configured DCI formats to monitor for the cell, then size align the DCI formats, such as DCI format 0_2 or 1_2 or 0_0 or 1_0, configured to monitor for the cell with the largest size that is smaller than the configured size of MC-DCI format based on the configured size for the MC-DCI format, that is, zeros can be appended to such DCI formats until their size is equal to the configured size for the MC-DCI format.

In one example, the above size alignment is applied to both DL and UL DCI formats as identified above, for example, for both DCI formats 0_1 or 1_1 in Case 1 above, and for both DCI formats 0_2 and 1_2 in Case 2 above.

In another example, one or more of the above options can be applied to the SC-DCI formats before applying the existing DCI size alignment per TS 38.212, for example, by removing any zero padding that was applied based on the existing DCI size alignment per TS 38.212.

In one example, the UE performs DCI size alignment for an MC-DCI format with configured DCI size (such as the above procedures) only for a reference cell, or for cells in a set of co-scheduled cells or different sets of co-scheduled cells (associated with a same scheduling cell), for example, in a descending order of longest size SC-DCI formats, as described earlier.

In one example, a first DCI format size configured for a first MC-DCI format for jointly scheduling PDSCHs on multiple cells (such as DCI format 1_3) can be different from a second DCI size configured for a second MC-DCI format for jointly scheduling PUSCHs on multiple cells (such as DCI format 0_3).

In one example, when the UE is configured two different sizes for MC-DCI formats, such as a first configured size for DCI format 0_3 for co-scheduling multiple PDSCHs on multiple cells and a second configured size for DCI format 1_3 for co-scheduling multiple PUSCHs on multiple cells, a largest SC-DCI format such as 0_1 or 1_1 is size aligned with the first configured MC-DCI format size, and a second largest SC-DCI format such as 0_2 or 1_2 is size aligned with the second configured MC-DCI format size. For example, such size alignment can be performed before or after applying the existing DCI size alignment for SC-DCI formats per TS 38.212.

FIG. 13 illustrates a flowchart of procedure 1300 for DCI size alignment for a cell for which a size of the MC-DCI format is counted towards the DCI size budget for the cell according to embodiments of the present disclosure. The procedure 1300 as may be performed by a UE (e.g., 111-116 as illustrated in FIG. 1). An embodiment of the procedure 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

A UE is configured a number of sets of co-scheduled cells that includes a first cell, 1310. A UE is configured first DCI formats for single-cell scheduling (SC-DCI) on a cell and second DCI formats for multi-cell scheduling (MC-DCI) on the number of sets of co-scheduled cells, 1310. The UE is configured (or determines) to count the MC-DCI formats towards the DCI format size budget (such as the "3+1" rule for DCI size budget) for the first cell, 1330. The UE applies DCI format size alignment procedures specified in TS 38.212 only to the SC-DCI formats for the first cell, 1340. The UE determines whether a collection of SC-DCI formats (with modified DCI size) and MC-DCI formats satisfy the DCI format size budget (such as the "3+1" rule for DCI size budget) for the first cell, 1350. When the UE determines that such DCI format collection satisfies the "3+1" DCI format size budget for the first cell, the UE can use the SC-DCI formats and the MC-DCI formats with the determined sizes and there is no need to perform additional DCI format size alignment for the first cell, 1360. When the UE determines that such DCI format collection does not satisfy the "3+1" DCI format size budget for the first cell, the UE size-matches the MC-DCI formats, or size matches the largest SC-DCI format with the MC-DCI format that is closer in size, so that the DCI format size budget (such as the "3+1" rule for DCI format size budget) rule is satisfied for the first cell, 1370.

FIG. 14 illustrates a flowchart of procedure 1400 for determining an order among cells with MC-DCI format configuration for which additional DCI size alignment is applied according to embodiments of the present disclosure. The procedure 1400 as may be performed by a UE (e.g., 111-116 as illustrated in FIG. 1). An embodiment of the procedure 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

A UE is configured a number of sets of co-scheduled cells (associated with a same scheduling cell), 1410. A UE is configured first DCI formats for single-cell scheduling (SC-DCI) and second DCI formats for multi-cell scheduling (MC-DCI), 1420. The UE is configured (or determines) multiple cells, from the number of sets of co-scheduled cells, for which the UE counts the sizes of MC-DCI formats towards the "3+1" DCI size budget, 1430. The UE determines first cells, from the multiple cells, for which additional DCI size alignment with respect to MC-DCI format is needed (in addition to DCI size alignment procedures with respect to SC-DCI formats as specified in TS 38.212) 1440. The UE determines a first cell, from the first cells, with longest-size SC-DCI format among the first cells, 1450. The UE first performs the additional DCI size alignment for the first cell, and then for other cells from the first cells, 1460.

In one example, when the UE is configured to monitor MC-DCI formats corresponding to a set of co-scheduled cells in (original/linked) search space sets that correspond to a single cell from the set of co-scheduled cells, the UE counts the MC-DCI format sizes only towards that single cell, and applies the BD/CCE budget for monitoring MC-DCI formats only towards that single cell.

In one example, when the UE: (1) is configured to monitor MC-DCI formats for a set of co-scheduled cells that includes a cell; and (2) applies the "3+1" DCI size budget for the cell per slot, instead of across all slots, the UE can determine, for each slot, DCI formats with up to three different sizes, and drop/discard the remaining DCI formats in that slot or corresponding search space sets. There can be a number of options to make such determination/selection, such as the following options.

In one example of option, the DCI formats (MC-DCI or SC-DCI) with up to three largest sizes are retained, and the ones with the smaller sizes are dropped.

In one example of option, the DCI formats (MC-DCI or SC-DCI) with up to three smallest sizes are retained, and the ones with the larger sizes are dropped.

In one example of option, a DCI format size threshold is predetermined in the specifications of the system operation or provided by the higher layers, and the DCI formats (MC-DCI or SC-DCI) with size larger (respectively, smaller) than the DCI size threshold are retained, and the ones with size smaller (respectively, larger) than the DCI size threshold are dropped.

In one example of option, priority levels are applied, so DCI formats with higher priority levels (that is, more "important") DCI formats are retained, and the ones with lower priority levels (that is, less "important") DCI formats are dropped. Herein, a priority level can be configured by higher layers or can be predetermined in the specifications of the system operation based on some dropping rules, such as one or more of the following examples.

In one example, an MC-DCI format has higher (or lower) priority level than an SC-DCI format.

In one example, a "fallback" DCI format 0_0/1_0 has higher (or lower) priority level than a DCI format 0_1/1_1/0_2/1_2.

In one example, DCI formats configured in CSS sets have higher priority level than DCI formats configured in USS sets.

In one example, DCI formats configured in USS sets that include MC-DCI formats have higher priority level than DCI formats configured in USS sets that exclude MC-DCI formats.

In one example, DCI formats in USS sets with smaller search space set index have higher priority level than DCI formats configured in USS sets with higher search space set index.

In one example, when search space sets are configured with associated priority levels, DCI formats in higher-priority USS sets have higher priority level than DCI formats configured in lower-priority USS sets.

For example, after allocating DCI format sizes to CSS sets, the UE starts to monitor PDCCH according to USS sets in ascending order of USS set index until the UE reaches a USS set in which the UE size budget for the cell in the slot is reached. For PDCCH monitoring for the cell in that slot, from that search space set onward, the UE only monitors the USS sets according to the DCI formats that have been identified and any other DCI formats that have a same size as the ones identified, while any DCI format with new/additional size is not monitored for the cell in that slot.

For example, after allocating DCI format sizes to CSS sets, the UE starts to monitor PDCCH for USS sets with MC-DCI format configuration in ascending order of USS set index, then monitors PDCCH for USS sets without MC-DCI format configuration in ascending order of USS sets, until the UE reaches a USS set in which the UE size budget for the cell in the slot is reached. For PDCCH monitoring for the cell in that slot, from that search space set onward, the UE only monitors the USS sets according to the DCI formats that have been identified and any other DCI formats that have a same size as the ones identified, while any DCI format with new/additional DCI size is not monitored for the cell in that slot.

The UE can make the determination/selection based on one or more of the options above (before or) after applying the existing DCI size alignment for SC-DCI formats per TS 38.212. In one example, the UE can make such determination after aligning the sizes of MC-DCI format 1_3 for co-scheduling multiple PDSCHs on multiple cells with MC-DCI format 0_3 for co-scheduling multiple PUSCHs on multiple cells. In one example, the UE can make such determination after performing size alignment for MC-DCI format 1_3 with a first SC-DCI format such as a largest SC-DCI format (for example, DCI format 1_1) or performing size alignment for MC-DCI format 0_3 with a second SC-DCI format such as a second largest SC-DCI format (for example, DCI format 0_1 or 1_2).

In one example, when a UE is configured MC-DCI formats for a set of co-scheduled cells, a UE capability for a number of DCI formats a UE can receive/decode per slot (per scheduled cell or per scheduling cell) can be increased. For example, the UE can report an additional capability to receive/process/decode MC-DCI formats without additional size alignment (that is, in addition to a UE capability to receive/process/decode SC-DCI formats per TR 38.822).

FIG. 15 illustrates a flowchart of procedure 1500 for DCI size determination in the presence of MC-DCI formats based on a rule for "3+1" DCI size budget per slot according to embodiments of the present disclosure. The procedure 1500 as may be performed by a UE (e.g., 111-116 as illustrated in FIG. 1). An embodiment of the procedure 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

A UE is configured a number of sets of co-scheduled cells that includes a first cell, 1510. The UE is configured first DCI formats for single-cell scheduling (SC-DCI) on a scheduling cell and second DCI formats for multi-cell scheduling (MC-DCI) on the number of sets of co-scheduled cells, 1520. The UE is configured (or determines) to count the MC-DCI formats towards the DCI size budget (such as the "3+1" rule for DCI size budget) for the first cell, 1530. The UE applies DCI size alignment procedures specified in TS 38.212 only to the SC-DCI formats for the first cell, 1540. The UE determines whether a collection of SC-DCI formats (with modified DCI size) and MC-DCI formats satisfy the DCI format size budget (such as the "3+1" rule for DCI format size budget) for the first cell in a slot, 1550. When the UE determines that such DCI collection satisfies the "3+1" DCI size budget for the first cell in the slot, the UE can use the SC-DCI formats and the MC-DCI formats with the determined sizes, 1560. When the UE determines that such DCI collection does not satisfy the "3+1" DCI size budget for the first cell in the slot, the UE drops some low-priority DCI formats, per predetermined or configured priority rules, until the "3+1" DCI size budget is satisfied for the first cell in the slot, 1570.

The present disclosure can be applicable to NR specifications Rel-17/18 and beyond to provide PDCCH monitoring embodiments for supporting multi-cell scheduling operation by a single DCI format or by other low-overhead signaling mechanisms. Such embodiments can enable a flexible and enhanced cross-carrier scheduling operation in a multi-carrier setting.

The present disclosure enables an improved operation of 3GPP 5G NR system by enhancing the carrier aggregation (CA) operation. The embodiments are generic and can also apply to various frequency bands in different frequency ranges (FR) such as FR1, FR2, FR3, and FR4, e.g., low frequency bands such as below 1 GHz, mid frequency bands, such as 1-7 GHz, and high/millimeter frequency bands, such as 24-100 GHz and beyond. In addition, the embodiments are generic and can apply to various use cases and settings as well, such as single-panel UEs and multi-panel UEs, eMBB, URLLC and IIoT, mMTC and IoT, sidelink/V2X, operation with multi-TRP/beam/panel, operation in unlicensed/shared spectrum (NR-U), non-terrestrial networks (NTN), aerial systems such as drones, operation with reduced capability (RedCap) UEs, private or non-public networks (NPN), and so on.

The present disclosure relates to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving first information for a set of cells;
identifying first combinations of cells and second combinations of cells from the set of cells;
determining a first maximum size among first sizes of a first downlink control information (DCI) format, wherein:
the first DCI format schedules physical downlink shared channel (PDSCH) receptions on a first combination of cells from the first combinations of cells, and
the first sizes correspond to the first combinations of cells;
determining a second maximum size among second sizes of a second DCI format, wherein:
the second DCI format schedules physical uplink shared channel (PUSCH) transmissions on a second combination of cells from the second combinations of cells, and
the second sizes correspond to the second combinations of cells;
determining:
a third size for a third DCI format for scheduling a PDSCH reception on a reference cell from the set of cells, and
a fourth size for a fourth DCI format for scheduling a PUSCH transmission on the reference cell;
determining a number of sizes among the first maximum size, the second maximum size, the third size, and the fourth size exceeds a predetermined number of sizes for the reference cell;
determining a first number of padding bits that is equal to a difference between the fourth size and the third size;
receiving the first DCI format based on the first maximum size and the second DCI format based on the second maximum size, and receiving the third DCI format including the first number of padding bits when the third size is smaller than the fourth size.

2. The method of claim 1, further comprising receiving the fourth DCI format including the first number of padding bits when the fourth size is smaller than the third size.

3. The method of claim 1, further comprising:

determining:

a number of sizes among the first maximum size, the second maximum size, and a larger of the third size and the fourth size exceeds the predetermined number of sizes for the reference cell, a second number of padding bits that is equal to a difference between the second maximum size and the first maximum size, the first maximum size by adding the second number of padding bits to the first maximum size when the first maximum size is smaller than the second maximum size, and the second maximum size by adding the second number of padding bits to the second maximum size when the second maximum size is smaller than the first maximum size.

4. The method of claim 1, further comprising:

determining a second number of padding bits for the first DCI format, wherein:

the first DCI format has a first size, the first size is smaller than the first maximum size, and the second number of padding bits is equal to a difference between the first maximum size and the first size.

5. The method of claim 1, further comprising:

receiving second information for a field of the first DCI format, wherein the field provides a value that is common for all cells in the first combination of cells; and determining:

a maximum bit-width of M bits among bit-widths for the field corresponding to all cells in the set of cells, a bit-width of N bits for the field corresponding to a first cell from the first combination of cells, wherein $N \leq M$, and a number N of least significant bits (LSBs) of the value for the first cell, wherein a PDSCH reception, from the PDSCH receptions, on the first cell is based on the number N of LSBs of the value.

6. The method of claim 1, wherein:

a frequency domain resource allocation (FDRA) field in the first DCI format includes values for all cells in the set of cells, first values, from the values, of the FDRA field in the first DCI format are not reserved, remaining values from the values for the FDRA field in the first DCI format are reserved, and the first values have one-to-one association with the PDSCH receptions on the first combination of cells.

7. The method of claim 1, wherein:

a field in the first DCI format is predetermined or configured by higher layers to have separate values for different cells in the set of cells, the set of cells include N cells, the first combination of cells includes $$N_{cells}^{DL}$$

cells from the set of cells, wherein $$N_{cells}^{DL} \leq N,$$

and the first DCI format includes only $$N_{cells}^{DL}$$

values for the field, corresponding to the $$N_{cells}^{DL}$$

cells.

8. A user equipment (UE) comprising:

a transceiver configured to receive first information for a set of cells; and a processor operably coupled to the transceiver, the processor configured to:

identify first combinations of cells and second combinations of cells from the set of cells;

determine a first maximum size among first sizes of a first downlink control information (DCI) format, wherein:

the first DCI format schedules physical downlink shared channel (PDSCH) receptions on a first combination of cells from the first combinations of cells, and the first sizes correspond to the first combinations of cells, determine a second maximum size among second sizes of a second DCI format, wherein:

the second DCI format schedules physical uplink shared channel (PUSCH) transmissions on a second combination of cells from the second combinations of cells, and the second sizes correspond to the second combinations of cells;

determine:

a third size for a third DCI format for scheduling a PDSCH reception on a reference cell from the set of cells, and a fourth size for a fourth DCI format for scheduling a PUSCH transmission on the reference cell;

determine a number of sizes among the first maximum size, the second maximum size, the third size, and the fourth size exceeds a predetermined number of sizes for the reference cell;

determine a first number of padding bits that is equal to a difference between the fourth size and the third size, wherein the transceiver is further configured to:

receive the first DCI format based on the first maximum size and the second DCI format based on the second maximum size, and receive the third DCI format including the first number of padding bits when the third size is smaller than the fourth size.

9. The UE of claim 8, wherein the transceiver is further configured to receive the fourth DCI format including the first number of padding bits when the fourth size is smaller than the third size.

10. The UE of claim 8, wherein the processor is further configured to determine:

a number of sizes among the first maximum size, the second maximum size, and a larger of the third size and the fourth size exceeds the predetermined number of sizes for the reference cell, a second number of padding bits that is equal to a difference between the second maximum size and the first maximum size, the first maximum size by adding the second number of padding bits to the first maximum size when the first maximum size is smaller than the second maximum size, and the second maximum size by adding the second number of padding bits to the second maximum size when the second maximum size is smaller than the first maximum size.

11. The UE of claim 8, wherein:

the processor is further configured to determine a second number of padding bits for the first DCI format, the first DCI format has a first size, the first size is smaller than the first maximum size, and the second number of padding bits is equal to a difference between the first maximum size and the first size.

12. The UE of claim 8, wherein:

the transceiver is further configured to receive second information for a field of the first DCI format, the field provides a value that is common for all cells in the first combination of cells, the processor is further configured to determine:

a maximum bit-width of M bits among bit-widths for the field corresponding to all cells in the set of cells, a bit-width of N bits for the field corresponding to a first cell from the first combination of cells, wherein N≤M, and a number N of least significant bits (LSBs) of the value for the first cell, and a PDSCH reception, from the PDSCH receptions, on the first cell is based on the number N of LSBs of the value.

13. The UE of claim 8, wherein:

a frequency domain resource allocation (FDRA) field in the first DCI format includes values for all cells in the set of cells, first values, from the values, of the FDRA field in the first DCI format are valid, remaining values from the values for the FDRA field in the first DCI format are invalid, and the first values have one-to-one association with the PDSCH receptions on the first combination of cells.

14. The UE of claim 8, wherein:

a field in the first DCI format is predetermined or configured by higher layers to have separate values for different cells in the set of cells, the set of cells include N cells, the first combination of cells includes $$N_{cells}^{DL}$$

cells from the set of cells, wherein $$N_{cells}^{DL} \le N,$$

and the first DCI format includes only $$N_{cells}^{DL}$$

values for the field, corresponding to the $$N_{cells}^{DL}$$

cells.

15. A base station comprising:

a transceiver configured to transmit first information for a set of cells; and a processor operably coupled to the transceiver, the processor configured to:

identify first combinations of cells and second combinations of cells from the set of cells;

determine a first maximum size among first sizes of a first downlink control information (DCI) format, wherein:

the first DCI format schedules physical downlink shared channel (PDSCH) transmissions on a first combination of cells from the first combinations of cells, and the first sizes correspond to the first combinations of cells;

determine a second maximum size among second sizes of a second DCI format, wherein:

the second DCI format schedules physical uplink shared channel (PUSCH) transmissions on a second combination of cells from the second combinations of cells, and the second sizes correspond to the second combinations of cells;

determine:

a third size for a third DCI format for scheduling a PDSCH reception on a reference cell from the set of cells, and a fourth size for a fourth DCI format for scheduling a PUSCH transmission on the reference cell;

determine a number of sizes among the first maximum size, the second maximum size, the third size, and the fourth size exceeds a predetermined number of sizes for the reference cell;

determine a first number of padding bits that is equal to a difference between the fourth size and the third size, wherein the transceiver is further configured to:

transmit the first DCI format based on the first maximum size and the second DCI format based on the second maximum size, and transmit the third DCI format including the first number of padding bits when the third size is smaller than the fourth size.

16. The base station of claim 15, wherein the transceiver is further configured to transmit the fourth DCI format by including the first number of padding bits when the fourth size is smaller than the third size.

17. The base station of claim 15, wherein the processor is further configured to determine:

a number of sizes among the first maximum size, the second maximum size, and a larger of third size and the fourth size exceeds the predetermined number of sizes for the reference cell, a second number of padding bits that is equal to a
difference between the second maximum size and the
first maximum size, the first maximum size by adding the second number of
padding bits to the first maximum size when the first
maximum size is smaller than the second maximum
size, and the second maximum size by adding the second number
of padding bits to the second maximum size when the
second maximum size is smaller than the first maxi-
mum size.

18. The base station of claim 15, wherein:

the processor is further configured to determine a second
number of padding bits for the first DCI format, the first DCI format has a first size, the first size is smaller than the first maximum size, and the second number of padding bits is equal to a difference
between the first maximum size and the first size.

19. The base station of claim 15, wherein:

the transceiver is further configured to transmit second
information for a field of the first DCI format, the field provides a value that is common for all cells in
the first combination of cells, the processor is further configured to determine:

a maximum bit-width of M bits among bit-widths for
the field corresponding to all cells in the set of cells, a bit-width of N bits for the field corresponding to a first
cell from the first combination of cells, wherein
N≤M, and a number N of least significant bits (LSBs) of the value
for the first cell, and a PDSCH transmission, from the PDSCH transmissions,
on the first cell is based on the number N of LSBs of
the value.

20. The base station of claim 15, wherein:

a field in the first DCI format is predetermined or con-
figured by higher layers to have separate values for
different cells in the set of cells, the set of cells include N cells, the first combination of cells includes $$N_{cells}^{DL}$$

cells from the set of cells, wherein $$N_{cells}^{DL} \le N,$$

and the first DCI format includes only $$N_{cells}^{DL}$$

values ror ie nieia, corresponding to the $$N_{cells}^{DL}$$

cells.

* * * * *